United States Patent
Fudaba et al.

(10) Patent No.: US 9,329,587 B2
(45) Date of Patent: May 3, 2016

(54) CONTROL APPARATUS AND CONTROL METHOD FOR MASTER SLAVE ROBOT, ROBOT, CONTROL PROGRAM FOR MASTER SLAVE ROBOT, AND INTEGRATED ELECTRONIC CIRCUIT FOR CONTROL OF MASTER SLAVE ROBOT

(71) Applicant: Panasonic Corporation, Osaka (JP)

(72) Inventors: Yudai Fudaba, Osaka (JP); Yuko Tsusaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/475,807

(22) Filed: Sep. 3, 2014

(65) Prior Publication Data
US 2015/0073596 A1    Mar. 12, 2015

(30) Foreign Application Priority Data
Sep. 6, 2013  (JP) ................... 2013-185388

(51) Int. Cl.
*G05B 15/00* (2006.01)
*G05B 19/00* (2006.01)
*G05B 15/02* (2006.01)
*B25J 3/04* (2006.01)
*B25J 9/16* (2006.01)

(52) U.S. Cl.
CPC . *G05B 15/02* (2013.01); *B25J 3/04* (2013.01); *B25J 9/1689* (2013.01); *Y10S 901/08* (2013.01); *Y10S 901/47* (2013.01)

(58) Field of Classification Search
CPC .......... B25J 3/04; B25J 9/1689; G05B 15/02; Y10S 901/47; Y10S 901/08
USPC ................... 700/245, 259; 901/8, 47
See application file for complete search history.

(56) References Cited

U.S. PATENT DOCUMENTS

| | | | | |
|---|---|---|---|---|
| 5,053,975 A | * | 10/1991 | Tsuchihashi | G05B 19/427 700/248 |
| 5,855,553 A | * | 1/1999 | Tajima | A61B 19/22 600/407 |
| 5,859,934 A | * | 1/1999 | Green | H04N 13/0497 382/128 |
| 8,981,914 B1 | * | 3/2015 | Stetten | A61B 19/46 340/407.1 |

(Continued)

FOREIGN PATENT DOCUMENTS

| JP | 61-033878 | 2/1986 |
|---|---|---|
| JP | 08-187246 | 7/1996 |

(Continued)

*Primary Examiner* — Jaime Figueroa
(74) *Attorney, Agent, or Firm* — Wenderoth, Lind & Ponack, L.L.P.

(57) ABSTRACT

A master slave robot is that receives force presentation according to a picture watched by an operator operating the master slave robot. The control apparatus for the master slave robot causes a force information correcting unit to correct force information in accordance with magnification percentage information acquired by a displayed information acquiring unit such that the force information is increased accordingly as the magnification percentage information is larger. An operator can thus apply appropriate force while watching the picture projected on a display to perform a task.

10 Claims, 44 Drawing Sheets

(56) References Cited

U.S. PATENT DOCUMENTS

| | | | | |
|---|---|---|---|---|
| 2004/0111183 | A1* | 6/2004 | Sutherland | A61B 19/22 700/245 |
| 2007/0083098 | A1* | 4/2007 | Stern | A61B 1/00188 600/407 |
| 2009/0245600 | A1* | 10/2009 | Hoffman | A61B 1/00039 382/128 |
| 2009/0248036 | A1* | 10/2009 | Hoffman | A61B 19/2203 606/130 |
| 2011/0306986 | A1* | 12/2011 | Lee | A61B 19/2203 606/130 |
| 2013/0289767 | A1* | 10/2013 | Lim | B25J 9/1633 700/253 |

FOREIGN PATENT DOCUMENTS

| | | |
|---|---|---|
| JP | 09-319857 | 12/1997 |
| JP | 2000-052289 | 2/2000 |

* cited by examiner

Fig.3

| TIME (msec) | POSITION (mm) (x, y, z) | ORIENTATION (rad) ($r_x, r_y, r_z$) | VELOCITY (mm/msec) ($v_x, v_y, v_z$) | ANGULAR VELOCITY (rad/msec) ($\omega_x, \omega_y, \omega_z$) |
|---|---|---|---|---|
| . . . | . . . | . . . | . . . | . . . |
| 1821 | 112.2, 65.5, -8.5 | 0.07, -0.87, 1.22 | 0.11, -0.21, 0.38 | 0.015, -0.012, 0.010 |
| 1822 | 113.1, 64.8, -8.5 | 0.06, -0.85, 1.27 | 0.95, -0.73, 0.00 | -0.018, 0.022, 0.059 |
| 1823 | 113.5, 64.0, -8.0 | 0.05, -0.82, 1.28 | 0.42, -0.82, 0.50 | -0.010, 0.026, 0.017 |
| . . . | . . . | . . . | . . . | . . . |

Fig.7

| TIME (msec) | MAGNIFICATION PERCENTAGE | POSITION (mm) (x, y, z) | ORIENTATION (rad) ($r_x$, $r_y$, $r_z$) |
|---|---|---|---|
| ⋮ | ⋮ | ⋮ | ⋮ |
| 2244 | 4.0 | 180.0, 25.5, -18.5 | 0.12, -0.55, 1.01 |
| 2245 | 4.0 | 180.4, 25.5, -18.5 | 0.11, -0.53, 1.01 |
| 2246 | 4.0 | 180.4, 25.2, -18.0 | 0.10, -0.52, 1.03 |
| ⋮ | ⋮ | ⋮ | ⋮ |

Fig.8

| TIME (msec) | MAGNIFICATION PERCENTAGE | POSITION (mm) (x, y, z) | ORIENTATION (rad) ($r_x$, $r_y$, $r_z$) |
|---|---|---|---|
| ⋮ | ⋮ | ⋮ | ⋮ |
| 5544 | 1.5 | 70.0, 25.5, -18.5 | 0.32, -0.35, 1.01 |
| 5545 | 1.5 | 72.4, 22.5, -21.5 | 0.31, -0.33, 1.10 |
| 5546 | 4.0 | 73.4, 22.2, -21.0 | 0.30, -0.32, 1.11 |
| ⋮ | ⋮ | ⋮ | ⋮ |

| TIME (msec) | POSITION (mm) (x, y, z) | ORIENTATION (rad) ($r_x$, $r_y$, $r_z$) |
|---|---|---|
| ⋮ | ⋮ | ⋮ |
| 356 | 0.11, -0.21, 0.00 | 0.015, -0.012, 0.010 |
| 357 | 0.21, -0.20, 0.03 | 0.015, -0.022, 0.010 |
| 358 | 0.33, -0.21, 0.10 | 0.015, -0.026, 0.015 |
| ⋮ | ⋮ | ⋮ |

| TIME (ms) | FORCE (N OR Nm) ($F_x$, $F_y$, $F_z$, $M_x$, $M_y$, $M_z$) |
|---|---|
| ⋮ | ⋮ |
| 2005 | 0.55, 1.22, -2.11, 0.012, 0.021, 0.031 |
| 2006 | 0.57, 1.25, -2.20, 0.012, 0.022, 0.034 |
| 2007 | 0.55, 1.27, -2.30, 0.013, 0.021, 0.033 |
| ⋮ | ⋮ |

| TIME (ms) | FINE COMPONENT AREA (mm$^2$) |
|---|---|
| ⋮ | ⋮ |
| 3012 | 125 |
| 3013 | 125 |
| 3014 | 125 |
| ⋮ | ⋮ |

Fig.22A

| FINE COMPONENT | | | INSERTION PORT AREA (mm²) | | |
|---|---|---|---|---|---|
| LONG SIDE A (mm) | SHORT SIDE B (mm) | AREA (mm²) | LONG SIDE A (mm) | SHORT SIDE B (mm) | AREA (mm²) |
| 10 | 2 | 20 | 5 | 1 | 5 |

Fig.22B

| NUMBER | FINE COMPONENT | | | INSERTION PORT AREA (mm²) | | |
|---|---|---|---|---|---|---|
| | LONG SIDE A (mm) | SHORT SIDE B (mm) | AREA (mm²) | LONG SIDE A (mm) | SHORT SIDE B (mm) | AREA (mm²) |
| 1 | 10 | 2 | 20 | 5 | 1 | 5 |
| 2 | 10 | 4 | 40 | 10 | 1 | 10 |
| 3 | 20 | 2 | 40 | 5 | 2 | 10 |
| 4 | 20 | 4 | 80 | 10 | 2 | 20 |

Fig.23A

| TIME (ms) | MAGNIFICATION PERCENTAGE INFORMATION |
|---|---|
| ⋮ | ⋮ |
| 3012 | 6.25 |
| 3013 | 6.25 |
| 3014 | 6.25 |
| ⋮ | ⋮ |

Fig.23B

| TIME (ms) | MAGNIFICATION PERCENTAGE INFORMATION |
|---|---|
| ⋮ | ⋮ |
| 2134 | 6.25 |
| 2135 | 6.25 |
| 2136 | 4.12 |
| ⋮ | ⋮ |

Fig.37

|  | HORIZONTAL (degree) | VERTICAL (degree) |
|---|---|---|
| VIEW ANGLE INFORMATION | 60 | 30 |

Fig.38

| VIEW ANGLE INFORMATION | | CORRECTED FORCE GAIN |
|---|---|---|
| HORIZONTAL (degree) | VERTICAL (degree) | |
| ⋮ | ⋮ | ⋮ |
| 59 | 29.5 | 0.98 |
| 60 | 30 | 1.0 |
| 61 | 30.5 | 1.02 |
| ⋮ | ⋮ | ⋮ |

Fig.42

| TIME INFORMATION (ms) | POSITION INFORMATION (mm) | | | ORIENTATION INFORMATION (degree) | | | SIZE INFORMATION (mm) | |
|---|---|---|---|---|---|---|---|---|
| | x | y | z | rx | ry | rz | WIDTH | LENGTH |
| ... | ... | ... | ... | ... | ... | ... | ... | ... |
| 207 | 3 | 82 | 16 | -5 | 1 | 0 | 530 | 299 |
| 208 | 4 | 82 | 18 | -5 | 1 | 0 | 530 | 299 |
| 209 | 7 | 82 | 20 | -3 | 3 | 0 | 530 | 299 |
| ... | ... | ... | ... | ... | ... | ... | ... | ... |

Fig.43

| TIME INFORMATION (ms) | POSITION INFORMATION (mm) | | | SIGHT LINE INFORMATION (degree) | | |
|---|---|---|---|---|---|---|
| | x | y | z | rx | ry | rz |
| ... | ... | ... | ... | ... | ... | ... |
| 1224 | 25 | 97 | 102 | -20 | 5 | 1 |
| 1225 | 26 | 96 | 102 | -22 | 3 | 1 |
| 1226 | 25 | 97 | 105 | -22 | 1 | 0 |
| ... | ... | ... | ... | ... | ... | ... |

Fig.46

| TIME INFORMATION (ms) | TARGET OBJECT SIZE INFORMATION (mm) ||
|---|---|---|
| | WIDTH | LENGTH |
| ⋮ | ⋮ | ⋮ |
| 587 | 250 | 122 |
| 588 | 250 | 125 |
| 589 | 245 | 125 |
| ⋮ | ⋮ | ⋮ |

CONTROL APPARATUS AND CONTROL METHOD FOR MASTER SLAVE ROBOT, ROBOT, CONTROL PROGRAM FOR MASTER SLAVE ROBOT, AND INTEGRATED ELECTRONIC CIRCUIT FOR CONTROL OF MASTER SLAVE ROBOT

BACKGROUND OF THE INVENTION

The technical field relates to a control apparatus and a control method for a master slave robot, a robot, a control program for the master slave robot, and an integrated electronic circuit for control of the master slave robot, each of which generates motion of the master slave robot.

A master slave robot has been attracting attention in various fields. Such a master slave robot includes a master robot that is manipulated remotely by a person to cause a slave robot to perform a task.

In endoscopic surgery at a medical site, a surgeon remotely manipulates a master robot while being watching an endoscope motion picture projected on a monitor screen and moves a forceps gripped by a slave robot to conduct the surgery. There are an effect that the surgery can be conducted while an enlarged picture of an affected part, the forceps, or the like being projected on the monitor screen as well as an effect that the surgery can be conducted remotely by an expert surgeon who is not at the site.

There has been also proposed a master slave robot for a manufacturing site, and such a master slave robot includes a slave robot that is remotely operated or taught to perform a fine task or a skilled task. The master slave robot can easily perform such a fine task particularly under a microscope thanks to enlarged display around a hand, enlargement or reduction in shift amount of hand operation, or the like.

Both of these master slave systems are required to have a function of smoothly operating the slave robot in accordance with the operated master robot, as well as a function of feeding back force applied to the slave robot, to the master robot.

A person manipulates the master robot while watching the monitor screen. The following technique is proposed for matching the motion picture projected on the monitor to operation of the master robot or motion of the slave robot.

A master slave manipulator for body cavity surgery automatically adjusts a motion ratio between a master robot and a slave robot in accordance with a magnification percentage of a motion picture projected on a monitor (see Patent Literature 1).

CITATION LIST

Patent Literature

[Patent Literature 1] Japanese Unexamined Patent Publication No. 8-187246

SUMMARY OF THE INVENTION

More improvement in work efficiency has been demanded so that a task can be performed efficiently even upon change in magnification percentage or the like.

One non-limiting and exemplary embodiment provides a control apparatus and a control method for a master slave robot, a robot, a control program for the master slave robot, and an integrated electronic circuit for control of the master slave robot, in which the master slave robot is manipulated by a person who is watching a mot ion picture, and enables the person to perform a task efficiently even upon change in magnification percentage or the like of the motion picture.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A control apparatus for a master slave robot that includes a slave arm that performs an assembly task to a rigid target object and a master arm manipulated by a person who remotely operates the slave arm, the person performing the assembly task using the master slave robot while watching a state of the assembly task imaged by an imaging device and displayed on a display unit, the control apparatus comprising:

a force information acquiring unit that acquires force information on force externally applied to the slave arm;

a displayed information acquiring unit that acquires magnification percentage information on a picture at the display unit displaying the assembly task;

a force information correcting unit that generates corrected force information such that the force information acquired from the force information acquiring unit is corrected to be increased accordingly as the magnification percentage information acquired from the displayed information acquiring unit is larger; and a force information presentation unit that presents, to the master arm, the corrected force information generated by the force information correcting unit.

These general and specific aspects may be implemented using a system, a method, and a computer program, and any combination of systems, methods, and computer programs.

The aspect enables force presentation that matches a motion picture watched by a person even upon change in magnification percentage or the like of the motion picture, and thus achieves an efficient and accurate task.

BRIEF DESCRIPTION OF THE DRAWINGS

These and other aspects and features of the present disclosure will become clear from the following description taken in conjunction with the embodiments thereof with reference to the accompanying drawings, in which:

FIG. 3 is a view showing data exemplifying motion information and time information on the master slave robot according to the first embodiment of the present disclosure;

FIG. 7 is a view showing data exemplifying magnification percentage information, imaging device position information, and time information on the master slave robot according to the first embodiment of the present disclosure;

FIG. 8 is a view showing data exemplifying magnification percentage information, imaging device position information, and time information on the master slave robot according to the first embodiment of the present disclosure (when the magnification percentage information varies);

FIG. 22A is a view showing data exemplifying target object information on the master slave robot according to the second embodiment of the present disclosure;

FIG. 22B is a view showing data exemplifying target object information on the master slave robot according to the second embodiment of the present disclosure;

FIG. 23A is a view showing data exemplifying magnification percentage information on the master slave robot according to the second embodiment of the present disclosure;

FIG. 23B is a view showing data exemplifying magnification percentage information on the master slave robot according to the second embodiment of the present disclosure;

FIG. 37 is a view showing data exemplifying view angle information on the master slave robot according to the fifth embodiment of the present disclosure;

FIG. 38 is an explanatory chart exemplifying a correlation between view angle information and corrected force information of the master slave robot according to the fifth embodiment of the present disclosure;

FIG. 42 is a view showing data exemplifying time information, position information, orientation information, and size information on the master slave robot according to the sixth embodiment of the present disclosure;

FIG. 43 is a view showing data exemplifying time information, position information, and sight line information on the master slave robot according to the sixth embodiment of the present disclosure;

FIG. 46 is a view showing data exemplifying time information and target object size information on the master slave robot according to the seventh embodiment of the present disclosure.

DETAILED DESCRIPTION

Hereinbelow, the detailed description of the embodiments of the present disclosure will be done with reference to the drawings.

Before the detailed description of the embodiments of the present disclosure with reference to the drawings, a finding that is the basis of the present disclosure is described, and then various aspects of the present disclosure are described.

A flexible object in the embodiments of the present disclosure is a target object that is deformed by external force applied thereto. Such deformation in this case does not include plastic deformation. In contrast, a rigid target object is a target object that is not deformed by external force applied thereto.

A "flexible object" in this description includes an object of which end portion is not deformed by external force and of which center portion is deformed by external force. Examples of the flexible object include a flexible board.

A task in the embodiments of the present disclosure relates to an assembly task.

The "assembly task" in this description includes inserting an inserted object gripped by a slave arm to a receiving object to be inserted, locating a target object gripped by a slave arm on a surface of another target object, or the like.

(Finding as Basis of the Disclosure)

Figure 1:
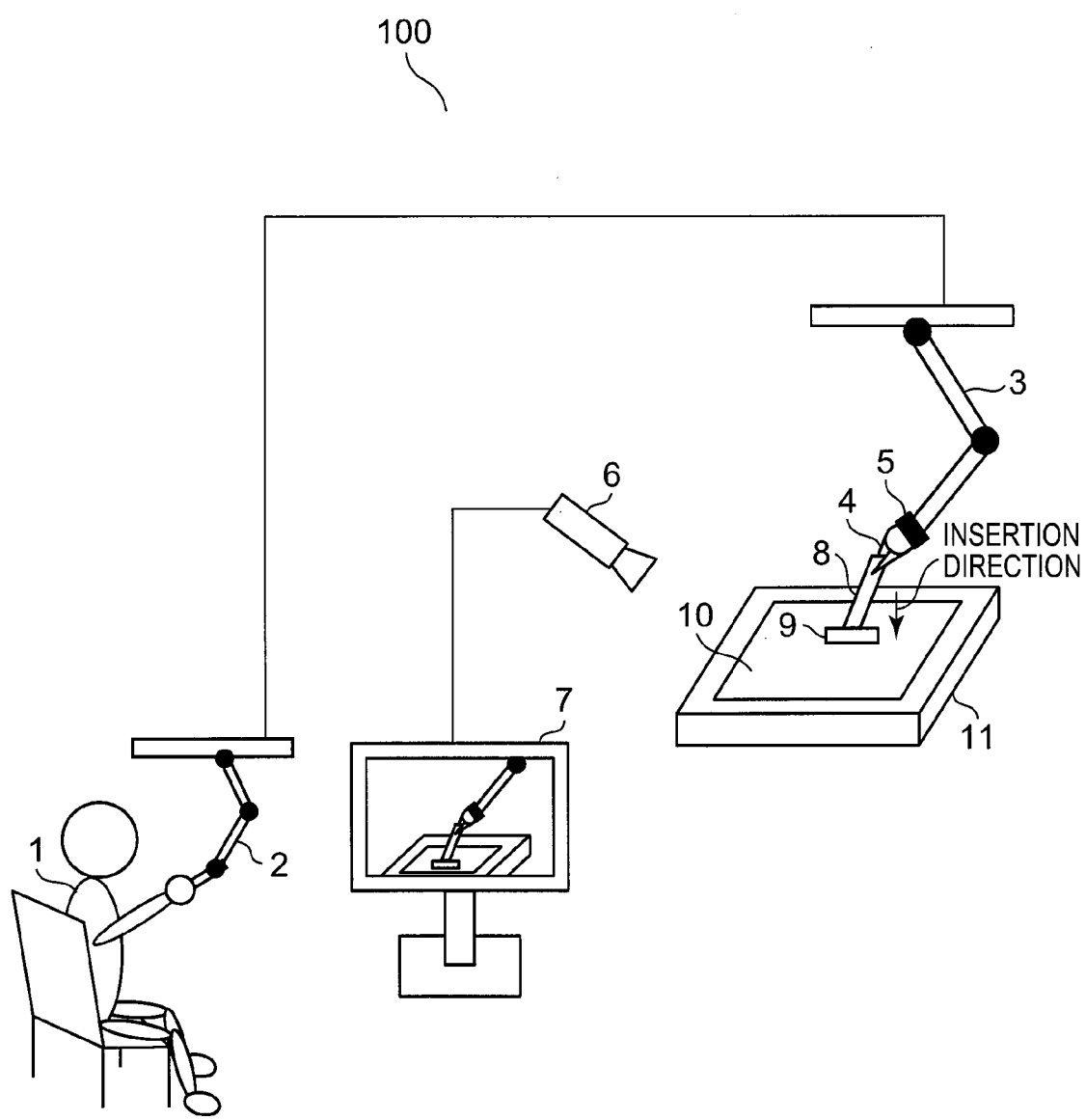
FIG. 1 is a view showing a schematic configuration of a master slave robot according to a first embodiment of the present disclosure.

FIG. 1 shows a slave arm 3 that functions as a robot for performing a task of inserting a fine component 8 gripped by a hand 4 to an insertion port 9 of an instrument 10 provided on a workbench 11. This task is imaged by an imaging device 6 such as a camera and is projected on a display 7. FIG. 1 shows a master slave robot 100 including a master arm 2 that is manipulated by an operator (person) 1 who is watching a motion picture projected on the display 7 under such a condition. Change in motion ratio of the slave arm 3 to a magnification percentage of the motion picture in the master slave robot 100 causes change of the formerly watched motion picture and manipulation of the master arm 2 or how force is sensed, so that work efficiency deteriorates.

Figure 33A:
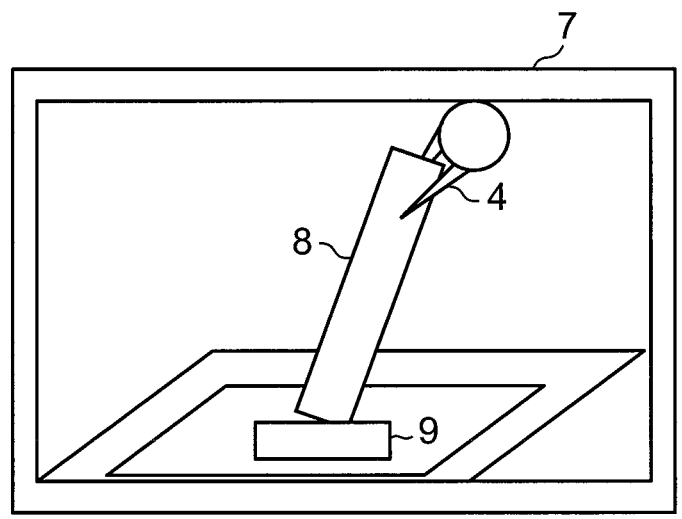
FIG. 33A is an explanatory view of a motion picture and how force is sensed in a conventional master slave robot.
Figure 33B:
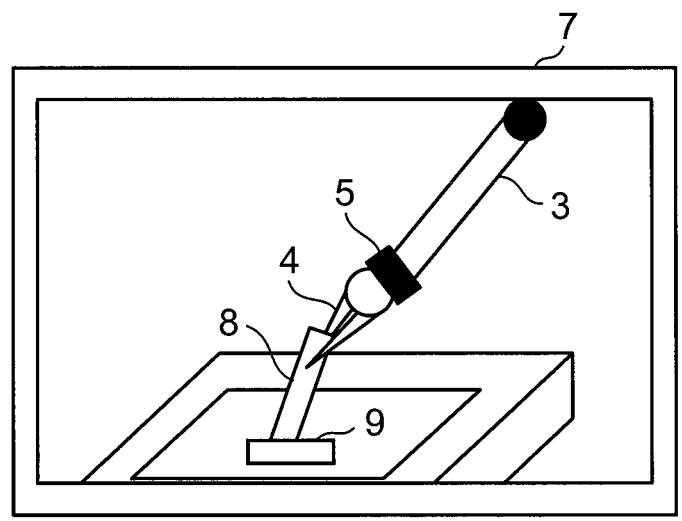
FIG. 33B is an explanatory view of a motion picture and how force is sensed in a conventional master slave robot.

Such a phenomenon is described specifically with reference to FIGS. 33A and 33B. FIGS. 33A and 33B each show a motion picture on a screen of the display 7 watched by the operator 1 in the master slave robot 100 shown in FIG. 1. FIG. 33A is larger in magnification percentage of the motion picture than FIG. 33B and shows the on-screen fine component 8 and the like that are larger than the actual components. When watching a target object, a person typically tends to determine with prejudice that a target object having a larger volume is heavier (the Charpentier effect (size-weight illusion)). The target object appears in a larger size in a motion picture of a larger magnification percentage, and the person regards the target object as being heavier. Even when performing a task to an identical target object, the person thus determines that the target object in a motion picture of a larger magnification percentage is heavier and applies larger force to the target object. The operator 1 applies an excessive load to the target object and it is thus hard to perform the task accurately. Proposed in view of this problem is a technique that matches a motion picture watched by the operator 1 to manipulation of the operator 1.

Specifically, in the method according to Patent Literature 1, the motion ratio of the slave arm 3 to the master arm 2 is automatically adjusted in accordance with the magnification percentage of the motion picture projected on the display 7. For example, when the magnification percentage is increased by k times, the motion ratio is reduced by 1/k.

However, in the method according to Patent Literature 1, the motion ratio is changed in accordance with the magnification percentage of the motion picture whereas magnitude of force fed back to the operator 1 is not changed. In short, Patent Literature 1 fails to take into consideration change of how the operator 1 senses fed back force depending on how the motion picture appears. In the examples shown in FIGS. 33A and 33B, the operator disadvantageously performs a task with larger force when the motion picture is enlarged. Patent Literature 1 unfortunately suggests no solution to this problem.

The master slave robot 100 thus needs to be controlled to automatically adjust fed back force in accordance with the motion picture projected on the display 7 so that the operator 1 can manipulate the master arm 2 in accordance with the motion picture.

Figure 34A:
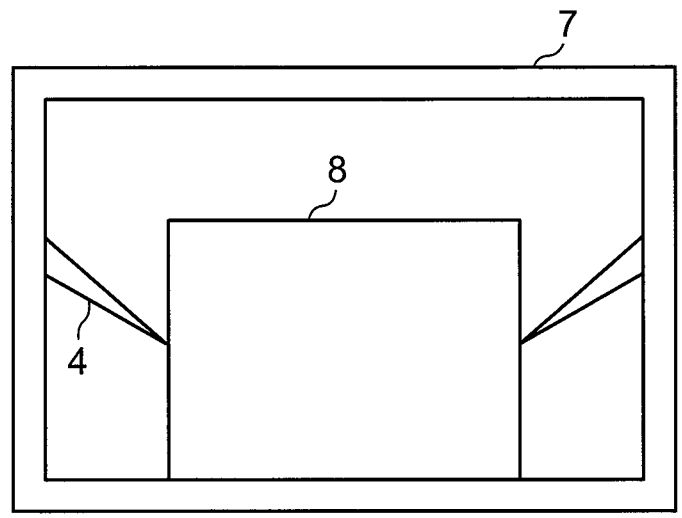
FIG. 34A is an explanatory view of a motion picture and how force is sensed in the conventional master slave robot (an explanatory view of a gripping task)
Figure 34B:
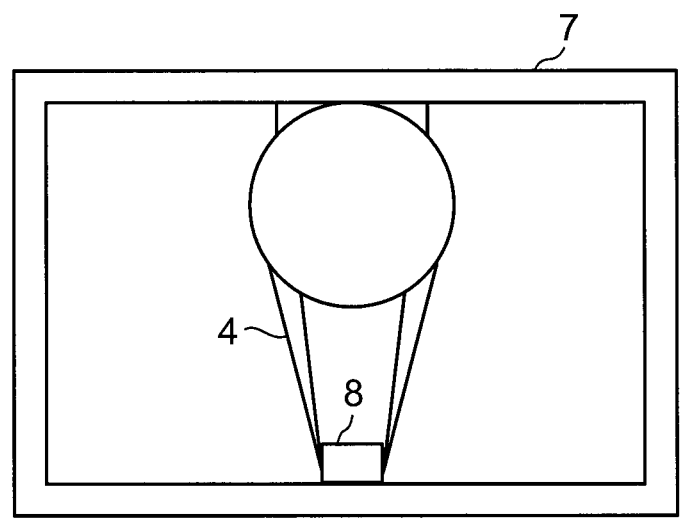
FIG. 34B is an explanatory view of a motion picture and how force is sensed in the conventional master slave robot (an explanatory view of a gripping task)

A different exemplary task is described with reference to FIGS. 34A and 34B. FIGS. 34A and 34B exemplify a task of gripping and conveying the fine component 8. FIG. 34A is larger in magnification percentage than FIG. 34B and shows the fine component 8 in a larger size. Specifically, FIG. 34A merely illustrates that the hand 4 grips the fine component 8. In contrast, FIG. 34B shows the hand 4 at the distal end of the slave arm 3 and the fine component 8 in larger sizes, so as to illustrate well that the fine component 8 is warped and deformed by the hand 4. The fine component 8 appears to be larger at a larger magnification percentage in this manner, so that the operator 1 tends to apply larger force due to the larger motion picture of the target object. The operator 1 accordingly applies to the master arm 2 force larger than necessary for gripping the fine component 8, and the fine component 8 receives an excessive load while being lifted upward and conveyed. In this manner, increase in magnification percentage largely affects the visual sense of the operator 1, who fails to apply force appropriate for achieving the task.

The present disclosure includes the various aspects described below.

1st aspect: A control apparatus for a master slave robot that includes a slave arm that performs an assembly task to a rigid target object and a master arm manipulated by a person who remotely operates the slave arm, the person performing the assembly task using the master slave robot while watching a state of the assembly task imaged by an imaging device and displayed on a display unit, the control apparatus comprising:

a force information acquiring unit that acquires force information on force externally applied to the slave arm;

a displayed information acquiring unit that acquires magnification percentage information on a picture at the display unit displaying the assembly task;

a force information correcting unit that generates corrected force information such that the force information acquired from the force information acquiring unit is corrected to be increased accordingly as the magnification percentage information acquired from the displayed information acquiring unit is larger; and a force information presentation unit that presents, to the master arm, the corrected force information generated by the force information correcting unit.

This aspect enables force presentation that matches a motion picture watched by a person even upon change in magnification percentage or the like of the motion picture (picture) displayed on the display unit, and thus achieves an efficient and accurate task. Specifically, the force information correcting unit can correct force information on force-fed back in accordance with magnification percentage information on a motion picture acquired from the displayed information acquiring unit. In other words, a person can be guided to apply force necessary for a task even upon change in magnification percentage of a motion picture.

2nd aspect: The control apparatus for the master slave robot according to the 1st aspect, wherein the force information correcting unit generates the corrected force information by multiplying a magnification percentage according to the magnification percentage information acquired from the displayed information acquiring unit and the force information acquired from the force information acquiring unit.

This aspect enables correction of force information so as to be appropriate for a task and a person can be guided to apply force appropriate for the task.

3rd aspect: The control apparatus for the master slave robot according to the 1st or 2nd aspect, further comprising:

a size information calculation unit that calculates length information or area information on the rigid target object on a screen of the display unit from imaged picture information acquired from the displayed information acquiring unit and outputs the calculated length information or the calculated area information on the rigid target object as size information on the rigid target object on the display unit; and a magnification percentage information calculation unit that calculates magnification percentage information from the size information received from the size information calculation unit and actual size information on the rigid target object, and transmits the magnification percentage information thus calculated, to the force information correcting unit.

According to this aspect, the force information correcting unit corrects force information in accordance with size information on a target object. The force information can be thus corrected appropriately regardless of how the imaging device images, and thus, a person can be guided to apply force appropriate for a task.

4th aspect: The control apparatus for the master slave robot according to the 3rd aspect, wherein the size information calculation unit calculates a length of the rigid target object to be used as the size information on the rigid target object on the display unit.

According to this aspect, the force information correcting unit corrects force information in accordance with length information on a rigid target object. The force information can be thus corrected appropriately when the length information appears properly on the screen of the display unit, and thus, a person can be guided to apply force appropriate for a task.

5th aspect: The control apparatus for the master slave robot according to the 3rd aspect, wherein the size information calculation unit calculates an area of the rigid target object to be used as the size information on the rigid target object on the display unit.

According to this aspect, the force information correcting unit corrects force information in accordance with area information on a rigid target object. The force information can be thus corrected appropriately when the area information appears properly on the screen of the display unit, and thus, a person can be guided to apply force appropriate for a task.

6th aspect: The control apparatus for the master slave robot according to any one of the 3rd to 5th aspects, further comprising:

a target object information storage unit that stores the actual size information on the rigid target object and transmits the actual size information on the rigid target object stored therein to the magnification percentage information calculation unit; wherein the magnification percentage information calculation unit divides the size information Sd acquired from the size information calculation unit by the actual size information Sr on the rigid target object that is acquired from the target object information storage unit and corresponds to the size information, and transmits a division result (Sd/Sr) to the force information correcting unit as the magnification percentage information, and the force information correcting unit multiplies the magnification percentage information acquired from the size information calculation unit and a correction coefficient to generate the corrected force information.

According to this aspect, the force information correcting unit corrects force information in accordance with an actual size of a rigid target object and a size of the rigid target object displayed on the display unit. The force information can be thus corrected to an appropriate value regardless of how the imaging device images, and thus, a person can be guided to apply force appropriate for a task.

7th aspect: The control apparatus for the master slave robot according to the 1st or 2nd aspect, wherein the displayed information acquiring unit calculates, as the magnification percentage information, a magnification percentage for enlarged display of a state of the assembly task by the slave arm on a screen of the display unit.

According to this aspect, the displayed information acquiring unit calculates magnification percentage information for a case where a state of an assembly task by the slave arm is enlarged and displayed on the screen of the display unit. This achieves calculation of magnification percentage information appropriate for the actual task and correction of force information to an appropriate value. A person can be thus guided to apply force appropriate for the task.

8th aspect: The control apparatus for the master slave robot according to the 1st aspect, wherein the force information correcting unit corrects, when updating the force information in a predetermined period for correction of the force information, a period for updating the force information by extending the predetermined period.

According to this aspect, magnitude of force information is not changed by correction, so that the force information can be prevented from increasing too much. Even in a system that cannot correct magnitude of force information, it is possible to achieve an effect similar to that of correcting the magnitude of the force information.

9th aspect: The control apparatus for the master slave robot according to any one of the 1st to 8th aspects, further comprising:

a view angle information acquiring unit that acquires view angle information on the person watching the display unit displaying the assembly task to the display unit; and a selector that selects one of the magnification percentage information on the picture thus acquired by the displayed information acquiring unit and the view angle information acquired by the view angle information acquiring unit; wherein the force information correcting unit generates corrected force information in accordance with the information selected by the selector such that the force information acquired from the force information acquiring unit is corrected to be increased accordingly as the selected information is larger.

According to the aspect, when the view angle information is selected by the selector, the force information correcting unit corrects force information in accordance with view angle information acquired by the view angle information acquiring unit. The force information can be thus corrected appropriately even when the position of the person or the display unit is shifted, and the task can be performed with accurately applied force.

10th aspect: The control apparatus for the master slave robot according to the 9th aspect, further comprising:

a display unit position information acquiring unit that acquires position information, orientation information, and size information on the display unit;

a person position information acquiring unit that acquires position information and sight line information on the person; and a view angle information calculation unit that calculates the view angle information from the position information, the orientation information, and the size information on the display unit acquired from the display unit position information acquiring unit and the position information and the sight line information on the person acquired from the person position information acquiring unit; wherein the view angle information acquiring unit acquires the view angle information calculated by the view angle information calculation unit.

According to the aspect, when the view angle information is selected by the selector, the view angle information calculation unit calculates view angle information not from the position recommended for the display unit but from the actual positions of the display unit and the person. Force information can be thus corrected appropriately even when the position of the person or the display unit is shifted, and the task can be performed with accurately applied force.

11th aspect: The control apparatus for the master slave robot according to the 9th aspect, further comprising:

a target object size information calculation unit that calculates size information on the rigid target object projected on the display unit;

a display unit position information acquiring unit that acquires position information, orientation information, and size information on the display unit;

a person position information acquiring unit that acquires position information and sight line information on the person; and a target object view angle information calculation unit that calculates the view angle information to the rigid target object projected on the display unit, from the position information, the orientation information, and the size information on the display unit acquired from the display unit position information acquiring unit, the position information and the sight line information on the person acquired from the person position information acquiring unit, and the size information on the rigid target object acquired from the target object size information calculation unit; wherein the view angle information acquiring unit acquires the view angle information calculated by the target object view angle information calculation unit.

According to the aspect, when the view angle information is selected by the selector,
the target object view angle information calculation unit 137 calculates view angle information not from the size of the display unit but from the size of the target object projected on the display unit. Force information can be thus corrected appropriately for the target object of the actual task, and the task can be performed with accurately applied force.

12th aspect: A robot comprising:

the control apparatus for the master slave robot according to any one of the 1st to 11th aspects; and the slave arm and the master arm of which motion is controlled by the control apparatus for the master slave robot.

This aspect enables force presentation that matches a motion picture watched by a person even upon change in magnification percentage or the like of the motion picture (picture) displayed on the display unit, and thus achieves an efficient and accurate task. Specifically, the force information correcting unit can correct force information on force-fed back in accordance with magnification percentage information on a motion picture acquired from the displayed information acquiring unit. In other words, a person can be guided to apply force necessary for a task even upon change in magnification percentage of a motion picture.

13th aspect: A control method for a master slave robot that includes a slave arm that performs an assembly task to a rigid target object and a master arm manipulated by a person who remotely operates the slave arm, the person performing the assembly task using the master slave robot while watching a state of the assembly task imaged by an imaging device and displayed on a display unit, the control method comprising:

acquiring, by a force information acquiring unit, force information on force externally applied to the slave arm;

acquiring, by a displayed information acquiring unit, magnification percentage information on a picture at the display unit displaying the assembly task;

generating, by a force information correcting unit, corrected force information such that the force information acquired from the force information acquiring unit is corrected to be increased accordingly as the magnification percentage information acquired from the displayed information acquiring unit is larger; and presenting, by a force information presentation unit, to the master arm, the corrected force information generated by the force information correcting unit.

This aspect enables force presentation that matches a motion picture watched by a person even upon change in magnification percentage or the like of the motion picture (picture) displayed on the display unit, and thus achieves an efficient and accurate task. Specifically, the force information correcting unit can correct force information on force-fed back in accordance with magnification percentage information on a motion picture acquired from the displayed information acquiring unit. In other words, a person can be guided to apply force necessary for a task even upon change in magnification percentage of a motion picture.

14th aspect: A control program for a master slave robot that includes a slave arm that performs an assembly task to a rigid target object and a master arm manipulated by a person who remotely operates the slave arm, the person performing the assembly task using the master slave robot while watching a state of the assembly task imaged by an imaging device and displayed on a display unit, the control program causing a computer to execute the steps of:

acquiring, by a force information acquiring unit, force information on force externally applied to the slave arm;

acquiring, by a displayed information acquiring unit, magnification percentage information on a picture at the display unit displaying the assembly task;

generating, by a force information correcting unit, corrected force information such that the force information acquired from the force information acquiring unit is corrected to be increased accordingly as the magnification percentage information acquired from the displayed information acquiring unit is larger; and presenting, by a force information presentation unit, to the master arm, the corrected force information generated by the force information correcting unit.

This aspect enables force presentation that matches a motion picture watched by a person even upon change in magnification percentage or the like of the motion picture (picture) displayed on the display unit, and thus achieves an efficient and accurate task. Specifically, the force information correcting unit can correct force information on force-fed back in accordance with magnification percentage information on a motion picture acquired from the displayed information acquiring unit. In other words, a person can be guided to apply force necessary for a task even upon change in magnification percentage of a motion picture.

15th aspect: An integrated electronic circuit for control of a master slave robot that includes a slave arm that performs an assembly task to a rigid target object and a master arm manipulated by a person who remotely operates the slave arm, the person performing the assembly task using the master slave robot while watching a state of the assembly task imaged by an imaging device and displayed on a display unit, the integrated electronic circuit comprising:

a force information acquiring unit configured to acquire force information on force externally applied to the slave arm;

a displayed information acquiring unit configured to acquire magnification percentage information on a picture at the display unit displaying the assembly task;

a force information correcting unit configured to generate corrected force information such that the force information acquired from the force information acquiring unit is corrected to be increased accordingly as the magnification percentage information acquired from the displayed information acquiring unit is larger; and a force information presentation unit configured to present, to the master arm, the corrected force information generated by the force information correcting unit.

This aspect enables force presentation that matches a motion picture watched by a person even upon change in magnification percentage or the like of the motion picture (picture) displayed on the display unit, and thus achieves an efficient and accurate task. Specifically, the force information correcting unit can correct force information on force-fed back in accordance with magnification percentage information on a motion picture acquired from the displayed information acquiring unit. In other words, a person can be guided to apply force necessary for a task even upon change in magnification percentage of a motion picture.

First Embodiment

Schematically described is a master slave robot 100 including a control apparatus 101 for the master slave robot 100 according to the first embodiment of the present disclosure.

FIG. 1 shows a task of inserting a fine component 8 using the master slave robot 100.

FIG. 1 exemplifies a task of attaching the fine component 8 as an example of a rigid target object, to an insertion port 9 of a connector for an instrument 10 such as a television, a DVD recorder, or a mobile phone in cell production at a plant.

The master slave robot 100 includes a slave arm 3 functioning as a robot that is located on a workbench 11 or a wall surface where the instrument 10 is provided and performs the task of inserting the fine component 8 to the insertion port 9 of the instrument 10.

The slave arm 3 has the distal end to which a hand 4 for gripping the fine component 8 is attached.

The workbench 11 is provided with an imaging device 6 such as a camera for imaging the fine component 8 and the insertion port 9 in an enlarged state, and a display 7 projects the imaged motion picture.

A force sensor 5 is provided at the wrist of the hand 4 and measures reactive force generated when the fine component 8 is in contact with the insertion port 9 or the instrument 10.

The slave arm 3 moves when the operator 1 exemplifying a person for performing a task manipulates a master arm 2 while checking on the display 7 the motion picture imaged by the imaging device 6. Furthermore, force measured by the force sensor 5 is fed back from the slave arm 3 to the master arm 2, so that the operator 1 can operate the slave arm 3 as if directly manipulating the fine component 8.

Figure 2:
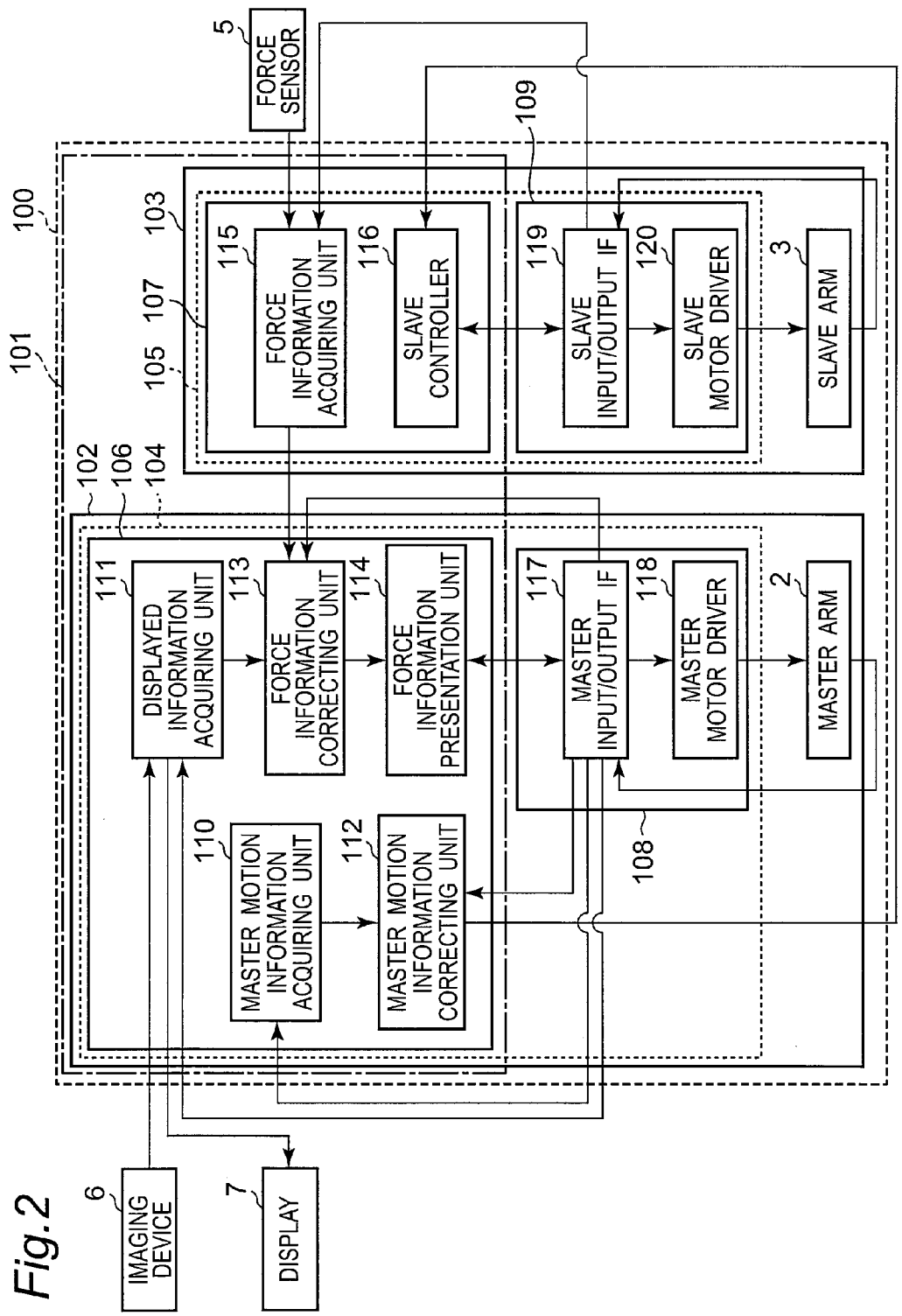
FIG. 2 is a block diagram of the master slave robot according to the first embodiment of the present disclosure.

FIG. 2 is a block diagram of the master slave robot 100 according to the first embodiment of the present disclosure. In FIG. 2, the master slave robot 100 includes a master robot 102 and a slave robot 103. The master robot 102 includes the master arm 2 and a control apparatus 104 for the master arm 2. The slave robot 103 includes the slave arm 3 and a control apparatus 105 for the slave arm 3.

The control apparatus 104 for the master arm 2 generates motion of the slave arm 3 and corrects force information acquired by the slave robot 103 to present corrected force information. The control apparatus 105 for the slave arm 3 controls a position and an orientation of the slave arm 3.

The first embodiment is described in detail below.

<Description of Control Apparatus for Master Arm>

The control apparatus 104 for the master arm 2 includes a master control apparatus main body 106 and a master peripheral device 108.

<Description of Control Apparatus for Slave Arm>

The control apparatus 105 for the slave arm 3 includes a slave control apparatus main body 107 and a slave peripheral device 109.

<Description of Master Control Apparatus Main Body>

The master control apparatus main body 106 includes a master motion information acquiring unit 110, a displayed information acquiring unit 111, a master motion information correcting unit 112, a force information correcting unit 113, and a force information presentation unit 114. The control apparatus 101 for the master slave robot 100 includes the slave control apparatus main body 107 and the master control apparatus main body 106, and controls motion of each of the slave arm 3 and the master arm 2.

(Master Motion Information Acquiring Unit 110)

The master motion information acquiring unit 110 receives position information and orientation information on the master arm 2 from a master input/output IF 117, and time information from a timer incorporated in the master input/output IF 117. The master motion information acquiring unit 110 acquires velocity information by differentiating the position information with respect to the time information, which are acquired from the master input/output IF 117. The master motion information acquiring unit 110 acquires angular velocity information by differentiating the orientation information with respect to the time information. FIG. 3 indicates time information, position information, orientation information, velocity information, and angular velocity information, which are acquired by the master motion information acquiring unit 110. The position information, the orientation information, the velocity information, and the angular velocity information configure motion information (master motion information) on the master arm 2.

The master motion information acquiring unit 110 transmits the position information, the orientation information, the velocity information, and the angular velocity information on the master arm 2, as well as the time information thus acquired, to the master motion information correcting unit 112.

(Imaging Device 6)

Figure 4A:
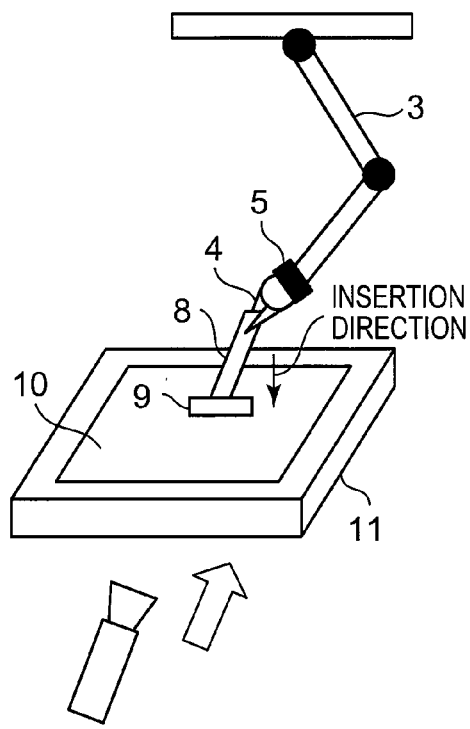
FIG. 4A is an explanatory view of how to locate an imaging device in the master slave robot according to the first embodiment of the present disclosure.
Figure 4B:
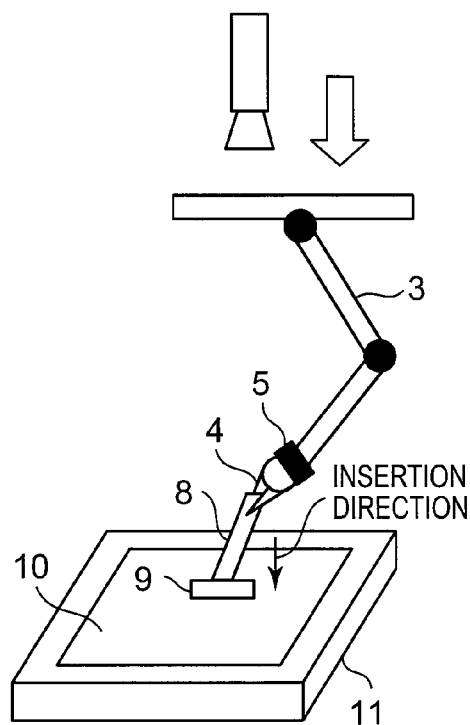
FIG. 4B is an explanatory view of how to locate an imaging device in the master slave robot according to the first embodiment of the present disclosure.
Figure 4C:
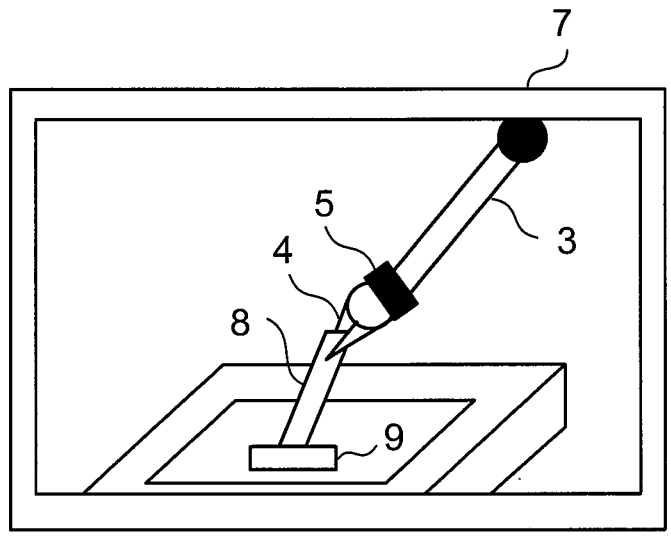
FIG. 4C is an explanatory view of how to locate an imaging device in the master slave robot according to the first embodiment of the present disclosure.
Figure 4D:
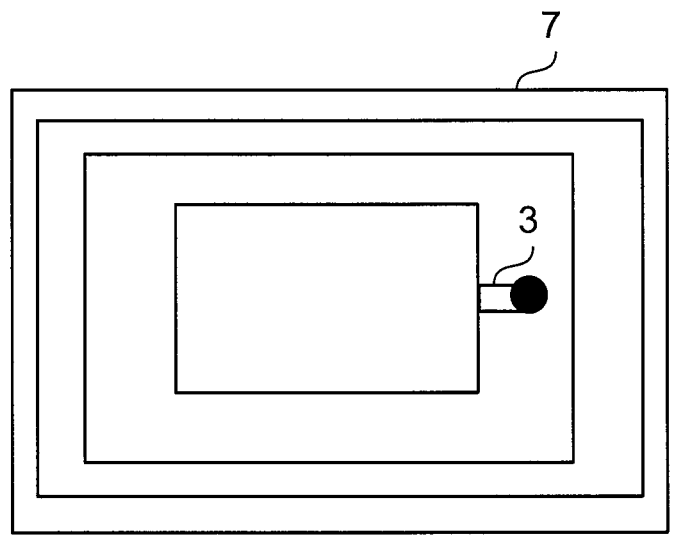
FIG. 4D is an explanatory view of how to locate an imaging device in the master slave robot according to the first embodiment of the present disclosure.

The imaging device 6 images a task performed by the slave arm 3, more specifically, images mainly the hand 4, the fine component 8, the insertion port 9, and the vicinities thereof. The imaging device 6 can change a magnification percentage for imaging. The imaging device 6 can be also changed in location or orientation thereof. The imaging device 6 can be located at any position or in any orientation, although the imaging device 6 needs to be located at a position and in an orientation such that imaging targets (particularly the hand 4, the fine component 8, and the insertion port 9) are not overlapped and shift and the sizes of the imaging targets are visible in the imaged picture. In the examples shown in FIGS. 4A and 4B, the imaging targets are not overlapped and shift thereof is also visible in the imaged picture in the position and the orientation of FIG. 4A rather than the position and the orientation of FIG. 4B. FIGS. 4C and 4D each show a moving picture projected on the display 7. According to these pictures, shift of the slave arm 3 and the size of the fine component 8 are more visible on the screen in the position and the orientation of FIG. 4A.

Figure 5:
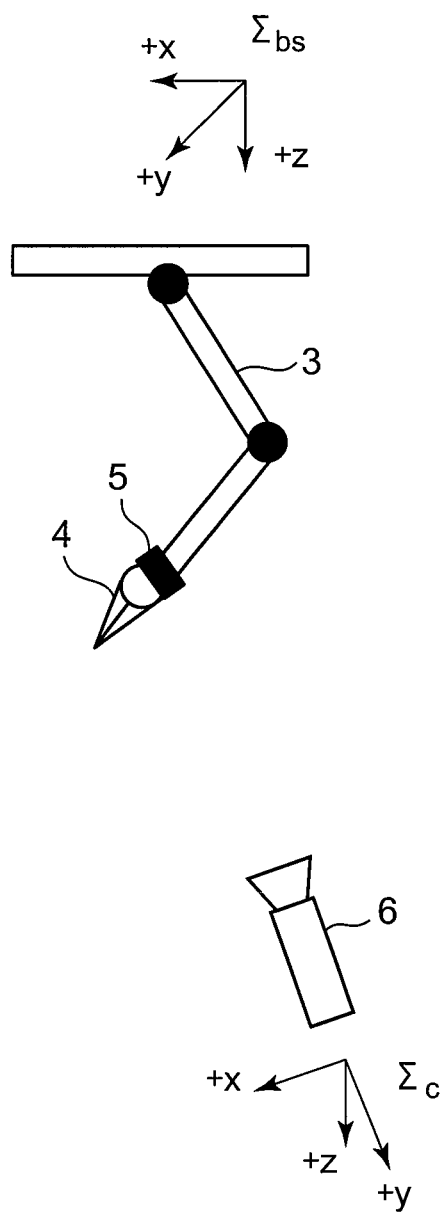
FIG. 5 is an explanatory view of a coordinate system of the imaging device in the master slave robot according to the first embodiment of the present disclosure.

The imaging device 6 transmits, to the displayed information acquiring unit 111, information on a picture imaged by the imaging device 6 (imaged motion picture information or imaged still picture information), information on a magnification percentage for imaging, and imaging device position information including a position and an orientation of the imaging device 6 upon imaging, as displayed information. The imaging device position information is expressed using a coordinate system $\Sigma_{bs}$ of the slave arm 2 as indicated in FIG. 5.

Figure 6:
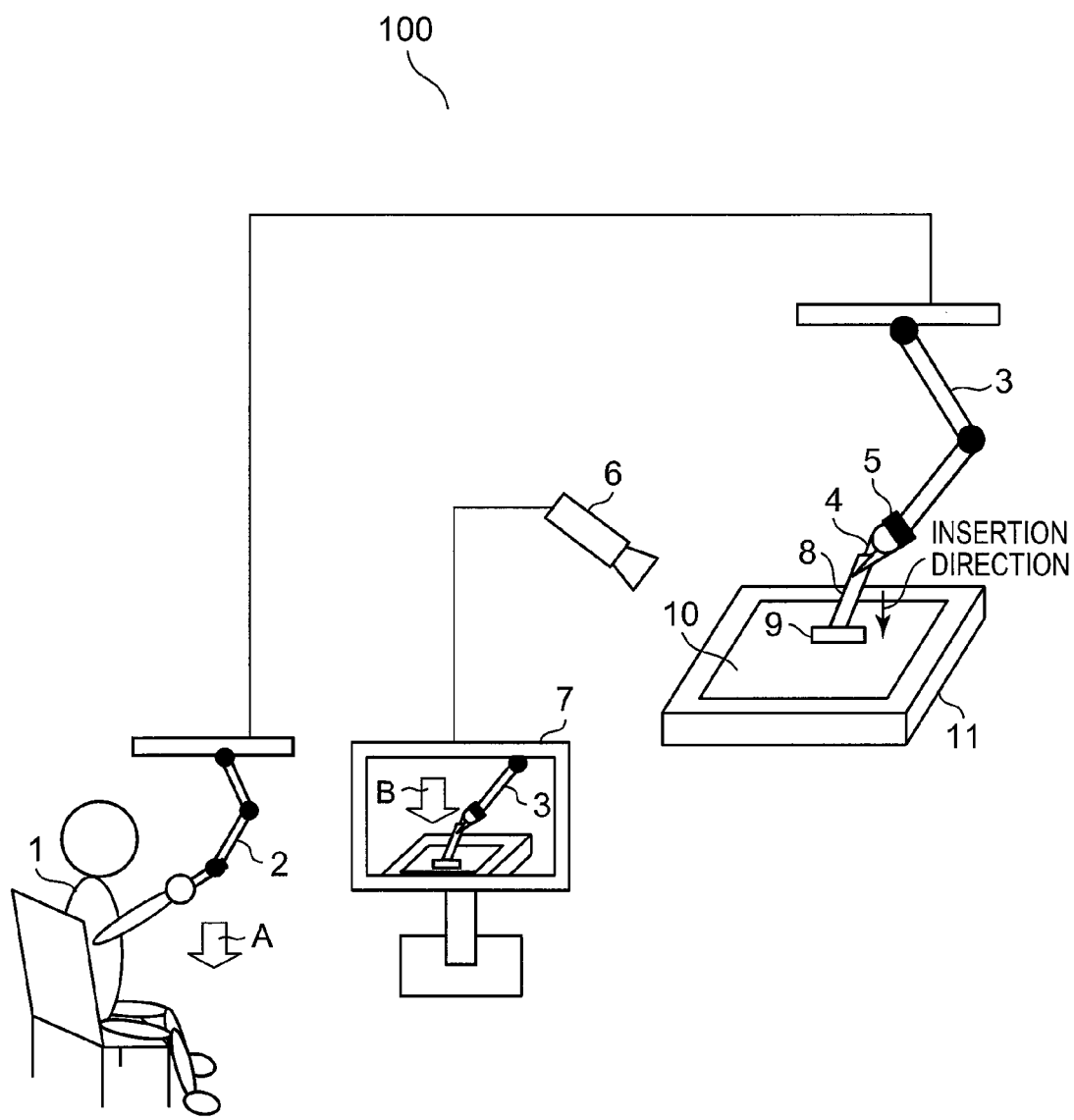
FIG. 6 is an explanatory view of a location position of the imaging device in the master slave robot according to the first embodiment of the present disclosure.

As shown in FIG. 6, the imaging device 6 is located such that a direction of manipulation of the master arm 2 by the operator 1 (an arrow A in FIG. 6) is parallel to a direction of motion of the slave arm 3 on the screen of the display 7 (an arrow B in FIG. 6)

The imaging device 6 exemplified in this case mainly performs two-dimensional imaging. The imaging device 6 can be alternatively a three-dimensional imaging device or include two imaging devices so as to image in various directions.

(Displayed Information Acquiring Unit 111)

The displayed information acquiring unit 111 receives imaged picture information, magnification percentage information, and imaging device position information from the imaging device 6 and time information from the timer incorporated in the master input/output IF 117. The imaged picture information transmitted from the displayed information acquiring unit 111 is displayed as a picture on the display 7.

FIG. 7 exemplifies magnification percentage information and imaging device position information (including orientation information on the imaging device), and time information acquired by the displayed information acquiring unit 111 other than imaged picture information. Imaged picture information is a picture itself projected on the display 7. Displayed information includes imaged picture information, magnification percentage information, and imaging device position information. Magnification percentage information indicates a magnification percentage of a picture on the display 7 to an actual object in a case where an assembly task is displayed on the display 7, for example.

The displayed information acquiring unit 111 can acquire imaged picture information, magnification percentage information, and imaging device position information from the imaging device 6 by way of the master input/output IF 117.

The displayed information acquiring unit 111 transmits the magnification percentage information and the time information thus acquired, to the force information correcting unit 113.

The magnification percentage is adjusted such that the actual target object is equal in size to the target object imaged and projected on the screen. The magnification percentage in this case is set to 1.

The reference magnification percentage is set to 1 such that the actual target object is equal in size to the target object projected on the screen. It is alternatively possible to set the reference magnification percentage to 1 at a different magnification percentage. For example, by setting the least magnification percentage to 1, the force information correcting unit 113 corrects to increase force when the target object is likely to break and cannot receive a large load. This effectively prevents application of excessive force. Alternatively, by setting the most magnification percentage to 1, the force information correcting unit 113 corrects to decrease force when the task requires large force. The operator 1 is then effectively guided to apply larger force. The operator 1 or the like can input through the master input/output IF 117 to change the reference value in accordance with a task or a target object in these manners.

FIG. 7 exemplifies a case where the magnification percentage does not change in chronological order. The magnification percentage can alternatively change in chronological order. For example, when performing a task of widely shifting the gripped fine component 8 and then performing a task of attaching the fine component 8 to a connector, the magnification percentage is decreased in the step of the shifting task so that a wider region is imaged. In contrast, the magnification percentage is increased in the step of the attaching task so that an attached portion is more visible. The magnification percentage can change in chronological order in this manner. FIG. 8 exemplifies magnification percentage information in such a case.

(Master Motion Information Correcting Unit 112)

The master motion information correcting unit 112 receives motion information (master motion information) on the master arm 2 and time information from the master motion information acquiring unit 110. The master motion information correcting unit 112 calculates a shift amount of the hand 4 of the master arm 2 in each sampling period from the acquired motion information on the master arm 2, multiplies the calculated shift amount and a gain, and transmits the obtained value as corrected master motion information (a shift amount command value) to a slave controller 116.

Described next is how the master motion information correcting unit 112 calculates a shift amount of the hand 4 of the master arm 2. The motion information on the master arm 2 indicated in FIG. 3 includes a position and an orientation in a base coordinate system $\Sigma_b$ with an origin $O_b$ in FIG. 9 serving as a reference point. The master motion information correcting unit 112 converts this motion information to a shift amount in a hand coordinate system $\Sigma_h$ with an origin $O_h$ of the hand 4 serving as a reference point. Specifically, the master motion information correcting unit 112 multiplies a shift amount $d_b$ of a position and an orientation in each sampling period in the base coordinate system $\Sigma_b$ and a transformation matrix $^bT_h$ to calculate a shift amount $d_h$ of a position and an orientation in each sampling period in the hand coordinate system $\Sigma_h$. A shift amount d indicates a difference between a position and an orientation $p_0$ at time $t_0$ and a position and an orientation $p_1$ at time $t_1$ after elapse of one sampling period, that is, $d=\Delta p=p_1-p_0$.

Described next is how the master motion information correcting unit 112 calculates a shift amount command value. The master motion information correcting unit 112 multiplies respective elements (a position (x, y, z) and an orientation ($r_x$, $r_y$, $r_z$)) of the shift amount $d_h$ of a position and an orientation in each sampling period in the hand coordinate system $\Sigma_h$ and a gain $k_d$ (e.g. 0.1) to calculate corrected master motion information (a shift amount command value $d_m$). The master motion information correcting unit 112 sets the gain $k_d$ so as to have a value more than 1 when shift of the slave arm 2 is enlarged relatively to shift of the master arm 2. In contrast, the master motion information correcting unit 112 sets the gain $k_d$ so as to have a value less than 1 when shift is reduced. The master motion information correcting unit 112 can set the gain $k_d$ so as to have a constant for each element, and the operator 1 can input the gain $k_d$ to the master motion information correcting unit 112 through the master input/output IF 117.

Figures 9, 10:
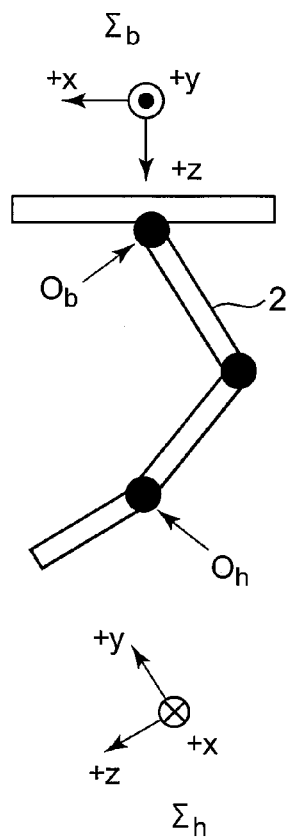
FIG. 9 is an explanatory view of a coordinate system in the master slave robot according to the first embodiment of the present disclosure.
FIG. 10 is a view showing data exemplifying corrected master motion information and time information on the master slave robot according to the first embodiment of the present disclosure.

FIG. 10 exemplifies corrected master motion information and time information.

The master motion information correcting unit 112 transmits the corrected master motion information thus calculated and time information, to the slave controller 116.

(Force Information Correcting Unit 113)

The force information correcting unit 113 receives magnification percentage information and time information from the displayed information acquiring unit 111, as well as force information and time information from a force information acquiring unit 115. The force information is corrected in accordance with the magnification percentage information thus acquired. According to a method of correcting force information, the force information correcting unit 113 multiplies the magnification percentage information thus acquired and a gain, and multiplies the obtained value and the acquired force information, to correct the force information.

In this case, the force information correcting unit 113 generates corrected force information such that the force information is increased accordingly as the magnification percentage information is larger. When watching a target object, the operator 1 determines with prejudice that the target object having a larger volume is heavier (the Charpentier effect (size-weight illusion)). The target object appears in a larger size with a larger magnification percentage, and the operator 1 regards the target object as being heavier. Even when performing a task to an identical target object, the operator thus determines that the target object is heavier at a larger magnification percentage and applies larger force to the target object. In this manner, the force information correcting unit corrects force information to a value obtained by multiplying magnification percentage information and the force information so that equal force can be applied to the target object even when the magnification percentage differs. When the magnification percentage is larger, the force information correcting unit corrects to increase force information. The operator 1 is thus guided to apply equal force to the target object regardless of the magnification percentage.

In an exemplary case of performing the task of inserting the fine component 8 as shown in FIG. 1, the task is performed while the magnification percentage of the imaging device 6 is changed. For example, in the step of shifting the fine component 8 to an insertion position, the task is performed roughly while interference with a peripheral jig or the like is checked. The task is thus performed while the picture is reduced in this case. In the step of the inserting task, the task is performed while the states of the fine component 8 and the connector 9 are finely checked. The task is thus performed while the picture is enlarged in this case. The respective cases of enlarging and reducing the picture are described below with reference to the drawings.

(I) When Performing Task with Enlarged Picture

Figure 11:
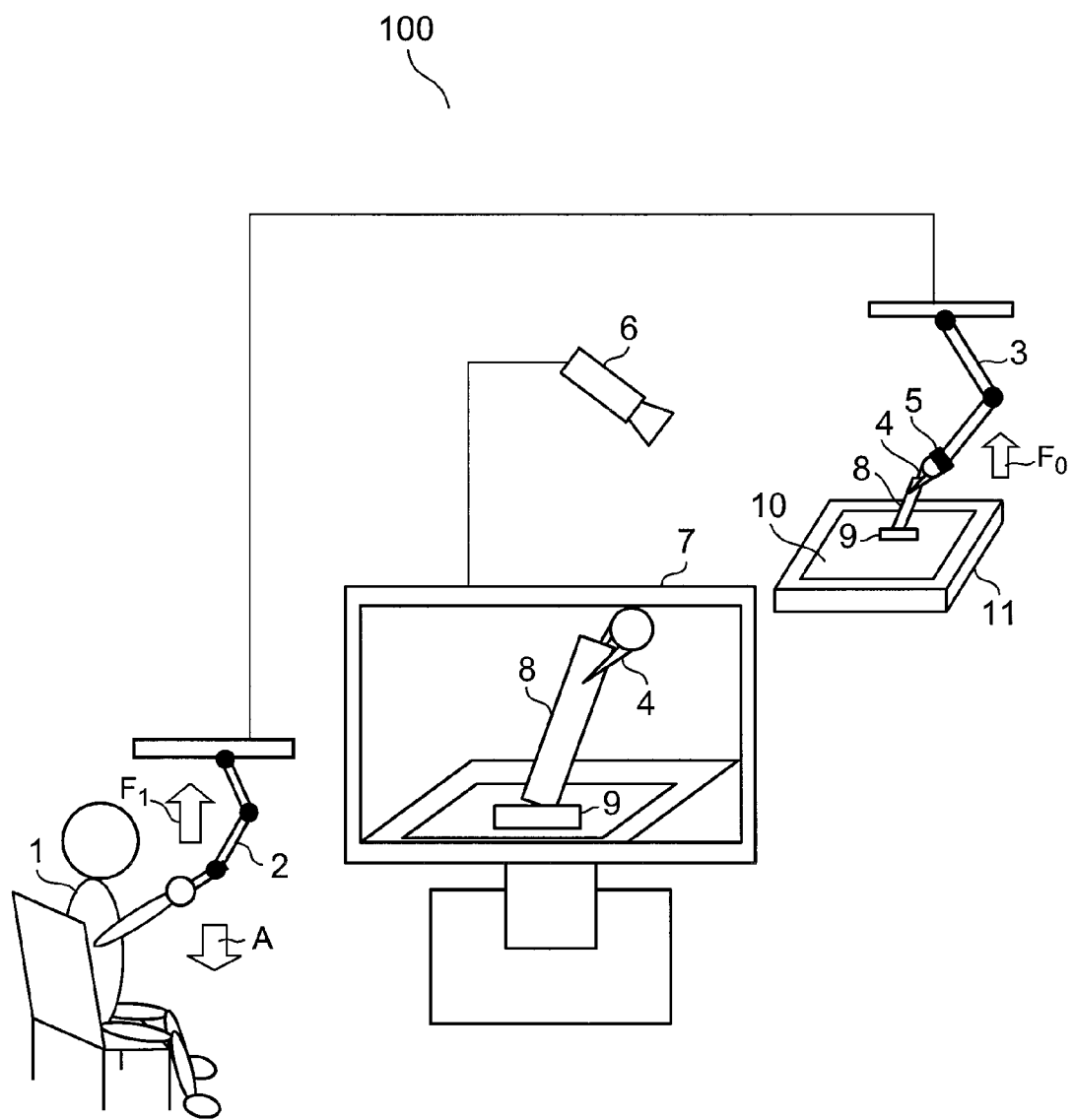
FIG. 11 is an explanatory view of how to correct force upon performing a task while watching an enlarged picture in the master slave robot according to the first embodiment of the present disclosure.

The case of performing the task with an enlarged picture is described with reference to FIG. 11. In FIG. 11, the display 7 projects a picture enlarged at a certain magnification percentage and imaged by the imaging device 6. The operator 1 manipulates the master arm 2 to perform the task while watching the picture. The operator 1 performs the task while watching the enlarged motion picture of the hand 7 and the fine component 8, so that the fine component 8 and the connector 9 appear to the operator 1 as being larger than the actual components and the operator 1 tends to regard the target objects as being heavier. The operator 1 may apply larger force with a larger load to the master arm 2 when the fine component 8 and the connector 9 come into contact with each other. In view of such a problem, the force information correcting unit 113 performs correction by multiplying the magnification percentage information and the force information, and the force information presentation unit 114 to be described later presents force to the operator 1 in accordance with the corrected information by means of the master arm 2 and the display 7. In this structure, when the operator 1 performs the task (presses downward along an arrow A in FIG. 11), force ($F_1$ in FIG. 11) larger than force information ($F_0$ in FIG. 11) acquired by the force sensor 5 is presented to the operator 1 by means of the master arm 2 and the display 7. The operator 1 thus determines that a contact degree is large and intends to contact the fine component 8 to the connector 9 with smaller force. The operator 1 can thus apply force not causing an excessive load to the master arm 2 in this case. As in this exemplary case of performing a task that does not allow application of a load, the force information correcting unit 113 multiplies magnification percentage information and force information, so that the operator 1 is guided to apply force appropriate for the magnification percentage information.

(II) When Performing Task with Reduced Picture

Figure 12:
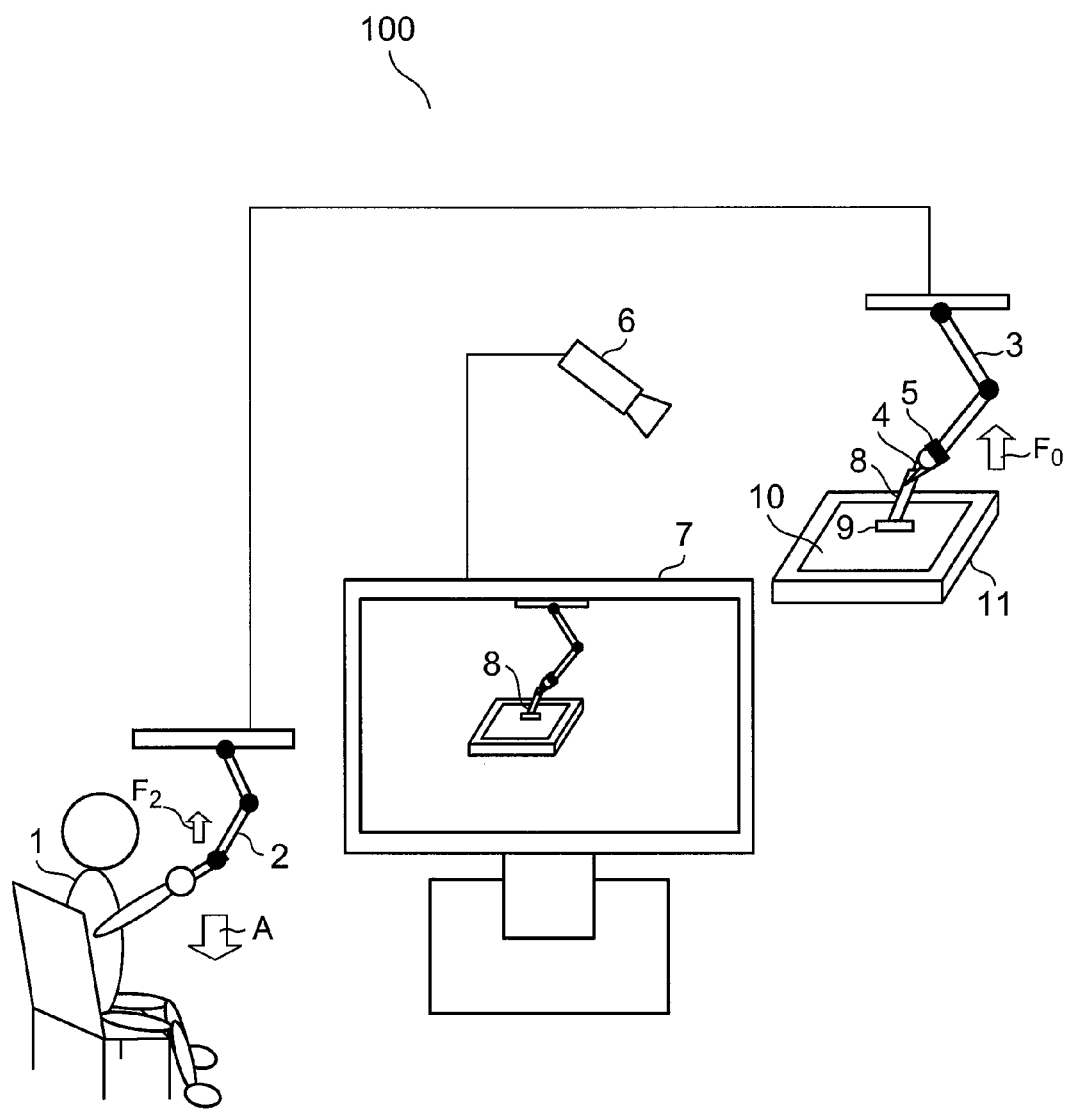
FIG. 12 is an explanatory view of how to correct force upon performing a task while watching a reduced picture in the master slave robot according to the first embodiment of the present disclosure.

The case of performing the task with a reduced picture is described with reference to FIG. 12. In FIG. 12, the display 7 projects a picture reduced and imaged by the imaging device 6. The operator 1 manipulates the master arm 2 to perform the task while watching the picture. The operator 1 performs the task while watching the hand 7 and the fine component 8 being reduced, so that the fine component 8 and the connector 9 appear to the operator 1 as being smaller than the actual components and the operator 1 tends to regard the target objects as being lighter. When the fine component 8 and the connector 9 come into contact with each other, the operator 1 may not apply, to the master arm 2, force necessary for inserting the fine component 8 to the connector 9 and may thus fail to firmly insert the fine component 8 to the connector 9. In view of such a problem, the force information correcting unit 113 performs correction by multiplying the magnification percentage information and the force information, and the force information presentation unit 114 to be described later presents force to the operator 1 in accordance with the corrected information by means of the master arm 2 and the display 7. In this structure, when the operator 1 performs the task (presses downward along the arrow A in FIG. 11), force ($F_1$ in FIG. 12) smaller than force information ($F_0$ in FIG. 12) acquired by the force sensor 5 is presented to the operator 1 by means of the master arm 2 and the display 7. The operator 1 thus determines that a contact degree is small and intends to contact the fine component 8 to the connector 9 with larger force. The operator 1 can thus apply force necessary for the insertion to the master arm 2 in this case. As in this exemplary case of performing a task that requires application of appropriate force, the force information correcting unit 113 multiplies magnification percentage information and force information, so that the operator 1 is guided to apply force appropriate for the magnification percentage information.

As described above, the force information correcting unit 113 multiplies the magnification percentage information and a gain $\alpha$ serving as a correction coefficient, and multiplies the obtained value and the acquired force information, to generate corrected force information. The operator 1 can input the gain $\alpha$ through the master input/output IF 117 to the force information correcting unit 113.

The force information correcting unit 113 transmits the corrected force information thus generated and time information to the force information presentation unit 114.

A range of force correction can be set with a threshold value. Assume a case of setting an upper limit threshold value. When the absolute value of corrected force is more than the absolute value (e.g. 10 N) of the upper limit value thus set, the force information correcting unit 113 modifies the absolute value of the corrected force to the absolute value of the upper limit value. Assume a case of setting a lower limit threshold value. When the absolute value of corrected force is less than the absolute value (e.g. 1 N) of the lower limit value thus set, the force information correcting unit 113 modifies the absolute value of the corrected force to the absolute value of force not yet corrected.

As to timing of force correction, the force information correcting unit 113 performs force correction from the start to the end of the task. The force information correcting unit 113 can alternatively determine whether or not to perform force correction in accordance with magnification percentage information. In an example, the force information correcting unit 113 performs correction if the force information correcting unit 113 determines that magnification percentage information is out of a certain range (0.8 to 1.2), whereas the force information correcting unit 113 performs no correction if the force information correcting unit 113 determines that the magnification percentage information is within the range. The force information correcting unit 113 determines whether or not to perform force correction in accordance with the range thus provided, to avoid the influence of an error or the like of the magnification percentage. The force information correcting unit 113 can thus perform correction for a task requiring force correction.

The force information correcting unit 113 corrects magnitude of force information in the above case. The force information correcting unit 113 can alternatively correct an update period of the force information. In the above case, the displayed information acquiring unit 111 acquires force information in every predetermined constant period (e.g. 1 msec) and transmits the same to the force information correcting unit 113 that performs update. The force information correcting unit 113 can alternatively change to shorten or extend the update period from the predetermined period. Specifically, when force information is expected to increase in magnitude, the force information correcting unit 113 extends the update period of the force information from the predetermined period without changing the magnitude of the force information. More particularly, when force information is expected to be doubled, the force information correcting unit 113 doubles the update period, for example. In contrast, when force information is expected to decrease in magnitude, the force information correcting unit 113 shortens the update period of the force information from the predetermined period without changing the magnitude of the force information. More particularly, when force information is expected to be halved, the force information correcting unit 113 halves the update period, for example.

Figures 13, 14:
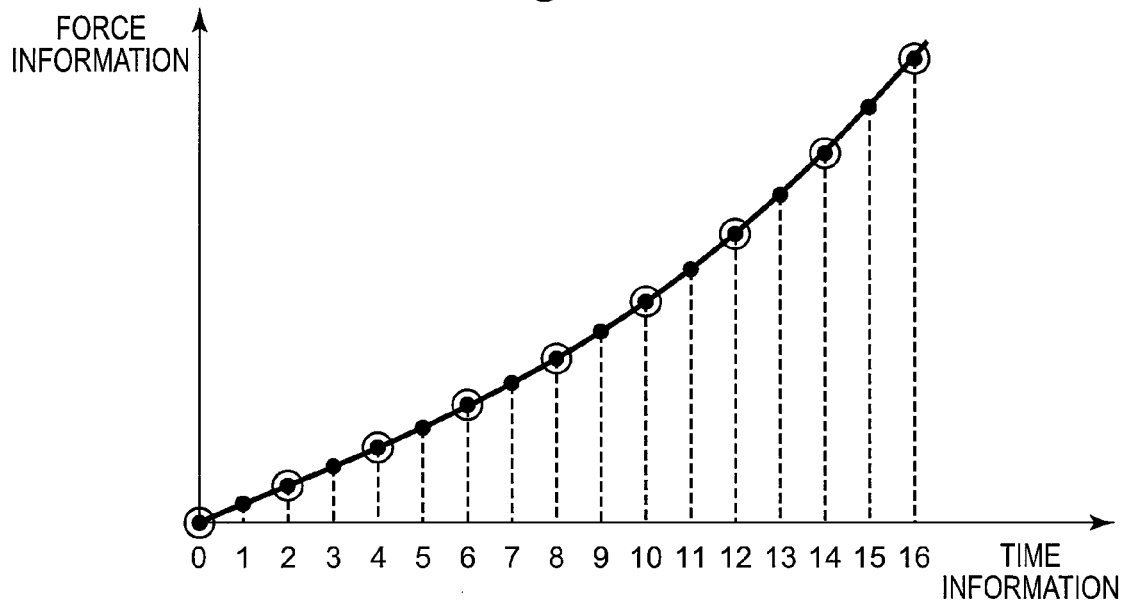
FIG. 13 is an explanatory graph of change in update period of force information in the master slave robot according to the first embodiment of the present disclosure.
FIG. 14 is a view showing data exemplifying force information and time information on the master slave robot according to the first embodiment of the present disclosure.

Described with reference to the graph in FIG. 13 is why change in update period of force information by the force information correcting unit 113 effects similarly to change in magnitude of the force information by the force information correcting unit 113. FIG. 13 indicates chronological data of force information, with the transverse axis indicating time information and the ordinate axis indicating force information. Numerical values on the transverse axis indicate time information. In the force information, black circles indicate data having the update period of 1 msec, whereas white circles indicate data having the update period of 2 msec. When the force information is denoted by $F_k$, k=1, 2, 3, . . . is applicable if the update period is 1 msec, whereas k=2, 4, 6, . . . is applicable if the update period is 2 msec. Displacement of the force information in each update period is denoted by $\Delta F_k$. For example, when the time information is 2, the force information correcting unit 113 calculates displacement $\Delta F_2 = F_2 - F_1$ in each update period of the force information if the update period is 1 msec, whereas the force information correcting unit 113 calculates displacement $\Delta F_2 = F_2 - F_0$ if the update period is 2 msec. The displacement $\Delta F_2$ of the force information with the update period of 2 msec is larger than the displacement $\Delta F_2$ with the update period of 1 msec. Displacement of force information is increased if an update period is extended as in this example, so that the operator 1 senses as if the force information is increased. It is because the operator senses displacement of force when sensing force. The update period is about 1 to 500 msec in an example.

In order to correct force information in this manner, the force information correcting unit 113 can alternatively not correct magnitude of the force information but correct an update period of the force information. Magnitude of force information is not changed by the correction, so that the force information can be prevented from changing too much. Even in a system that cannot correct magnitude of force information, it is possible to achieve an effect similar to that of correcting the magnitude of the force information.

(Force Information Presentation Unit 114)

The force information presentation unit 114 receives corrected force information and time information from the force information correcting unit 113. The force information presentation unit 114 generates a command value to allow the master arm 2 to output the corrected force information, so as to present to the operator 1 the corrected force information thus acquired by way of the master input/output IF 117 and a master motor driver 118 by means of the master arm 2. When the corrected force information is presented to the operator 1 by means of the master arm 2, presented information and the like can be displayed on the display 7 at the same time.

A method of generating a command value is described below. If the master arm 2 is an arm of which force is controllable, the force information presentation unit 114 uses corrected force information itself as a command value. If the master arm 2 is an arm of which force is uncontrollable but of which position is controllable, the force information presentation unit 114 converts corrected force information to position information in accordance with the Hook's law. The force information presentation unit 114 uses the converted position information as a command value.

The force information presentation unit 114 transmits the generated command value for the master arm 2 in each sampling period, to the master arm 2 by way of the master input/output IF 117 and the master motor driver 118.

<Description of Slave Control Apparatus Main Body>

The slave control apparatus main body 107 includes the force information acquiring unit 115 and the slave controller 116.

(Force Sensor 5)

As shown in FIG. 1, the force sensor 5 is located at the wrist of the hand 4 of the slave arm 3 and measures reactive force generated when a target object is in contact with a receiving object. Used in this case is a force sensor that can measure totally six axes including three force axes and three torque axes. It is possible to use any force sensor that can measure one or more axes. The force sensor 5 is embodied by a strain gauge force sensor or the like.

Force information measured by the force sensor 5 is transmitted to the force information acquiring unit 115 as force information on force externally applied to the slave arm 3.

(Force Information Acquiring Unit 115)

The force information acquiring unit 115 receives force information from the force sensor 5 and time information from a timer incorporated in a slave input/output IF 119. FIG. 14 indicates force information and time information.

The force information acquiring unit 115 can alternatively acquire force information from the force sensor 5 by way of the slave input/output IF 119.

The force information acquiring unit 115 transmits the force information and the time information thus acquired, to the force information correcting unit 113.

(Slave Controller 116)

The slave controller 116 receives corrected master motion information and time information from the master motion information correcting unit 112. The slave controller 116 generates a command value in accordance with the corrected master motion information thus acquired so as to shift the slave arm 3.

Described below is how the slave controller 116 generates a command value. Corrected master motion information acquired by the slave controller 116 relates to a shift amount of the hand 4. The slave controller 116 initially calculates a position and an orientation shifted by the acquired shift amount in the coordinate system of the hand 4 of the slave arm 3. The slave controller 116 converts the position and the orientation thus calculated by the slave controller 116 in the coordinate system of the hand 4 to a position and an orientation in the base coordinate system of the slave arm 3. The slave controller 116 subsequently generates a command value used for shifting to the position and the orientation thus converted in the base coordinate system of the slave arm 3.

The slave controller 116 transmits the generated command value for the slave arm 3 in each sampling period, to the slave arm 3 by way of the slave input/output IF 119 and a slave motor driver 120.

<Description of Master Peripheral Device>

The master peripheral device 108 includes the master input/output IF 117 and the master motor driver 118.

(Master Input/Output IF 117)

Figure 15:
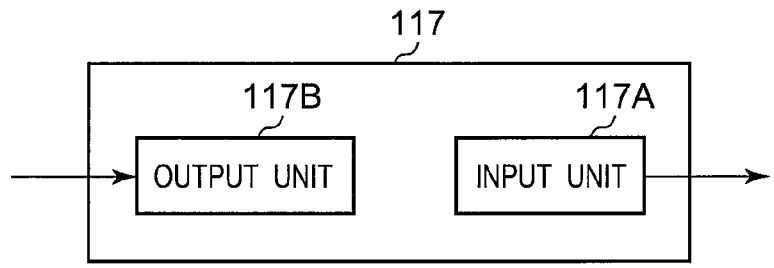
FIG. 15 is a block diagram of a master input/output IF in the master slave robot according to the first embodiment of the present disclosure.

The master input/output IF 117 transmits the command value received from the force information presentation unit 114 to the master motor driver 118. The master input/output IF 117 obtains position information and orientation information on the master arm 2 from the value received from an encoder of each joint shaft in the master arm 2 at a calculating unit (not shown) in the encoder, and transmits, from the master input/output IF 117 to the master motion information acquiring unit 110, the position information, the orientation information, and time information from the timer incorporated in the master input/output IF 117. The time information from the timer incorporated in the master input/output IF 117 is transmitted to the displayed information acquiring unit 111. As shown in FIG. 15, the master input/output IF 117 includes an input unit 117A and an output unit 117B. The input unit 117A functions as an input IF, and is used when the operator 1 selects an item using a keyboard, a mouse, a touch panel, a sound input device, or the like, or when the operator 1 inputs a number using a keyboard, a mouse, a touch panel, a sound input device, or the like, for example. The output unit 117B functions as an output IF, and is used when acquired information or the like is outputted or when the information is displayed on the display 7 or the like, for example.

(Master Motor Driver 118)

The master motor driver 118 transmits, to the master arm 2, a command value for a motor of each joint shaft in the master arm 2 in order to control the master arm 2 in accordance with the command value acquired from the master input/output IF 117.

<Description of Slave Peripheral Device>

The slave peripheral device 109 includes the slave input/output IF 119 and the slave motor driver 120.

(Slave Input/Output IF 119)

The slave input/output IF 119 transmits the command value received from the slave controller 116 to the slave motor driver 120. Time information from the timer incorporated in the slave input/output IF 119 is transmitted to the force information acquiring unit 115. Similarly to the master input/output IF 117, the slave input/output IF 119 includes an input unit 119A and an output unit 119B that are configured as shown in FIG. 15. The input unit 119A functions as an input IF, and is used when the operator 1 selects an item using a keyboard, a mouse, a touch panel, a sound input device, or the like, or when the operator 1 inputs a number using a keyboard, a mouse, a touch panel, a sound input device, or the like, for example. The output unit 119B functions as an output IF, and is used when acquired information or the like is outputted or when the information is displayed on the display 7 or the like, for example.

(Slave Motor Driver 120)

The slave motor driver 120 transmits, to the slave arm 3, a command value for a motor of each joint shaft in the slave arm 3 in order to control the slave arm 3 in accordance with the command value acquired from the slave input/output IF 119.

<Description of Master Arm 2>

In the master arm 2, the calculating unit in each encoder of the master arm 2 obtains motion information on the master arm 2 at a constant time interval (e.g. every 1 msec) using the timer incorporated in the master input/output IF 117. The motion information thus obtained is transmitted to the master input/output IF 117. The master arm 2 is controlled in accordance with a command value from the master motor driver 118.

The master arm 2 includes joints each of which has the motor and the encoder, so as to be controlled to a position and an orientation as desired. In this case, the master arm 2 configures a multiple link manipulator of six degrees of freedom, which has six joints. The number of the joints and the degrees of freedom of the master arm 2 are not limited to those of the first embodiment, but can be any numbers equal to 1 or more.

<Description of Slave Arm>

In the slave arm 3, the calculating unit in each encoder of the slave arm 3 obtains motion information on the slave arm 3 at a constant time interval (e.g. every 1 msec) using the timer incorporated in the slave input/output IF 119. The motion information thus obtained is transmitted to the slave input/output IF 119. The slave arm 3 is controlled in accordance with a command value from the slave motor driver 120.

The slave arm 3 includes joints each of which has the motor and an encoder, so as to be controlled to a position and an orientation as desired. In this case, the slave arm 3 configures a multiple link manipulator of six degrees of freedom, which has six joints. The number of the joints and the degrees of freedom of the slave arm 3 are not limited to those of the first embodiment, but can be any numbers equal to 1 or more.

<Flowchart>

An operation procedure of the master slave robot 100 according to the first embodiment is described with reference to the flowcharts in FIGS. 16 and 17.

Figure 16:
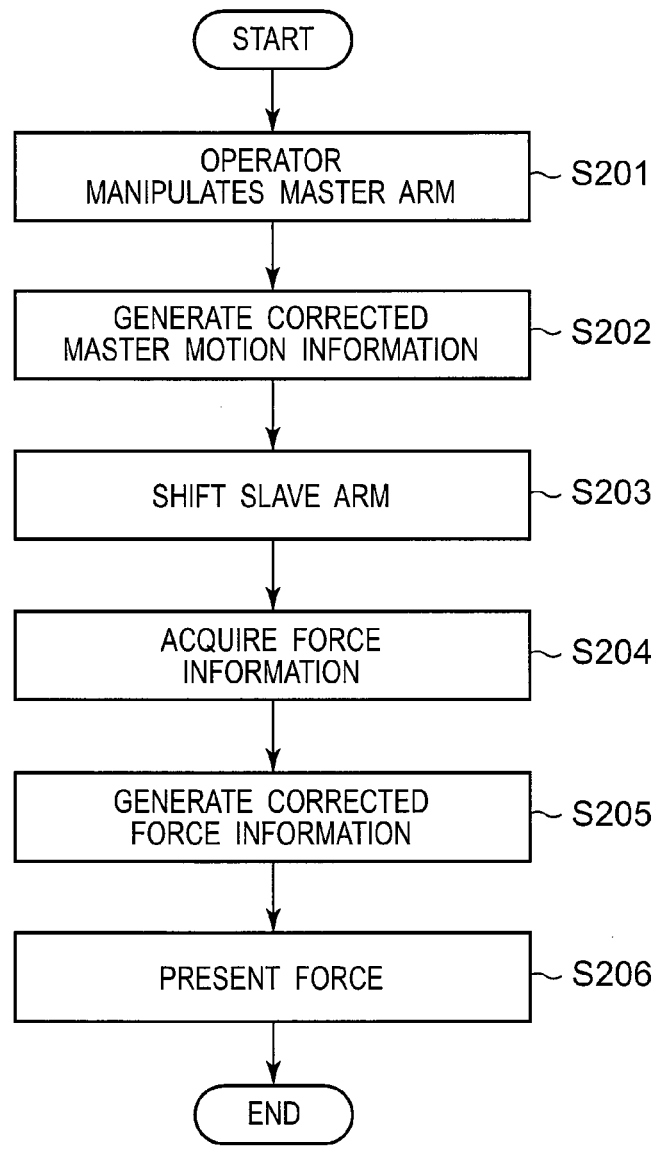
FIG. 16 is a flowchart of an operation procedure of the master slave robot according to the first embodiment of the present disclosure.

FIG. 16 exemplifies operation of the master slave robot 100 according to the first embodiment.

Initially in step S201, the operator 1 grips and manipulates the master arm 2 while watching a picture projected on the display 7. The flow then proceeds to step S202.

Then, in step S202, the master motion information correcting unit 112 corrects master motion information thus acquired and generates corrected master motion information used for shifting the slave arm 3. The flow then proceeds to step S203.

Then, in step S203, the slave controller 116 generates a command value in accordance with the corrected master motion information acquired from the master motion information correcting unit 112 so as to shift the slave arm 3. The slave controller 116 transmits the generated command value for the slave arm 3 in each sampling period, to the slave arm 3 by way of the slave input/output IF 119 and the slave motor driver 120. The slave arm 3 thus shifts and performs the task. The flow then proceeds to step S204.

Then, in step S204, the force sensor 5 attached to the arm tip of the slave arm 3 detects force information generated during the task, and the force information acquiring unit 115 acquires the detected force information. The flow then proceeds to step S205.

Then, in step S205, the force information correcting unit 113 corrects the force information acquired by the force information acquiring unit 115 in accordance with the magnification percentage information acquired by the displayed information acquiring unit 111 to generate corrected force information. The flow then proceeds to step S206.

Then, in step S206, the force information presentation unit 114 allows the master arm 2 to present force by way of the master input/output IF 117 to the operator 1 in accordance with the corrected force information generated by the force information correcting unit 113.

The series of the operation procedure ends at this stage.

Figure 17:
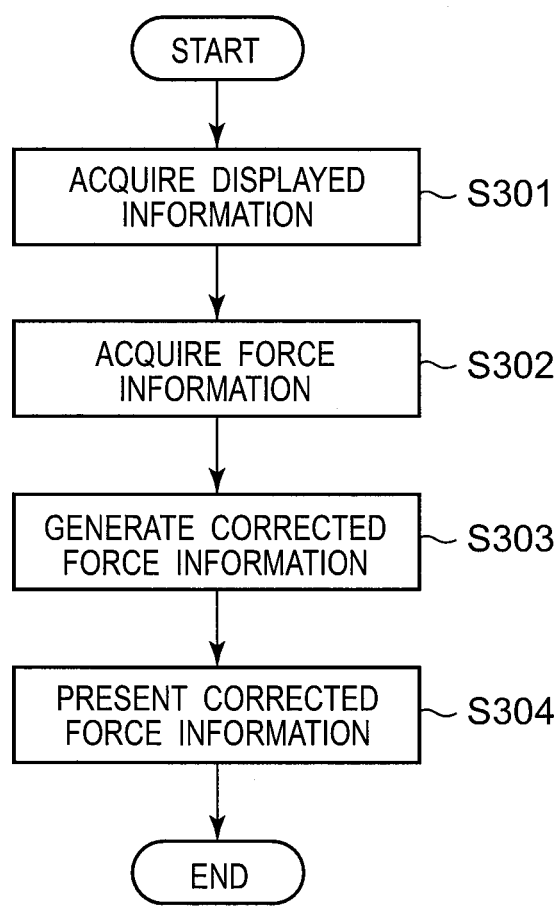
FIG. 17 is a flowchart of a force correction procedure of the master slave robot according to the first embodiment of the present disclosure.

Detailed with reference to FIG. 17 are force information acquisition in step S204, corrected force information generation in step S205, and force presentation in step S206 in the flowchart in FIG. 16.

Initially in step S301, the displayed information acquiring unit 111 acquires displayed information. The flow then proceeds to step S302.

Then, in step S302, the force information acquiring unit 115 acquires force information. The flow then proceeds to step S303.

Then, in step S303, the force information correcting unit 113 multiplies the force information acquired from the force information acquiring unit 115 and the magnification percentage information to generate corrected force information that is corrected to match on-screen information. The flow then proceeds to step S304.

Then, in step S304, the force information presentation unit 114 generates a command value for the master arm 2 in accordance with the corrected force information acquired from the force information correcting unit 113, and causes the master arm 2 to present force by way of the master input/output IF 117 and the master motor driver 118 so that the force is presented to the operator 1.

Modification Example

Figure 18:
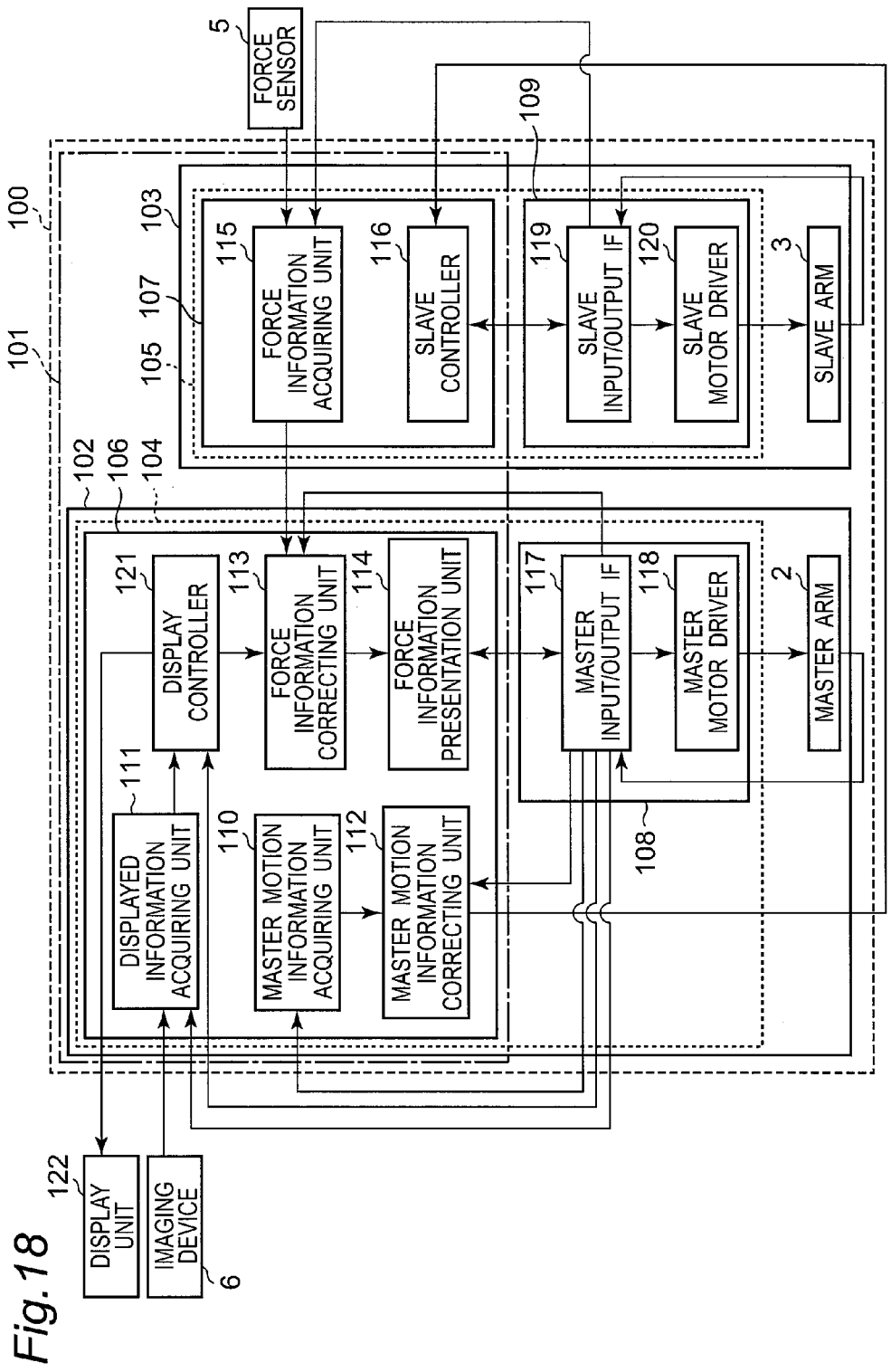
FIG. 18 is a block diagram of a master slave robot according to a modification example of the first embodiment of the present disclosure.

FIG. 18 is a block diagram of a master slave robot according to a modification example of the first embodiment of the present disclosure. According to the modification example of the first embodiment, a master control apparatus 106 in the master slave robot 100 can additionally include a display controller 121 and a display unit 122.

(Display Controller 121)

The display controller 121 receives imaged picture information, magnification percentage information, and imaging device position information from the displayed information acquiring unit 111 and time information from the timer incorporated in the master input/output IF 117.

The display controller 121 enlarges, reduces, or trims the imaged picture acquired from the displayed information acquiring unit 111 and transmits the same to the display unit 122. The imaged picture transmitted to the display unit 122 is stored in an internal storage unit (not shown) of the display controller 121. The internal storage unit stores, as imaged picture information, the imaged picture that is enlarged, reduced, or trimmed by the display controller 121 and is then transmitted from the display controller 121 to the display unit 122, and the imaged picture is updated. The internal storage unit of the display controller 121 also stores a magnification percentage for enlargement or reduction. The display controller 121 multiplies the magnification percentage for the enlargement or reduction and magnification percentage information acquired from the displayed information acquiring unit 111. The internal storage unit stores the value thus obtained as magnification percentage information, and then, the magnification percentage information is updated. The display controller 121 transmits, to the force information correcting unit 113, the magnification percentage information thus obtained and time information received from the timer incorporated in the master input/output IF 117. The display controller 121 also transmits imaged picture information to the display unit 122.

(Display Unit 122)

The display unit 122 receives imaged picture information from the display controller 121. The display (the screen of the display unit 122) 7 displays the imaged picture information thus received.

The additional provision of the display controller 121 and the display unit 122 enables correction of force information according to magnification percentage information even when a picture imaged by the imaging device 6 is processed and transmitted to the display 7.

Effects of First Embodiment

Even when the operator 1 has prejudice different from the reality due to a size of an on-screen target object, the force information correcting unit 113 corrects force information in accordance with magnification percentage information at the imaging device 6, and the force information presentation unit 114 performs force presentation. The operator 1 can thus perform a task accurately. In other words, even upon change in magnification percentage or the like in the master slave robot 100 that is operated by the operator 1 watching a motion picture, force can be presented so as to match the watched motion picture. The operator 1 can thus perform the task accurately and efficiently.

Second Embodiment

Figure 19A:
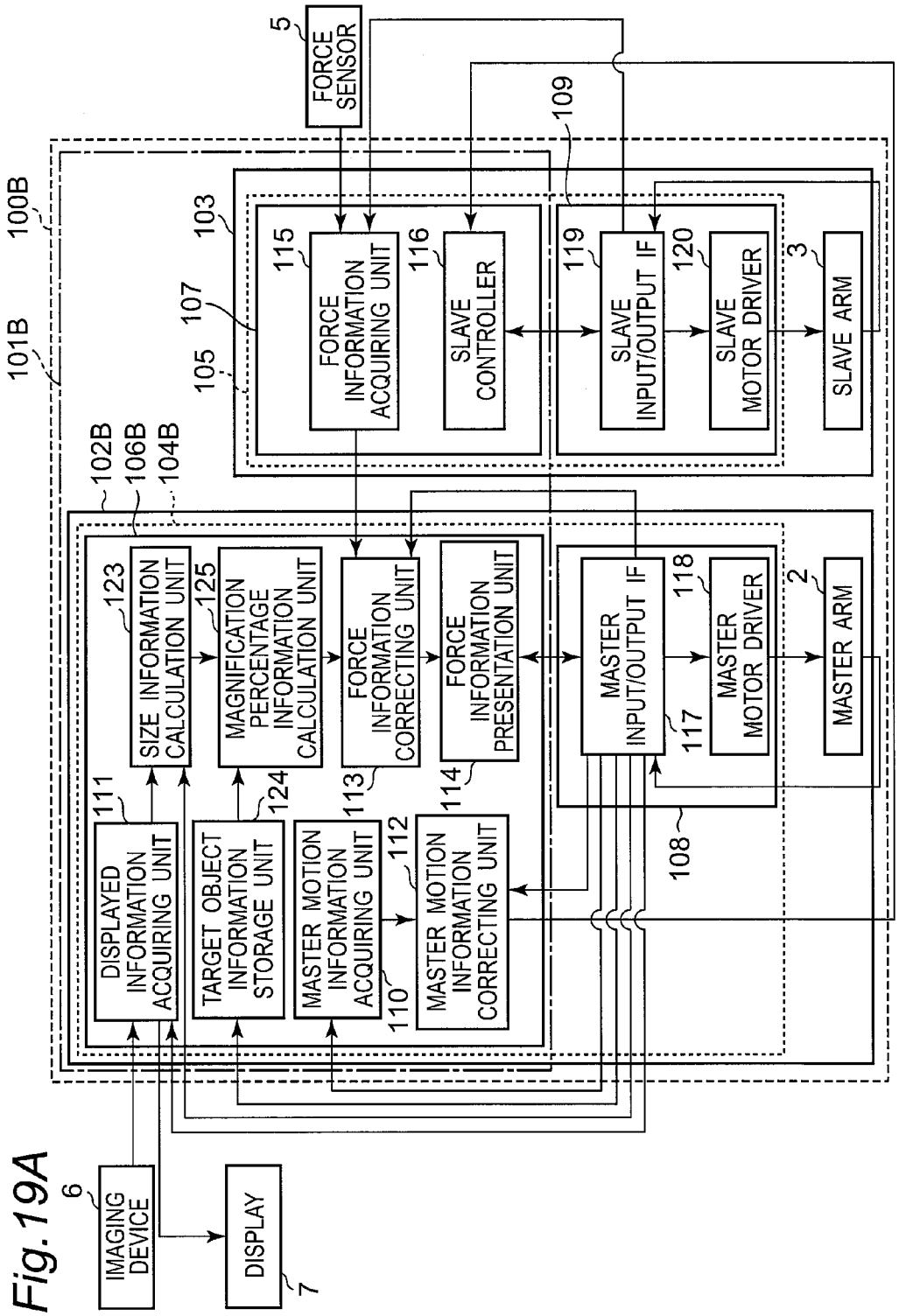
FIG. 19A is a block diagram of a master slave robot according to a second embodiment of the present disclosure.

Schematically described is a master slave robot 100B including a control apparatus 101B for the master slave robot 100B according to the second embodiment of the present disclosure. FIG. 19A is a block diagram of the master slave robot 100B according to the second embodiment of the present disclosure. According to the second embodiment of the present disclosure, the master arm 2 and the master peripheral device 108, as well as the master motion information acquiring unit 110, the displayed information acquiring unit 111, the master motion information correcting unit 112, the force information correcting unit 113, and the force information presentation unit 114 in a master control apparatus 106B included in a master robot 102B, and the slave robot 103 are configured similarly to those of the first embodiment. These common portions are denoted by the common reference signs and are not described repeatedly, and only different portions (a size information calculation unit 123, a target object information storage unit 124, and a magnification percentage information calculation unit 125) are to be detailed below. The control apparatus 101B for the master slave robot 100B includes the slave control apparatus main body 107 and a master control apparatus main body 106B, and controls motion of each of the slave arm 3 and the master arm 2. The master robot 102B includes the master arm 2 and a control apparatus 104B for the master arm 2.

(Size Information Calculation Unit 123)

The size information calculation unit 123 receives imaged picture information and time information from the displayed information acquiring unit 111. The size information calculation unit 123 calculates size information on each of the fine component 8 and the insertion port 9 on the screen of the display 7 from the displayed information thus acquired.

Described below is how the size information calculation unit 123 calculates size information. In this case, the size information calculation unit 123 measures (calculates) size information on an on-screen target object through picture processing. In order to measure (calculate) size information, the size information calculation unit 123 measures (calculates) length information or area information on the on-screen target object. The operator 1 inputs selection of length information or area information through the master input/output IF 117 to the size information calculation unit 123. Length information includes lengths A and B of sides of the fine component 8 and lengths C and D of sides of the insertion port 9 on the screen illustrated in FIG. 20. Area information includes areas of the fine component 8 and the insertion port 9 on the screen.

Figures 20, 21:
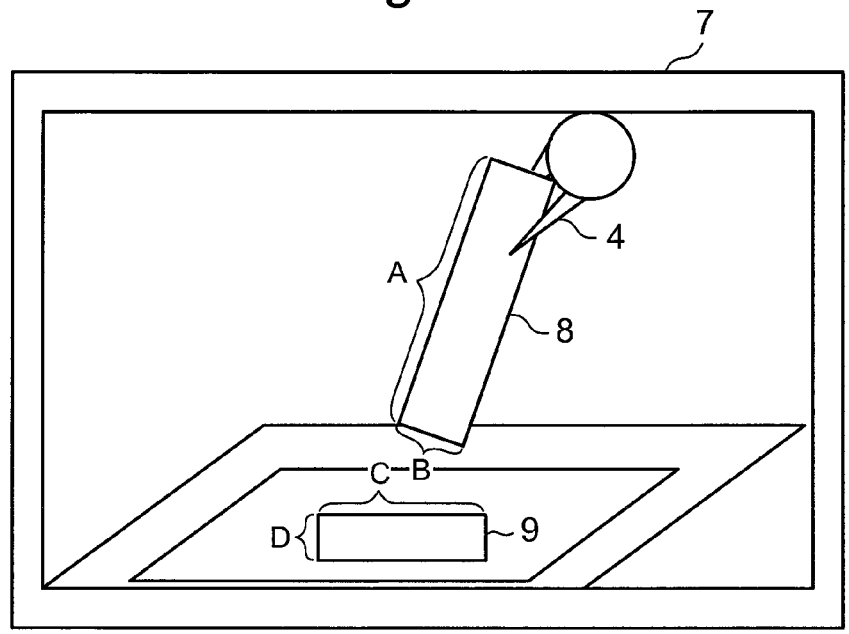
FIG. 20 is an explanatory view of size information on the master slave robot according to the second embodiment of the present disclosure.
FIG. 21 is a view showing data exemplifying size information and time information on the master slave robot according to the second embodiment of the present disclosure.

FIG. 21 exemplifies size information and time information.

The size information calculation unit 123 transmits the size information thus calculated and time information, to the magnification percentage information calculation unit 125.

(Target Object Information Storage Unit 124)

The target object information storage unit 124 stores actual size information on each of the fine component 8 and the insertion port 9 as target object information. The operator 1 inputs actual size information through the master input/output IF 117 to the target object information storage unit 124. FIG. 22A exemplifies target object information. The target object information storage unit 124 transmits target object information to the magnification percentage information calculation unit 125.

Figure 19B:
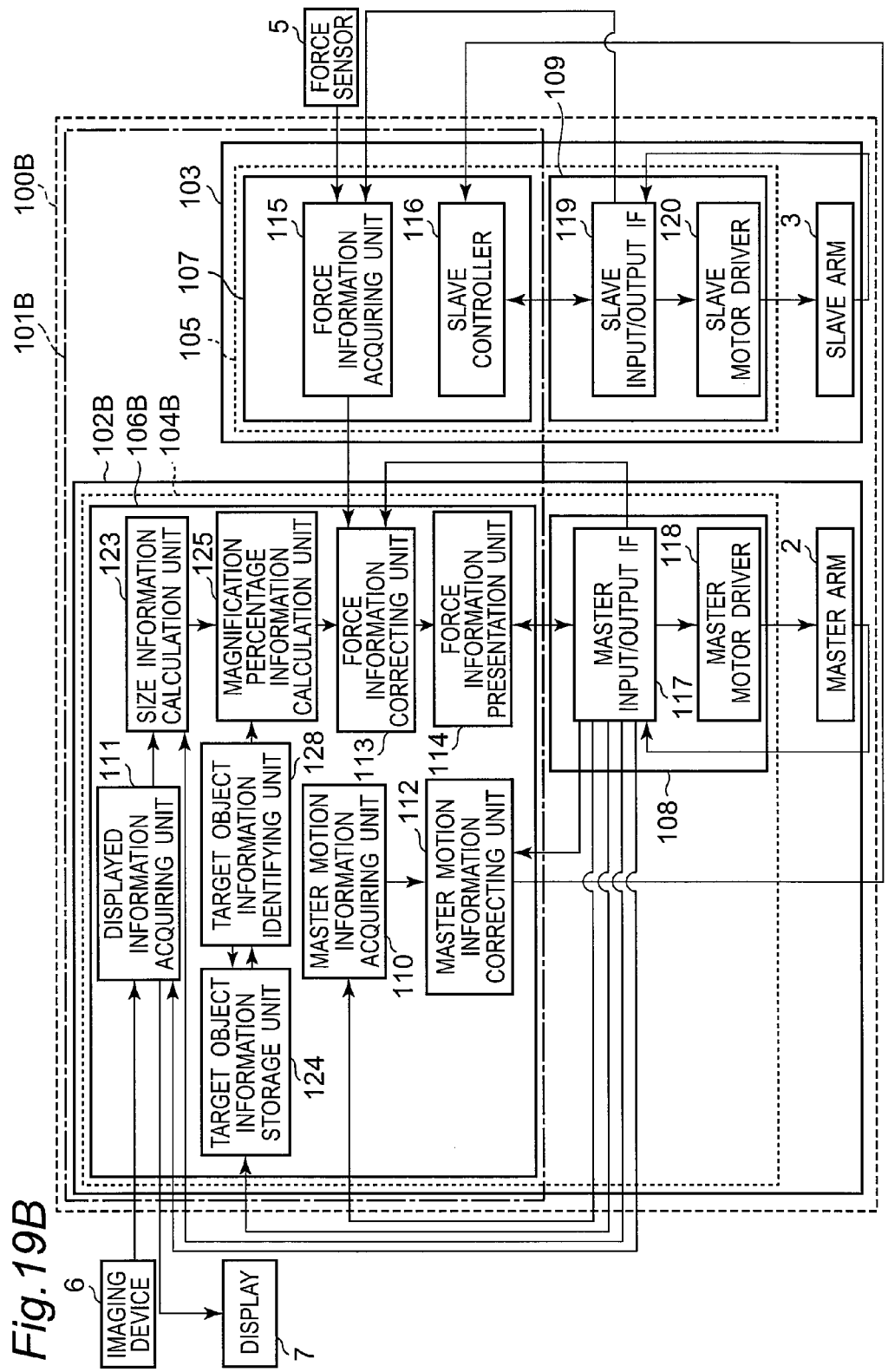
FIG. 19B is a block diagram of a master slave robot according to a second embodiment of the present disclosure.

The target object information storage unit 124 can possibly store a plurality of target object information pieces. This applies to a case where there are a plurality of components or insertion ports as indicated in FIG. 22B. As shown in the block diagram in FIG. 19B, a target object information identifying unit 128 is provided between the target object information storage unit 124 and the magnification percentage information calculation unit 125.

The target object information identifying unit 128 identifies a single component being used among a plurality of target object information pieces stored in the target object information storage unit 124, and transmits the target object information on the identified component to the magnification percentage information calculation unit 125. The target object information identifying unit 128 identifies a component in an identification method with a type number of the used component, with a bar code that is provided to the component and is read by a bar code reader, or the like. The target object information identifying unit 128 can identify the insertion port 9 of the instrument 10 in an identification method similar to that for the component.

(Magnification Percentage Information Calculation Unit 125)

The magnification percentage information calculation unit 125 receives size information and time information from the size information calculation unit 123 and length information or area information as target object information from the target object information storage unit 124. The magnification percentage information calculation unit 125 calculates magnification percentage information from the size information and the length information or the area information as the target object information thus acquired. According to a method of calculating magnification percentage information, the magnification percentage information calculation unit 125 calculates magnification percentage information by dividing the size information acquired from the size information calculation unit 123 by the length information or the area information as the target object information corresponding to the size information. In the example with the size information indicated in FIG. 21 and the length information or the area information as target object information indicated in FIG.

22A, the magnification percentage information calculation unit 125 obtains magnification percentage information 6.25 by dividing the fine component area 125 mm² as the size information in FIG. 21 by the fine component area 20 mm² exemplifying the area information as the target object information in FIG. 22A.

FIGS. 23A and 23B each exemplify magnification percentage information and time information.

The magnification percentage information calculation unit 125 transmits the magnification percentage information thus calculated and the time information, to the force information correcting unit 113.

When the magnification percentage information calculation unit 125 receives identification information from the target object information identifying unit 128, the magnification percentage information calculation unit 125 acquires information on a desired component or insertion port 9 from the target object information storage unit 124 in accordance with the identification information. In this case, the target object information from the target object information storage unit 124 is transmitted to the magnification percentage information calculation unit 125 by way of the target object information identifying unit 128.

<Flowchart>

Figure 24:
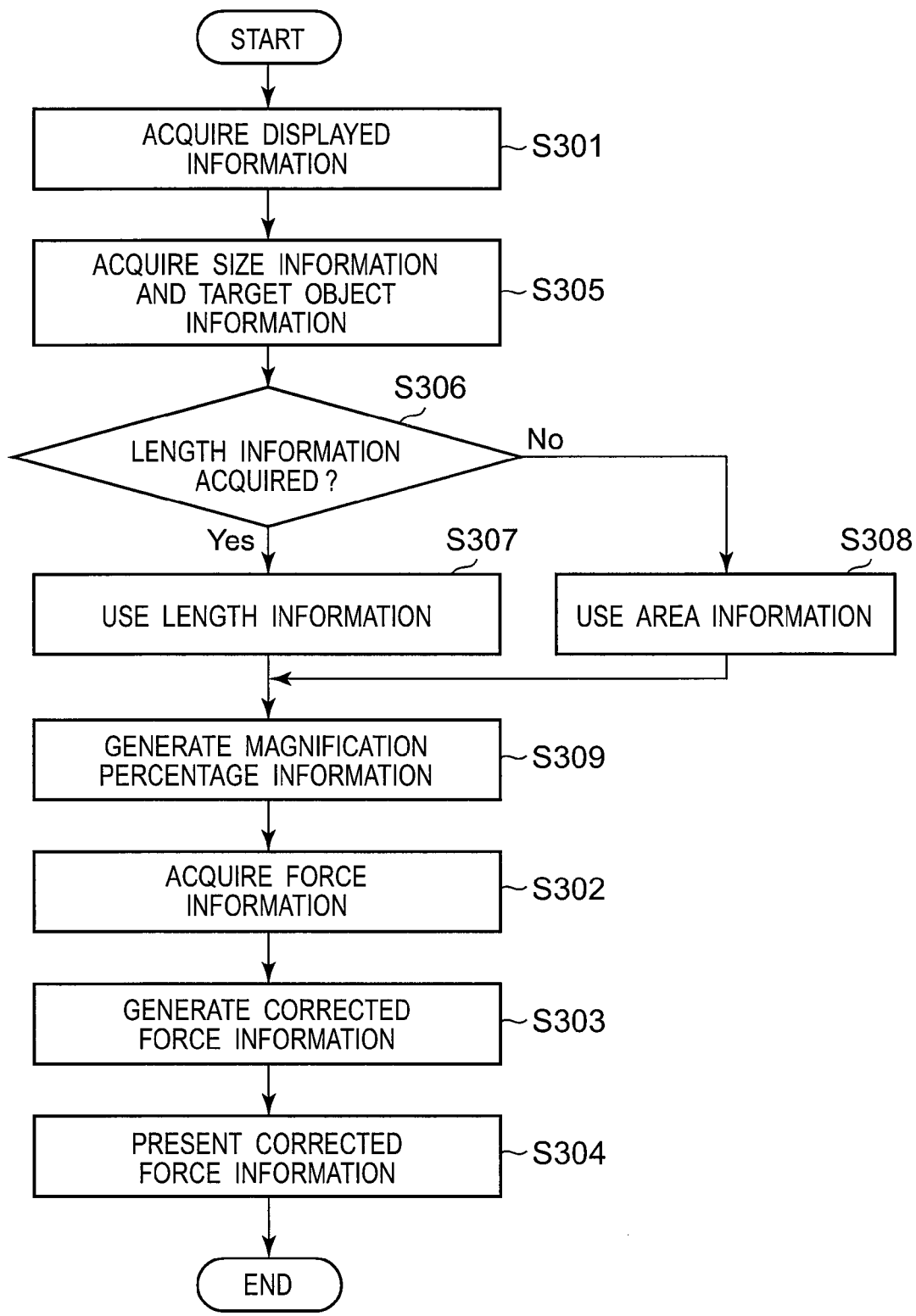
FIG. 24 is a flowchart of a force correction procedure of the master slave robot according to the second embodiment of the present disclosure.

An operation procedure of the master slave robot 100B according to the second embodiment is described with reference to the flowchart in FIG. 24.

Exemplary operation of the master slave robot 100B according to the second embodiment is partially similar to the operation illustrated in FIG. 16. Described with reference to FIG. 24 are force information acquisition in step S204, corrected force information generation in step S205, and force presentation in step S206 in the flowchart in FIG. 16.

Initially in step S301, the displayed information acquiring unit 111 acquires displayed information. The flow then proceeds to step S305.

Then, in step S305, the size information calculation unit 123 calculates size information and acquires target object information from the target object information storage unit 124. The flow then proceeds to step S306.

Then, in step S306, the magnification percentage information calculation unit 125 selects whether or not to use length information for calculating magnification percentage information from the size information acquired from the size information calculation unit 123 and the target object information acquired from the target object information storage unit 124. The flow proceeds to step S307 if the length information is used, whereas the flow proceeds to step S308 if not the length information but area information is used.

Then, in step S307, the magnification percentage information calculation unit 125 acquires, from the size information calculation unit 123, length information of the target object information corresponding to the acquired size information. The flow then proceeds to step S309.

Then, in step S308, the magnification percentage information calculation unit 125 acquires, from the size information calculation unit 123, area information of the target object information corresponding to the acquired size information. The flow then proceeds to step S309.

Then, in step S309, the magnification percentage information calculation unit 125 calculates magnification percentage information by dividing the size information by the length information or the area information of the target object information. The flow then proceeds to step S302.

Then, in step S302, the force information acquiring unit 115 acquires force information from the force sensor 5. The flow then proceeds to step S303.

Then, in step S303, the force information correcting unit 113 multiplies the force information acquired from the force information acquiring unit 115 and the magnification percentage information acquired from the magnification percentage information calculation unit 125 to generate corrected force information that is corrected to match on-screen information. The flow then proceeds to step S304.

Then, in step S304, the force information presentation unit 114 generates a command value for the master arm 2 in accordance with the corrected force information acquired from the force information correcting unit 113, and causes the master arm 2 to present force by way of the master input/output IF 117 and the master motor driver 118 so that the force is presented to the operator 1.

Effects of Second Embodiment

Magnification percentage information at the imaging device 6 is not used directly, but the magnification percentage information calculation unit 125 calculates magnification percentage information from size information on an on-screen target object and size information on an actual target object, resulting in being applicable to a case where appearance of the on-screen target object varies due to a position and an orientation of the imaging device 6. The operator 1 can thus perform a task accurately.

Third Embodiment

The first and second embodiments enable operation according to a magnification percentage by correction of force information. The third embodiment enables operation according to a magnification percentage by correction of force information on force to be fed back as well as correction of motion information.

Figure 25:
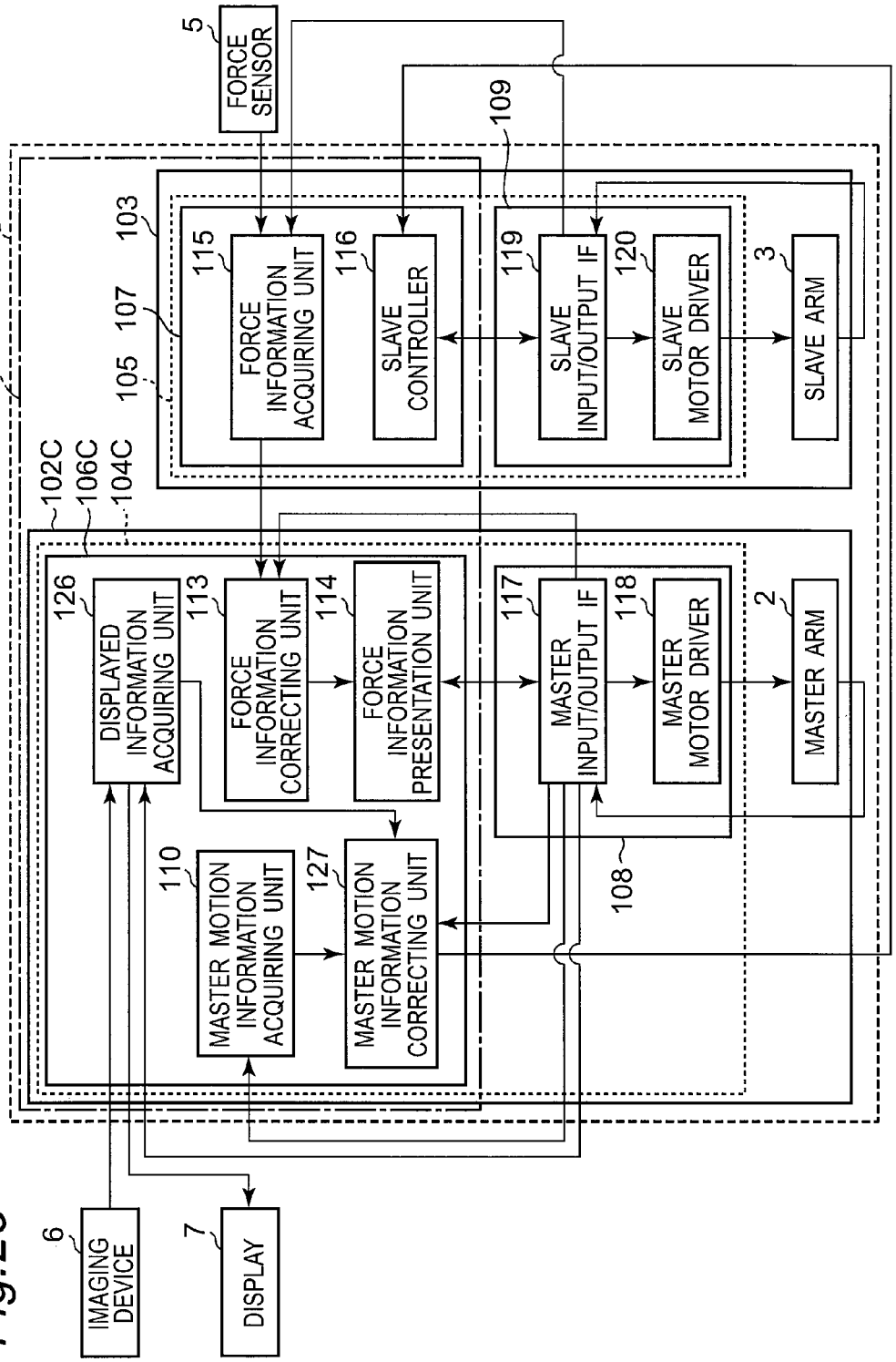
FIG. 25 is a block diagram of a master slave robot according to a third embodiment of the present disclosure.

Schematically described is a master slave robot 100C including a control apparatus 101C for the master slave robot 100C according to the third embodiment of the present disclosure. FIG. 25 is a block diagram of the master slave robot 100C according to the third embodiment of the present disclosure. According to the third embodiment of the present disclosure, the master arm 2 and the master peripheral device 108, as well as the master motion information acquiring unit 110, the force information correcting unit 113, and the force information presentation unit 114 in a master control apparatus 106C included in a master robot 102C, and the slave robot 103 are configured similarly to those of the first embodiment. These common portions are denoted by the common reference signs and are not described repeatedly, and only different portions (a displayed information acquiring unit 126 and a master motion information correcting unit 127) are to be detailed below. The control apparatus 101C for the master slave robot 100C includes the slave control apparatus main body 107 and a master control apparatus main body 106C, and controls motion of each of the slave arm 3 and the master arm 2. The master robot 102C includes the master arm 2 and a control apparatus 104C for the master arm 2.

A method of correcting force information on force to be fed back by the force information correcting unit 113 is also similar to that of the first embodiment. Detailed below is an additional method of correcting motion information.

(Displayed Information Acquiring Unit 126)

The displayed information acquiring unit 126 replaces the displayed information acquiring unit 111 according to the first embodiment and is included in the control apparatus 104C. The displayed information acquiring unit 111 according to the first embodiment transmits acquired magnification percentage information and time information to the force information correcting unit 113, whereas the displayed information acquiring unit 126 transmits acquired magnification percentage information and time information to the master motion information correcting unit 127.

(Master Motion Information Correcting Unit 127)

The master motion information correcting unit 127 replaces the master motion information correcting unit 112 according to the first embodiment and is included in the control apparatus 104C. In addition to the functions of the master motion information correcting unit 112 according to the first embodiment, the master motion information correcting unit 127 has a function of correcting master motion information in accordance with magnification percentage information.

The master motion information correcting unit 127 receives magnification percentage information and time information from the displayed information acquiring unit 126, as well as master motion information and time information from the master motion information acquiring unit 110. The master motion information correcting unit 127 corrects the master motion information in accordance with the magnification percentage information acquired from the displayed information acquiring unit 126. According to a method of correcting master motion information, the master motion information correcting unit 127 divides master motion information acquired from the master motion information acquiring unit 110 by magnification percentage information acquired from the master motion information acquiring unit 110 and multiplies the obtained value and a gain. The Master motion information correcting unit 127 corrects the master motion information in this manner.

Specifically, the master motion information correcting unit 127 corrects the master motion information such that the master motion information is decreased accordingly as the magnification percentage information is larger. This corresponds to the feature that the force information correcting unit 113 according to the first embodiment corrects force information such that the force information is increased accordingly as magnification percentage information is larger. The force information correcting unit 113 according to the first embodiment corrects to increase force information when a magnification percentage is larger. The operator 1 is thus guided to apply equal force to a target object regardless of the magnification percentage. The master motion information correcting unit 127 corrects to decrease master motion information when a magnification percentage is larger, so that force applied to the target object is controlled to be equal regardless of the magnification percentage. Similarly, when the magnification percentage is smaller, the master motion information correcting unit 127 corrects to increase the master motion information so that force applied to the target object is controlled to be equal regardless of the magnification percentage.

According to a method of correcting master motion information, the master motion information correcting unit 127 calculates by dividing the master motion information by magnification percentage information. The master motion information correcting unit 127 multiplies a gain β and information obtained by dividing the master motion information by the magnification percentage information to generate corrected master motion information. The operator 1 can input the gain β through the master input/output IF 117.

<Flowchart>

Figure 26:
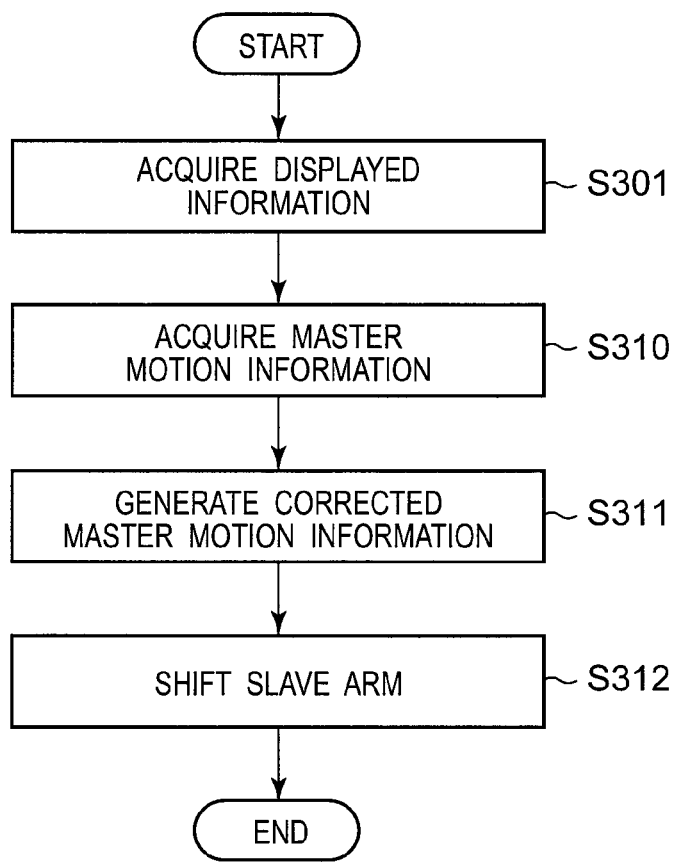
FIG. 26 is a flowchart of a master motion information correction procedure of the master slave robot according to the third embodiment of the present disclosure.

An operation procedure of the master slave robot 100C according to the third embodiment is described with reference to the flowchart in FIG. 26.

Exemplary operation of the master slave robot 100C according to the third embodiment is partially similar to the operation illustrated in FIG. 16. Described with reference to FIG. 26 are manipulation of the master arm by the operator 1 in step S201, corrected master motion information generation in step S202, and shift of the slave arm in step S203 in the flowchart in FIG. 16.

Initially in step S301, the displayed information acquiring unit 126 acquires displayed information. The flow then proceeds to step S310.

Then, in step S310, the master motion information acquiring unit 110 acquires master motion information. The flow then proceeds to step S311.

Then, in step S311, the master motion information correcting unit 127 divides the master motion information acquired from the master motion information acquiring unit 110 by the magnification percentage information to generate corrected master motion information that is corrected to match on-screen information. The flow then proceeds to step S312.

Then, in step S312, the slave controller 116 generates a command value for the slave arm 3 in accordance with the corrected master motion information acquired from the master motion information correcting unit 127. The slave controller 116 transmits the generated command value for the slave arm 3 in each sampling period, to the slave arm 3 by way of the slave input/output IF 119 and the slave motor driver 120. The slave arm 3 thus shifts and performs the task.

Modification Example

Described below is a case where the target object is flexible in a modification example of the third embodiment. This modification example is different from the foregoing embodiments in the correction method by the master motion information correcting unit 127. According to the third embodiment described above, master motion information is corrected to be decreased accordingly as magnification percentage information is larger. Specifically, the master motion information is corrected by dividing the master motion information by the magnification percentage information.

In this case, the master motion information correcting unit 127 corrects master motion information such that the master motion information is increased accordingly as magnification percentage information is larger. Specifically, the master motion information correcting unit 127 multiplies the master motion information and the magnification percentage information to correct the master motion information. This correction solves the problem that the operator 1 regards a flexible target object displayed in a larger size as being deformed larger than actual deformation, determines that the operator 1 applies excessive force, and applies force smaller than necessary for a task. In short, the operator 1 applies force smaller than necessary when a magnification percentage is larger. When the magnification percentage is larger, the control apparatus for the master slave robot according to this modification example controls such that the slave arm 3 is largely shifted for application of necessary force. In contrast, when the magnification percentage is smaller, the control apparatus for the master slave robot according to this modification example controls such that the slave arm 3 is shifted smaller.

Figure 27A:
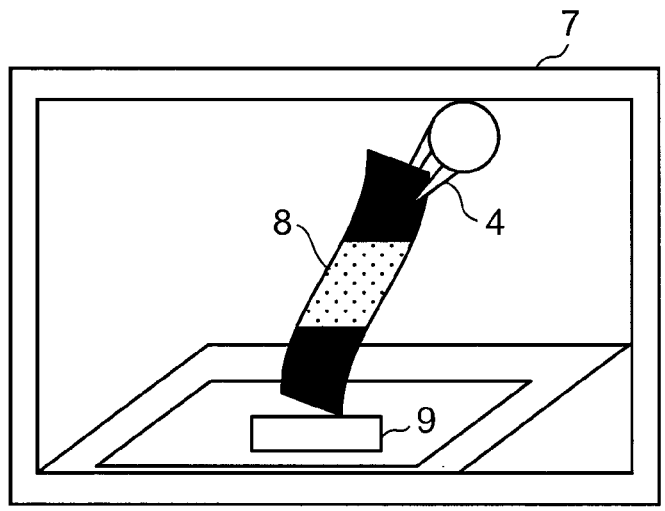
FIG. 27A is an explanatory view of how to correct master motion information on a flexible object in a master slave robot according to a modification example of the third embodiment of the present disclosure.
Figure 27B:
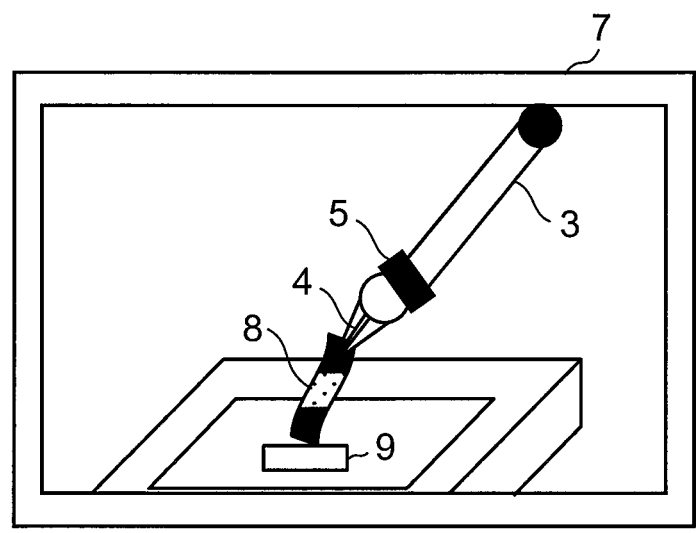
FIG. 27B is an explanatory view of how to correct master motion information on a flexible object in the master slave robot according to the modification example of the third embodiment of the present disclosure.

Such control is described with reference to FIGS. 27A and 27B. FIG. 27A illustrates a case at a large magnification percentage whereas FIG. 27B illustrates a case at a small magnification percentage. The fine component 8 applies actually equal force to the insertion port 9 in FIGS. 27A and 27B, although the operator 1 applies smaller force in FIG. 27A because the fine component 8 is deformed larger in FIG. 27A.

In contrast, the operator 1 applies larger force in FIG. 27B than the force in FIG. 27A. In order that the task is performed with equal force, when the magnification percentage information is larger in FIG. 27A, the master motion information correcting unit 127 corrects master motion information so that the slave arm 3 is shifted larger. When the magnification percentage information is smaller in FIG. 27B, the master motion information correcting unit 127 corrects master motion information so that the slave arm 3 is shifted smaller.

When the target object is flexible and appears not to be deformed on the screen of the display 7, the master motion information correcting unit 127 corrects master motion information such that the master motion information is decreased accordingly as the magnification percentage information is larger. This is because, when the target object is flexible and appears not to be deformed on the screen, there is no change in how the operator 1 senses force due to the deformation but there is only change in how the operator 1 senses force due to prejudice on size.

Effects of Third Embodiment

In addition to correction of force information on force to be fed back, the master motion information correcting unit 127 corrects master motion information. This structure is applicable also to a system that cannot correct force information. Furthermore, control of slave motion easily enables desired operation.

Fourth Embodiment

The first embodiment enables operation according to a magnification percentage by correction of force information on a rigid target object. The fourth embodiment enables operation according to a magnification percentage by correction of force information not on a rigid target object but on a flexible target object.

Figure 28:
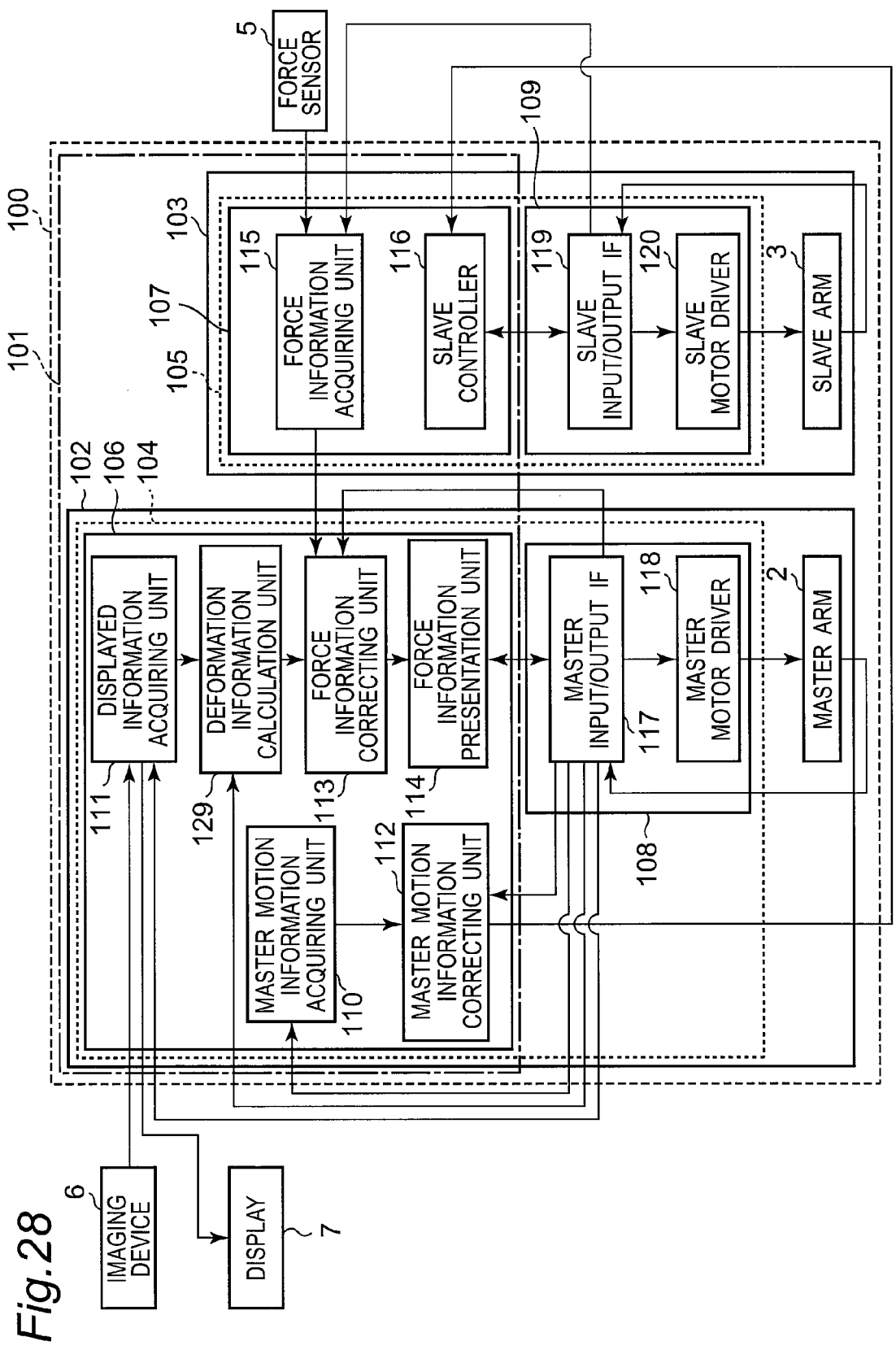
FIG. 28 is a block diagram of a master slave robot according to a fourth embodiment of the present disclosure.

Schematically described is a master slave robot 100D including a control apparatus 101D for the master slave robot 100D according to the fourth embodiment of the present disclosure. FIG. 28 is a block diagram of the master slave robot 100D according to the fourth embodiment of the present disclosure. According to the fourth embodiment of the present disclosure, the master arm 2 and the master peripheral device 108, as well as the master motion information acquiring unit 110, the displayed information acquiring unit 111, the master motion information correcting unit 112, the force information correcting unit 113, and the force information presentation unit 114 in a master control apparatus 106D included in a master robot 102D, and the slave robot 103 are configured similarly to those of the first embodiment. These common portions are denoted by the common reference signs and are not described repeatedly, and only a different portion (a deformation information calculation unit 129) is to be detailed below. The control apparatus 101D for the master slave robot 100D includes the slave control apparatus main body 107 and a master control apparatus main body 106D, and controls motion of each of the slave arm 3 and the master arm 2. The master robot 102D includes the master arm 2 and a control apparatus 104D for the master arm 2.

(Deformation Information Calculation Unit 129)

The deformation information calculation unit 129 receives, from the displayed information acquiring unit 111, imaged picture information, magnification percentage information, imaging device position information, and time information. The deformation information calculation unit 129 detects whether or not a target object is deformed from the imaged picture information thus received. The deformation information calculation unit 129 commands the force information correcting unit 113 not to correct force information when the target object is deformed, and commands the force information correcting unit 113 to correct the force information in accordance with the magnification percentage information when the target object is not deformed.

Described initially is how the deformation information calculation unit 129 detects deformation of a target object. The deformation information calculation unit 129 calculates a deformation amount in accordance with the picture processing technique.

Figure 29A:
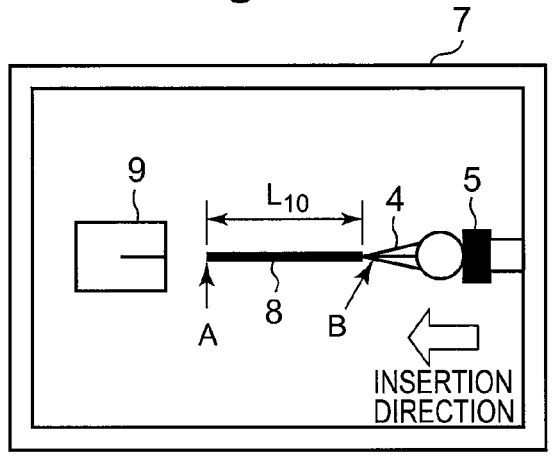
FIG. 29A is an explanatory view of a deformation amount of a fine component in the master slave robot according to the fourth embodiment of the present disclosure.
Figure 29B:
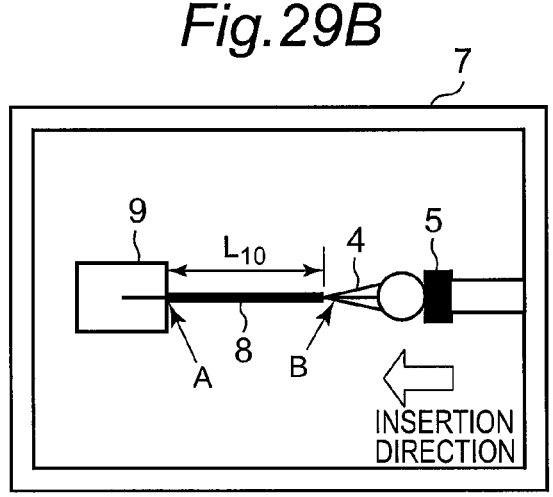
FIG. 29B is an explanatory view of a deformation amount of the fine component in the master slave robot according to the fourth embodiment of the present disclosure.
Figure 29C:
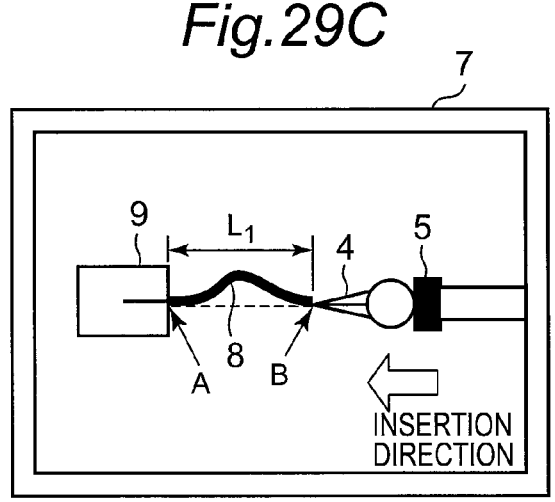
FIG. 29C is an explanatory view of a deformation amount of the fine component in the master slave robot according to the fourth embodiment of the present disclosure.

A task of inserting the fine component 8 as a flexible object is described with reference to FIGS. 29A to 29C. FIGS. 29A to 29C each show the state where the fine component 8 gripped by the hand 4 shifts in an insertion direction and is inserted to the connector 9 on the screen of the display 7. The insertion direction on the pictures projected on the display 7 is rotated by about 90 degrees from FIG. 1 so that deformation of the fine component 8 is visible more easily. FIG. 29A shows a stage where the fine component 8 and the connector 9 are not in contact with each other. FIG. 29B shows a stage where the fine component 8 and the connector 9 come into contact with each other. FIG. 29C shows a stage where the fine component 8 is inserted to the connector 9 and the fine component 8 is warped. The deformation information calculation unit 129 detects end points "A" and "B" of the fine component 8 from the imaged picture information received from the displayed information acquiring unit 111 through picture processing. The deformation information calculation unit 129 detects a distance in the insertion direction between the end point "A" and the end point "B" thus detected. In FIG. 29C, the deformation information calculation unit 129 detects a linear distance $L_1$ indicated by a dashed line from the end point "A" to the end point "B". The deformation information calculation unit 129 detects, as on-screen flexible object deformation information, a change amount from a distance $L_{10}$ in the state where the fine component 8 is not warped, using the detected distance. The deformation information calculation unit 129 needs to calibrate, at the stage of FIG. 29A or 29B, the distance $L_1$ in the insertion direction between the end point "A" and the end point "B" at the stage where the fine component 8 is not warped. Specifically, the deformation information calculation unit 129 stores in an internal storage unit (not shown), as the initial distance $L_{10}$, the distance $L_1$ at the stage of FIG. 29A or 29B.

Figure 30A:
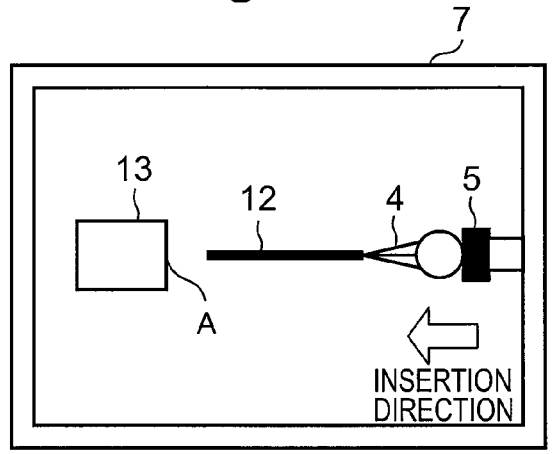
FIG. 30A is an explanatory view of a deformation amount of a flexible receiving object in the master slave robot according to the fourth embodiment of the present disclosure.
Figure 30B:
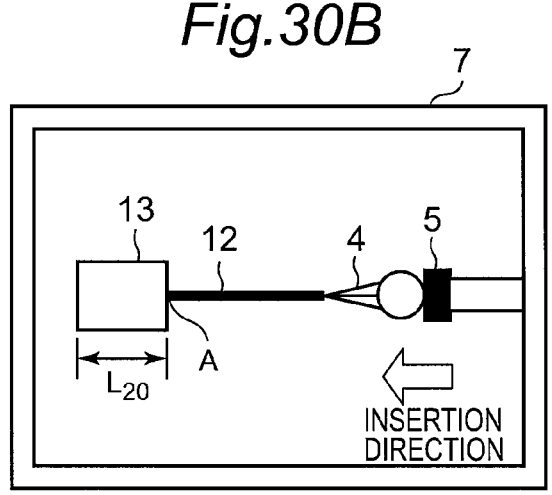
FIG. 30B is an explanatory view of a deformation amount of a flexible receiving object in the master slave robot according to the fourth embodiment of the present disclosure.
Figure 30C:
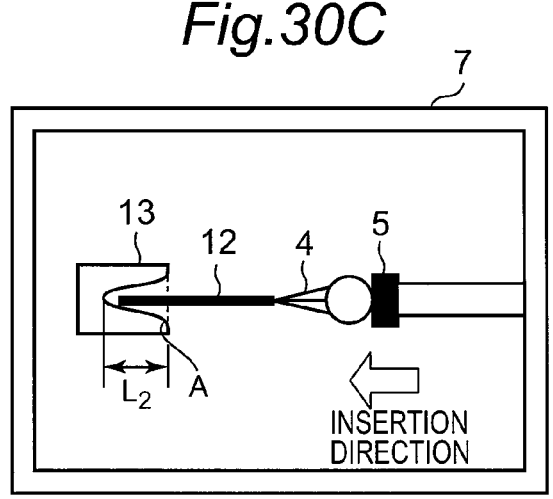
FIG. 30C is an explanatory view of a deformation amount of a flexible receiving object in the master slave robot according to the fourth embodiment of the present disclosure.
Figure 31A:
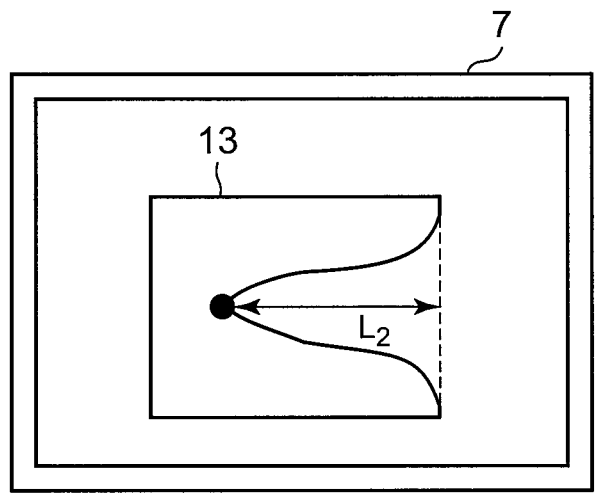
FIG. 31A is an explanatory view exemplifying how to calculate a deformation amount in the master slave robot according to the fourth embodiment of the present disclosure.
Figure 31B:
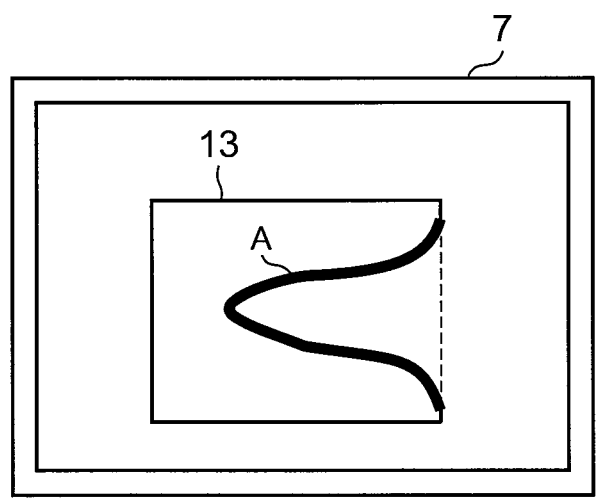
FIG. 31B is an explanatory view exemplifying how to calculate a deformation amount in the master slave robot according to the fourth embodiment of the present disclosure.

Other than the task of inserting the fine component 8, the deformation information calculation unit 129 can calculate also in a case where a target object is rigid and a receiving object is flexible as in a task of inserting a rigid medical instrument to a flexible organ. This case is described with reference to FIGS. 30A to 30C. FIGS. 30A to 30C each show a state where a rigid target object 12 gripped by the hand 4 shifts toward a flexible receiving object 13 in the insertion direction on the screen of the display 7 so as to be inserted to the flexible receiving object 13. The insertion direction on the pictures projected on the display 7 is rotated by about 90 degrees from FIG. 1 so that deformation of the flexible receiving object 13 is visible more easily. FIG. 30A shows a stage where the rigid target object 12 and the flexible receiving object 13 are not in contact with each other. FIG. 30B shows a stage where the rigid target object 12 and the flexible receiving object 13 come into contact with each other. FIG. 30C shows a stage where the rigid target object 12 is inserted to the flexible receiving object 13 and the flexible receiving object 13 is warped. The deformation information calculation unit 129 detects an edge "A" of a surface where the rigid target object 12 is in contact with the flexible receiving object 13 on the screen through picture processing. The deformation information calculation unit 129 measures a deformation distance $L_2$ of the detected edge "A" in the insertion direction. In this case, the deformation information calculation unit 129 measures the deformation distance of a portion in the edge "A" in contact with the rigid target object 12. The deformation information calculation unit 129 detects, as on-screen flexible object deformation information, a change amount from a distance $L_{20}$ at the stage where the flexible receiving object 13 is not warped, using the detected distance. The deformation information calculation unit 129 needs to calibrate, at the stage of FIG. 30A or 30B, the position of the edge "A" in the insertion direction at the stage where the flexible receiving object 13 is not warped. Specifically, the deformation information calculation unit 129 stores in the internal storage unit, as the initial distance $L_{20}$, the distance $L_2$ at the stage of FIG. 30A or 30B. The deformation information calculation unit 129 can measure a distance of the most deformed port ion in the edge "A" or an average value of distances at a deformed portion, according to an alternative method of calculating the measured distance $L_2$. Such a case is described with reference to FIGS. 31A and 31B. The most deformed portion is a portion that has a longest distance from a dashed line to an edge indicated in FIG. 31A, and the distance $L_2$ indicated in this figure is a deformation amount in this case. As to the average value of the distances at the deformed portion, the deformation information calculation unit 129 obtains distances of the edge "A" in FIG. 31B from the dashed line at constant intervals and calculates the average value thereof as a deformation amount.

The deformation information calculation unit 129 can adopt any one of various methods in a case where there are both the distance $L_1$ in FIG. 29C and the distance $L_2$ in FIG. 30C. According to a first one of the methods, the deformation information calculation unit 129 obtains a sum of the distance $L_1$ and the distance $L_2$ as a deformation amount. The deformation information calculation unit 129 calculates a large deformation amount in this method, which is thus effective in a case where the operator 1 performs a task while watching change of each of the distance $L_1$ and the distance $L_2$. According to a second one of the methods, the deformation information calculation unit 129 compares the distance $L_1$ and the distance $L_2$ and uses the larger one as a deformation amount. This method is effective in a case where the operator 1 performs a task while watching the distance having the larger deformation amount. Other than these methods, if the deformation information calculation unit 129 sets a threshold value (e.g. 1 mm) to calculate a deformation amount and the deformation amount does not exceed the threshold value, the deformation information calculation unit 129 can assume the deformation amount as zero while avoiding a measurement error or an estimation error in the calculation of the deformation amount.

The deformation information calculation unit 129 determines whether or not the object is deformed in accordance with the deformation amount calculated in one of the methods described above. In this case, the deformation information calculation unit 129 determines that the object is deformed if the deformation amount is equal to or more than the threshold value (e.g. 10 mm), and determines that the object is not deformed if the deformation amount is less than the threshold value. The operator 1 inputs the threshold value through the master input/output IF 117 to the deformation information calculation unit 129. When the deformation information calculation unit 129 determines that the object is deformed, the deformation information calculation unit 129 transmits, to the force information correcting unit 113, a command value not to correct force information (e.g. magnification percentage information: 1). When the deformation information calculation unit 129 determines that the object is not deformed, the deformation information calculation unit 129 transmits, to the force information correcting unit 113, magnification percentage information acquired from the displayed information acquiring unit 111.

This is because the operator 1 cannot perform a task with appropriate force due to prejudice relevant to magnification percentage information as described in the first embodiment when the target object is flexible and appears not to be deformed on the screen of the display 7. In such a case, the force information correcting unit 113 corrects force information such that the force information is increased accordingly as the magnification percentage information is larger, similarly to the first embodiment. In contrast, when the target object is flexible and appears to be deformed on the screen of the display 7, there is no deterioration in work efficiency due to prejudice mentioned above. In such a case, the force information correcting unit 113 does not correct force information such that the force information is increased accordingly as the magnification percentage information is larger.

<Flowchart>

Figure 32:
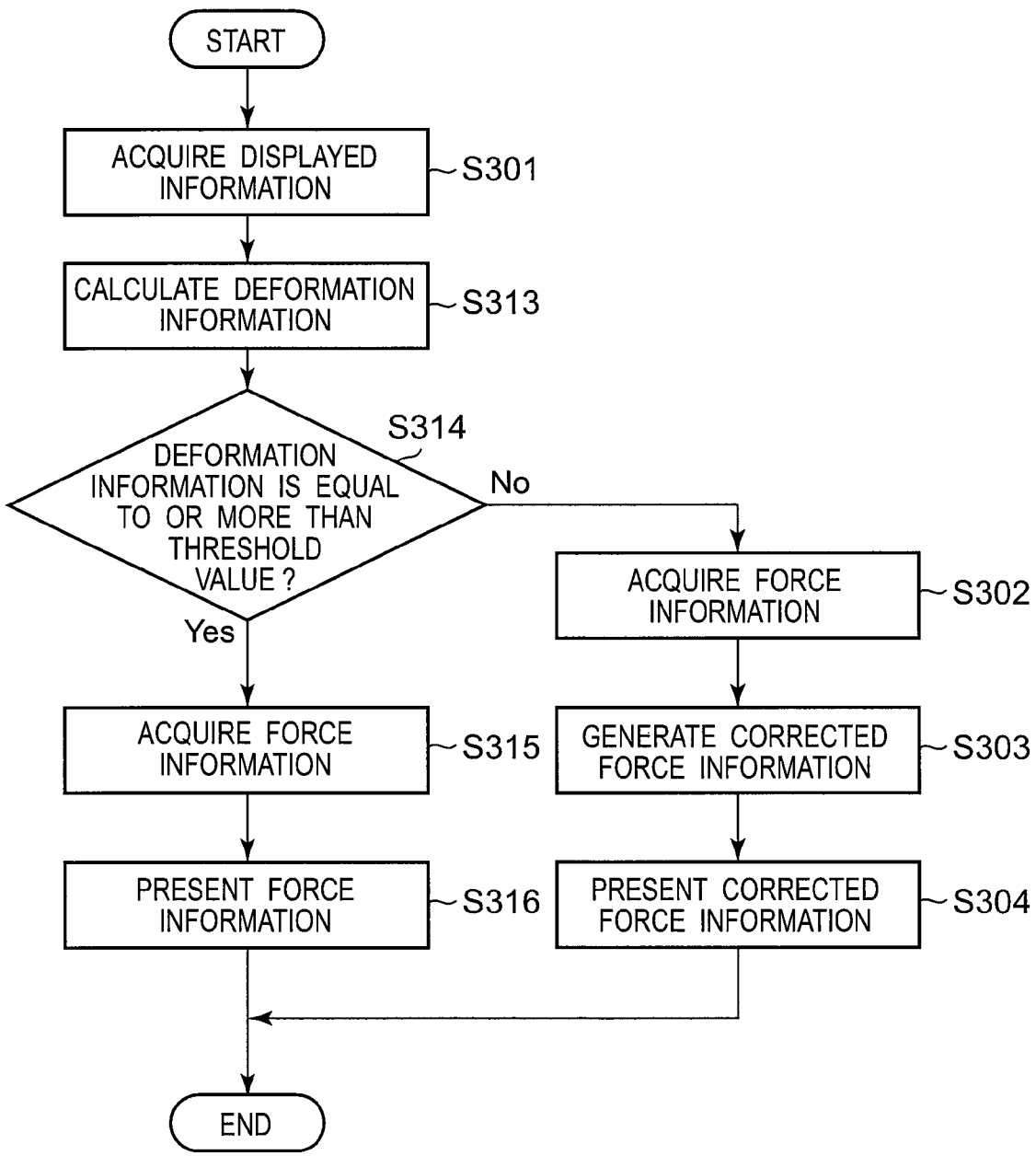
FIG. 32 is a flowchart of a force correction procedure of the master slave robot according to the fourth embodiment of the present disclosure.

An operation procedure of the master slave robot 100D according to the fourth embodiment is described with reference to the flowchart in FIG. 32.

Exemplary operation of the master slave robot 100D according to the fourth embodiment is partially similar to the operation illustrated in FIG. 16. Described with reference to FIG. 32 are force information acquisition in step S204, corrected force information generation in step S205, and force presentation in step S206 in the flowchart in FIG. 16.

Initially in step S301, the displayed information acquiring unit 111 acquires displayed information. The flow then proceeds to step S313.

Then, in step S313, the deformation information calculation unit 129 calculates deformation information. The flow then proceeds to step S314.

Then, in step S314, the deformation information calculation unit 129 compares the deformation information thus calculated and the threshold value. The flow proceeds to step S315 if the deformation information is equal to or more than the threshold value, and the flow proceed to step S302 if the deformation information is less than the threshold value.

Then, in step S315, the force information acquiring unit 115 acquires force information. The flow then proceeds to step S316.

Then, in step S316, the force information presentation unit 114 generates a command value for the master arm 2 in accordance with the acquired force information, and causes the master arm 2 to present force by way of the master input/output IF 117 so that the force is presented to the operator 1.

In contrast, in step S302, the force information acquiring unit 115 acquires force information. The flow then proceeds to step S303.

Then, in step S303, the force information correcting unit 113 multiplies the force information acquired from the force information acquiring unit 115 and the magnification percentage information to generate corrected force information that is corrected to match on-screen information. The flow then proceeds to step S304.

Then, in step S304, the force information presentation unit 114 generates a command value for the master arm 2 by way of the master input/output IF 117 in accordance with the corrected force information acquired from the force information correcting unit 113, and causes the master arm 2 to present force so that the force is presented to the operator 1.

Effects of Fourth Embodiment

When the target object is flexible and appears not to be deformed on the screen, the force information correcting unit 113 corrects force information such that the force information is increased accordingly as magnification percentage information is larger. The operator 1 can thus perform a task accurately.

Either one of the master robot 102 or the slave robot 103 can include each constituent element in the control apparatus according to the present disclosure.

Fifth Embodiment

In the first embodiment, the force information correcting unit 113 corrects force information in accordance with magnification percentage information at the imaging device 6 acquired from the displayed information acquiring unit 111. In the fifth embodiment, force information is corrected not in accordance with magnification percentage information but in accordance with view angle information at the operator 1 to the display 7. The operator 1 selects one of the magnification percentage information and the view angle information so that force information can be corrected in accordance with the information thus selected. There is thus provided a selector 117a exemplifying the master input/output IF 117, for selecting one of magnification percentage information and view angle information. The selected information can be inputted through the master input/output IF 117 to a force information correcting unit 132. The following embodiment in which view angle information is used assumes that the operator 1 performs a task while being seated on a chair fixed at a position (recommended position) recommended for the display 7.

Figure 35:
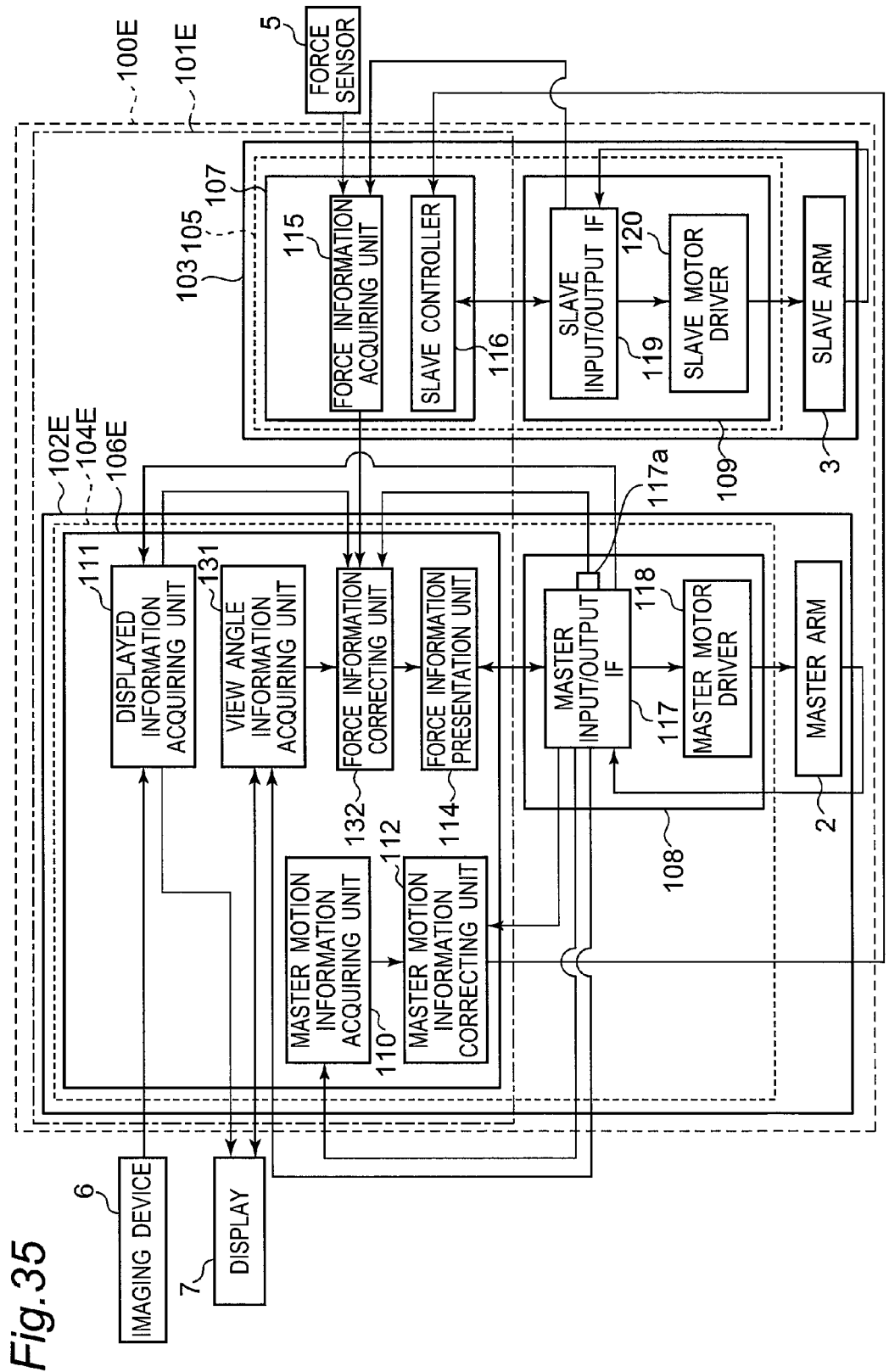
FIG. 35 is a block diagram of a master slave robot according to a fifth embodiment of the present disclosure.

FIG. 35 is a block diagram of a master slave robot 100E including a control apparatus 101E according to the fifth embodiment of the present disclosure. In the master slave robot 100E according to the fifth embodiment of the present disclosure, the master arm 2 and the peripheral device 108, as well as the master motion information acquiring unit 110, the master motion information correcting unit 112, and the force information presentation unit 114 in a control apparatus 104E for the master arm 2 are configured similarly to those of the first embodiment. These common portions are denoted by the common reference signs and are not described repeatedly, and only different portions (a view angle information acquiring unit 131 and the force information correcting unit 132) are to be detailed below. The control apparatus 101E for the master slave robot 100E includes the slave control apparatus main body 107 and a master control apparatus main body 106E, and controls motion of each of the slave arm 3 and the master arm 2. The master robot 102E includes the master arm 2 and the control apparatus 104E for the master arm 2.

(View Angle Information Acquiring Unit 131)

Figure 36:
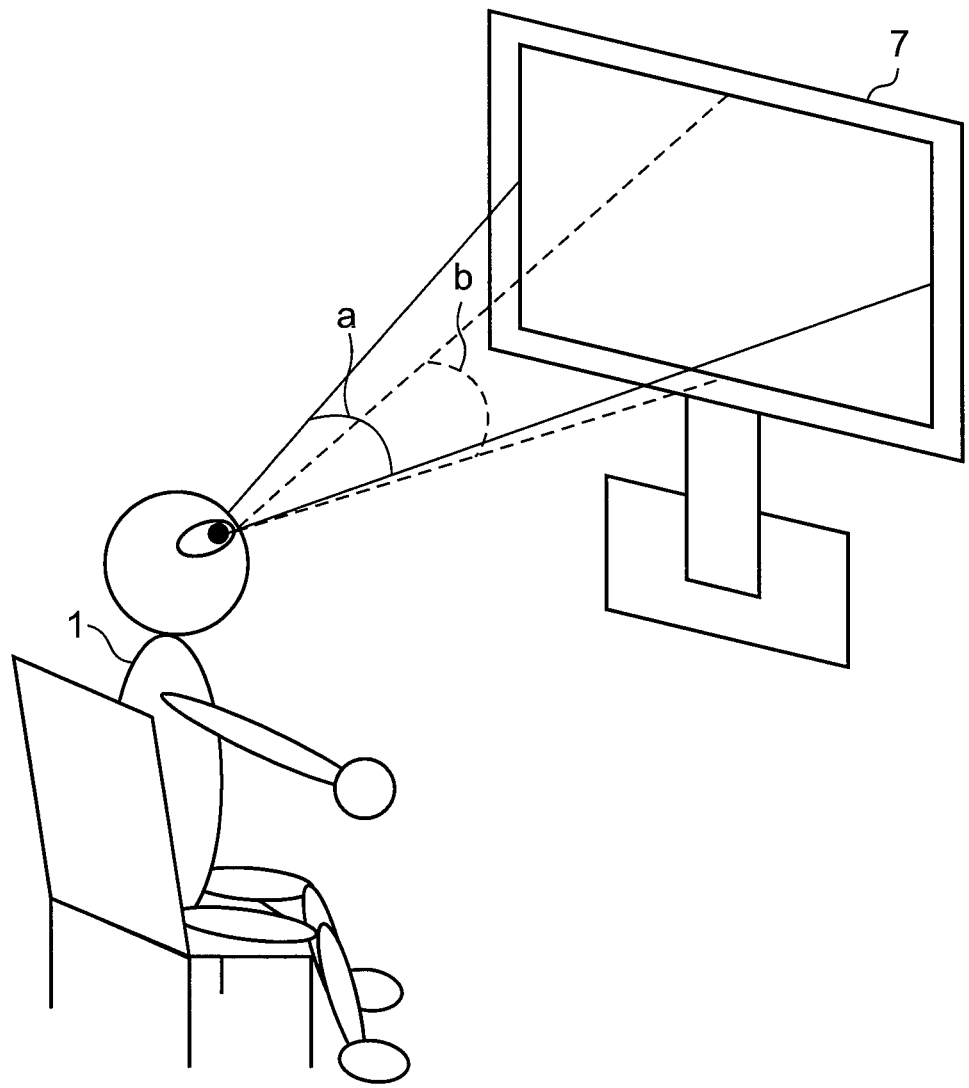
FIG. 36 is an explanatory view of view angle information on the master slave robot according to the fifth embodiment of the present disclosure.

The view angle information acquiring unit 131 acquires view angle information at the operator 1 from the display 7. The view angle information acquiring unit 131 transmits the view angle information thus acquired, to the force information correcting unit 132. The view angle information is described with reference to FIG. 36. The view angle information corresponds to a view angle at the operator 1 to the display 7 in a case where the operator 1 performing a task is watching the display 7. A horizontal view angle is indicated by solid lines having an angle "a" therebetween in FIG. 36. A vertical view angle is indicated by dotted lines having an angle "b" therebetween in FIG. 36. The view angle information acquiring unit 131 acquires, from the display 7 as view angle information, a view angle from a position (recommended position) recommended for the display 7. The operator 1 can alternatively input a view angle from the position recommended for the display 7 through the master input/output IF 117 to the view angle information acquiring unit 131. FIG. 37 is an exemplary view showing data of view angle information. The view angle information acquiring unit 131 transmits the view angle information thus acquired, to the force information correcting unit 132.

(Force Information Correcting Unit 132)

The force information correcting unit 132 has the functions of the force information correcting unit 113 as well as the function of correcting force information acquired by the force information acquiring unit 115 in accordance with view angle information acquired from the view angle information acquiring unit 131 and transmitting force information thus corrected (corrected force information) to the force information presentation unit 114. According to a method of correcting force information in accordance with view angle information, the force information is corrected to be increased accordingly as the view angle information thus acquired is larger. Such correction is performed for the following reason. When a target object appears to be larger, the operator 1 determines that the target object is heavier and harder. This phenomenon is caused by the Charpentier effect, so that the operator 1 regards that a large object is heavy. The operator 1 thus applies larger force more than necessity. Force information is thus corrected to be increased so that the operator 1 is guided to shift the master arm 2 smaller and applies only force necessary for a task.

In a method of correcting force information in accordance with view angle information, the force information correcting unit 132 stores, in an internal storage unit, view angle information as a reference and a force gain value, and the force information correcting unit 132 calculates a difference between the view angle information and the value. For example, assume that as reference values, a horizontal view angle is 60 degrees, a vertical view angle is 30 degrees, and a force gain value is 1.0, and a change rate of the force gain value to the horizontal view angle is set to 0.02/degree. When certain view angle information has a horizontal view angle of 70 degrees and a vertical view angle of 35 degrees, the force gain value is calculated as 1.2 (=1.0+0.02×(70−60)). When other view angle information has a horizontal view angle of 50 degrees and a vertical view angle of 25 degrees, the force gain value is calculated as 0.8 (=1.0+0.02×(50−60)). The force gain value is calculated with reference to the linear relationship in the above example. The force information correcting unit 132 can have a polynomial expression or a table to adopt any one of various calculation methods.

FIG. 38 is an exemplary view showing data of a correlation between view angle information and a force gain value calculated as described above. FIG. 38 exemplifies a case where the operator 1 is replaced with an operator having a different sitting height or a case where the position of the chair is shifted from the recommended position. The force information correcting unit 132 calculates a corrected force amount from view angle information.

Described above is the operation in the case where the force information correcting unit 132 receives view angle information as selected information selected through the master input/output IF 117. In contrast, when the force information correcting unit 132 does not receive view angle information but receives magnification percentage information as selected information selected through the master input/output IF 117, the force information correcting unit 132 calculates a corrected force amount similarly to the force information correcting unit 113 according to the foregoing embodiments. The force information correcting unit 132 transmits the corrected force information thus calculated and time information, to the force information presentation unit 114.

<Flowchart>

Figure 39:
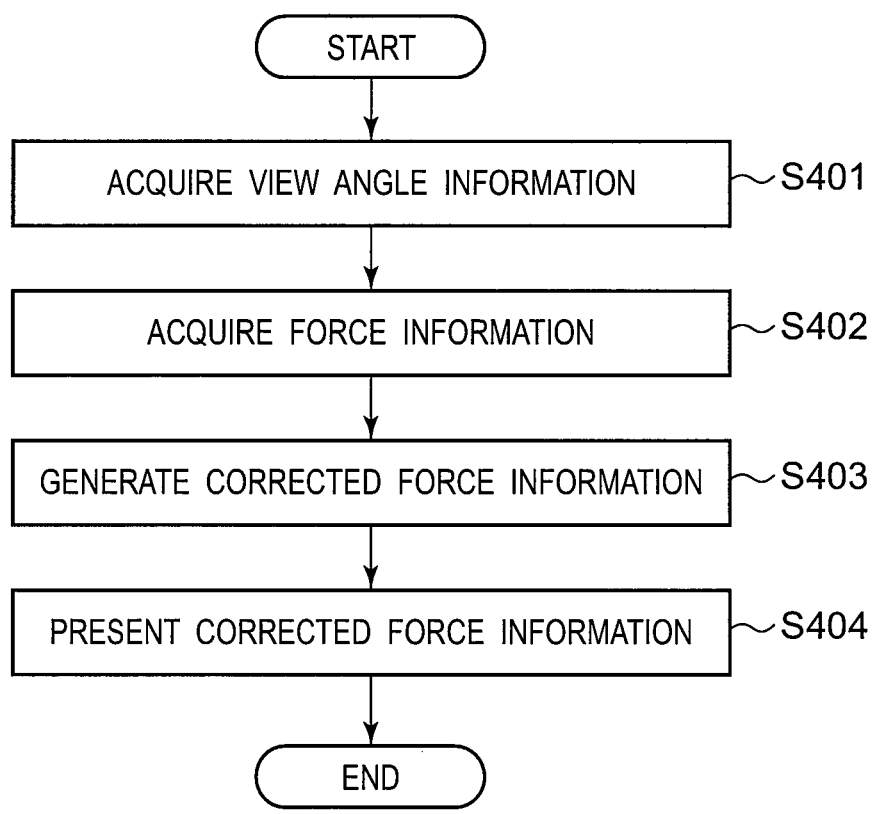
FIG. 39 is a flowchart of a force correction procedure of the master slave robot according to the fifth embodiment of the present disclosure.

An operation procedure of the master slave robot 100E according to the fifth embodiment is described with reference to the flowchart in FIG. 39. Described below is only the case where the force information correcting unit 132 receives view angle information as selected information selected through the master input/output IF 117. The case where the force information correcting unit 132 receives magnification percentage information as selected information selected through the master input/output IF 117 has been described in the first embodiment.

Exemplary operation of the master slave robot 100E according to the fifth embodiment is partially similar to the operation illustrated in FIG. 16. Described with reference to FIG. 39 are force information acquisition in step S204, corrected force information generation in step S205, and force presentation in step S206 in the flowchart in FIG. 16.

Initially in step S401, the view angle information acquiring unit 131 acquires view angle information. The flow then proceeds to step S402.

Then, in step S402, similarly to the step S204 in FIG. 16, the force information acquiring unit 115 acquires force information. The flow then proceeds to step S403.

Then, in step S403, similarly to the step S205 in FIG. 16, the force information correcting unit 132 generates corrected force information from the force information acquired from the force information acquiring unit 115 in accordance with the view angle information acquired from the view angle information acquiring unit 131. The flow then proceeds to step S404.

Then, in step S404, similarly to the step S206 in FIG. 16, the force information presentation unit 114 generates a command value for the master arm 2 in accordance with the corrected force information acquired from the force information correcting unit 132, and causes the master arm 2 to present force by way of the master input/output IF 117 and the master motor driver 118 so that the force is presented to the operator 1.

The series of the operation procedure ends at this stage.

Effects of Fifth Embodiment

The force information correcting unit 132 corrects force information in accordance with view angle information acquired by the view angle information acquiring unit 131. The force information can be thus corrected appropriately even when the position of the operator 1 or the display 7 is shifted, and the task can be performed with accurately applied force.

Sixth Embodiment

According to the fifth embodiment, the view angle information acquiring unit 131 acquires a view angle from a position recommended for the display 7 and the force information correcting unit 132 corrects force information in accordance with the view angle acquired by the view angle information acquiring unit 131. According to the sixth embodiment, view angle information is calculated from position information, orientation information, and size information on the display 7 as well as position information and sight line information on the operator 1 to correct force information.

Figure 40:
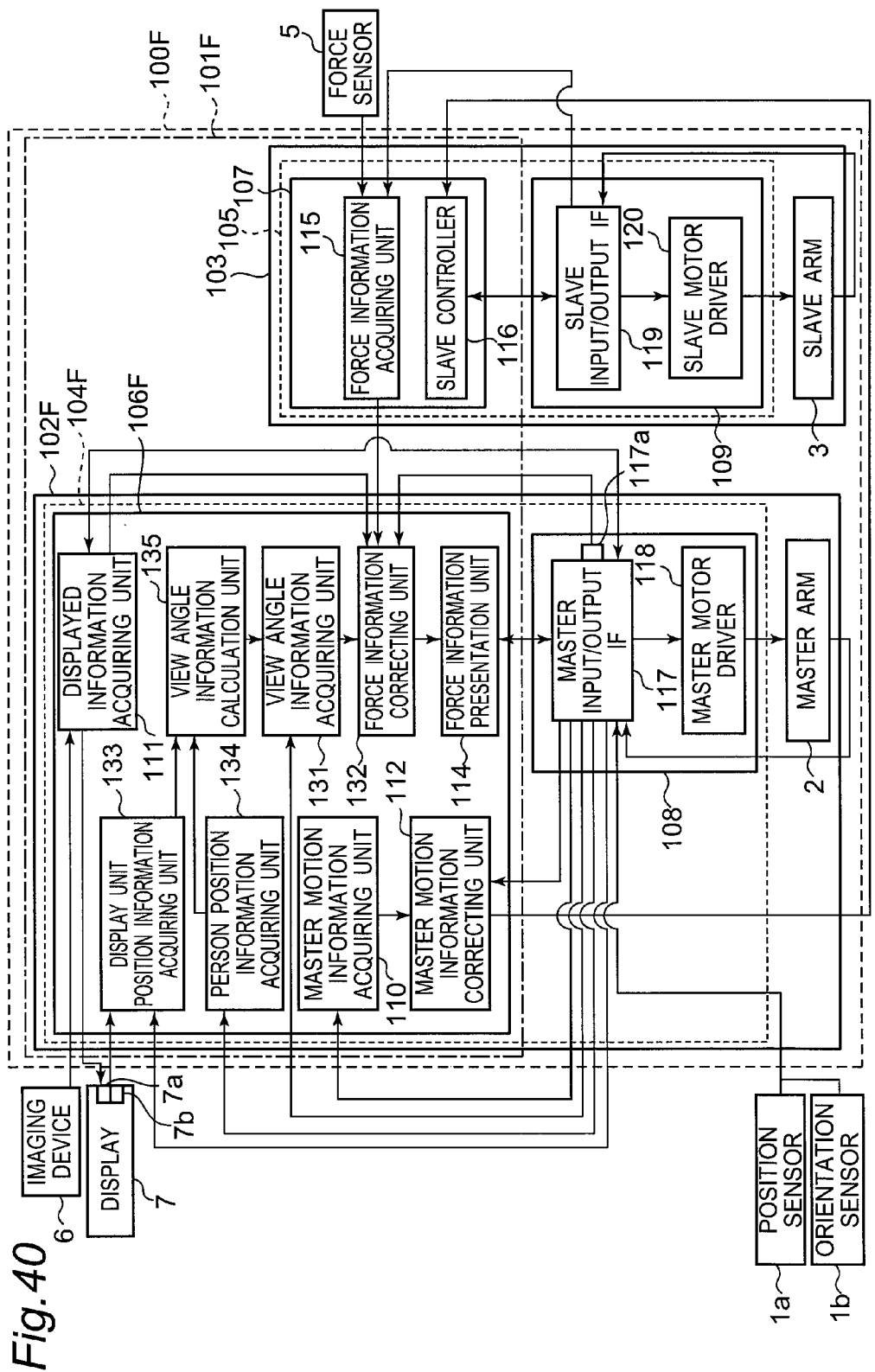
FIG. 40 is a block diagram of a master slave robot according to a sixth embodiment of the present disclosure.

FIG. 40 is a block diagram of a master slave robot 100F including a control apparatus 101F according to the sixth embodiment of the present disclosure. In the master slave robot 100F according to the sixth embodiment of the present disclosure, the master arm 2 and the peripheral device 108, as well as the master motion information acquiring unit 110, the master motion information correcting unit 112, the force information presentation unit 114, the view angle information acquiring unit 131, and the force information correcting unit 132 in a control apparatus 104F for the master arm 2 are configured similarly to those of the fifth embodiment. These common portions are denoted by the common reference signs and are not described repeatedly, and only different portions (a display unit position information acquiring unit 133, a person position information acquiring unit 134, and a view angle information calculation unit 135) are to be detailed below. The control apparatus 101F for the master slave robot 100F includes the slave control apparatus main body 107 and a master control apparatus main body 106F, and controls motion of each of the slave arm 3 and the master arm 2. The master robot 102F includes the master arm 2 and the control apparatus 104F for the master arm 2.

(Display Unit Position Information Acquiring Unit 133)

Figure 41:
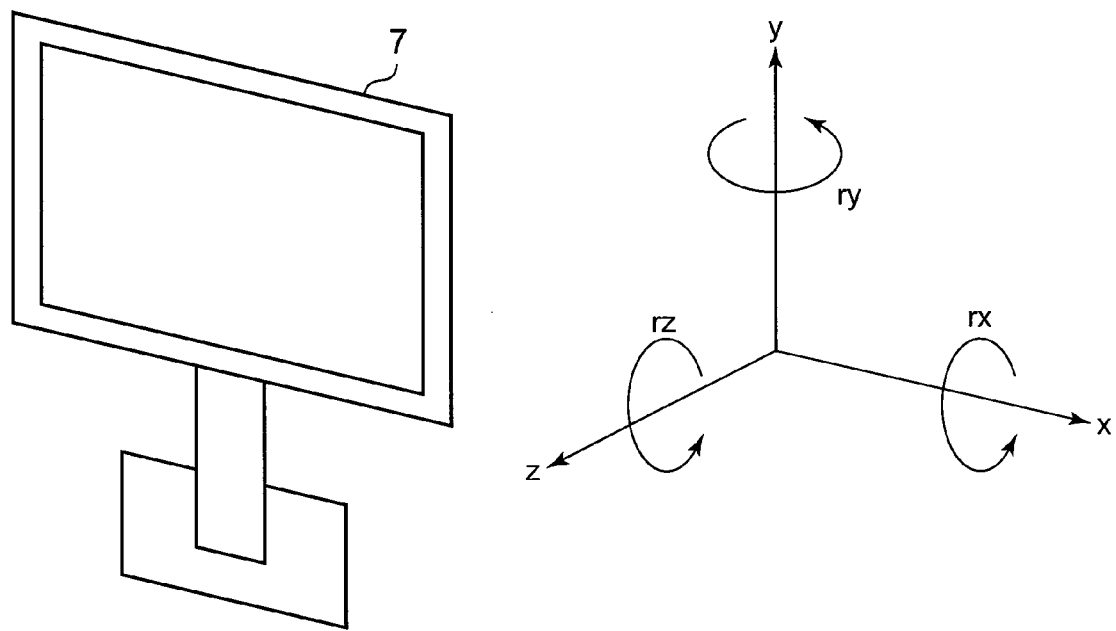
FIG. 41 is an explanatory view exemplifying position information and orientation information on the master slave robot according to the sixth embodiment of the present disclosure.

The display unit position information acquiring unit 133 acquires position information, orientation information, and size information on the display 7 (exemplifying the display unit). Position information and orientation information on the display 7 are acquired from a position sensor 7a and an orientation sensor 7b attached to the display 7. According to an alternative method, the display unit position information acquiring unit 133 can perform picture processing or the like of a picture of the display 7 imaged by an imaging camera or the like, to detect position information and orientation information on the display 7. The position information indicates a position on coordinates defined by an x axis (right and left), a y axis (up and down), and a z axis (front and back) in FIG. 41. The position information is expressed by the unit of millimeter, as one example. The orientation information indicates an orientation in the rotation defined by an x-axis rotation angle $r_x$, a y-axis rotation angle $r_y$, or a z-axis rotation angle $r_z$ in FIG. 41. Each orientation information piece is expressed by the unit of degree, as one example. The display unit position information acquiring unit 133 acquires a size of the display 7 from the display 7. Size information has a horizontal length and a vertical length. Each size information piece is expressed by the unit of millimeter, as one example. The operator 1 can input size information through the master input/output IF 117 to the display unit position information acquiring unit 133. The display unit position information acquiring unit 133 acquires time information from the master input/output IF 117. FIG. 42 exemplifies time information, position information, orientation information, and size information acquired by the display unit position information acquiring unit 133. The display unit position information acquiring unit 133 transmits the time information, the position information, the orientation information, and the size information thus acquired, to the view angle information calculation unit 135.

(Person Position Information Acquiring Unit 134)

The person position information acquiring unit 134 acquires position information and sight line information on the operator 1. The position information on the operator 1 is acquired from a position sensor 1a attached to the operator 1 by way of the master input/output IF 117. According to an alternative method, the person position information acquiring unit 134 can perform picture processing or the like of a picture of the operator 1 imaged by an imaging camera or the like, to detect position of the operator 1. The position information indicates a position on coordinates defined by the x axis (right and left), the y axis (up and down), and the z axis (front and back) in FIG. 41. Position information is expressed by the unit of millimeter, as one example. The sight line information is calculated using a sight line tracker or the like. An orientation sensor 1*b* or the like can be attached to the head of the operator 1, so that the person position information acquiring unit 134 acquires information from the orientation sensor 1*b* by way of the master input/output IF 117 to estimate a sight line from the information and acquire sight line information. The sight line information indicates a sight line in the rotation defined by the x-axis rotation $r_x$, the y-axis rotation $r_y$, or the z-axis rotation $r_z$ in FIG. 41. The sight line information is expressed by the unit of degree, as one example. The person position information acquiring unit 134 acquires time information from the master input/output IF 117. FIG. 43 indicates time information, position information, and sight line information acquired by the person position information acquiring unit 134. The person position information acquiring unit 134 transmits the time information, the position information, and the sight line information thus acquired, to the view angle information calculation unit 135.

(View Angle Information Calculation Unit 135)

The view angle information calculation unit 135 acquires, from the display unit position information acquiring unit 133, time information, as well as position information, orientation information, and size information on the display 7, and acquires, from the person position information acquiring unit 134, time information, as well as position information and sight line information on the operator 1. The view angle information calculation unit 135 calculates view angle information from the acquired information pieces, and transmits the view angle information thus calculated, to the view angle information acquiring unit 131.

According to a method of calculating view angle information, the view angle information calculation unit 135 calculates a distance from the position information on the display 7 acquired from the display unit position information acquiring unit 133 and the position information on the operator 1 acquired from the person position information acquiring unit 134. The view angle information calculation unit 135 subsequently calculates a size of the display 7 in the direction perpendicular to the sight line of the operator 1 from the sight line information on the operator 1 acquired from the person position information acquiring unit 134 as well as the orientation information and the size information on the display 7 acquired from the display unit position information acquiring unit 133. The view angle information calculation unit 135 calculates view angle information indicated in FIG. 36 from the apparent size of the display 7 thus calculated by the view angle information calculation unit 135 and the distance thus calculated by the view angle information calculation unit 135 by obtaining the arctan. The view angle information thus calculated by the view angle information calculation unit 135 is in the form of the information indicated in FIG. 37. The view angle information calculation unit 135 transmits the view angle information thus calculated, to the view angle information acquiring unit 131.

<Flowchart>

Figure 44:
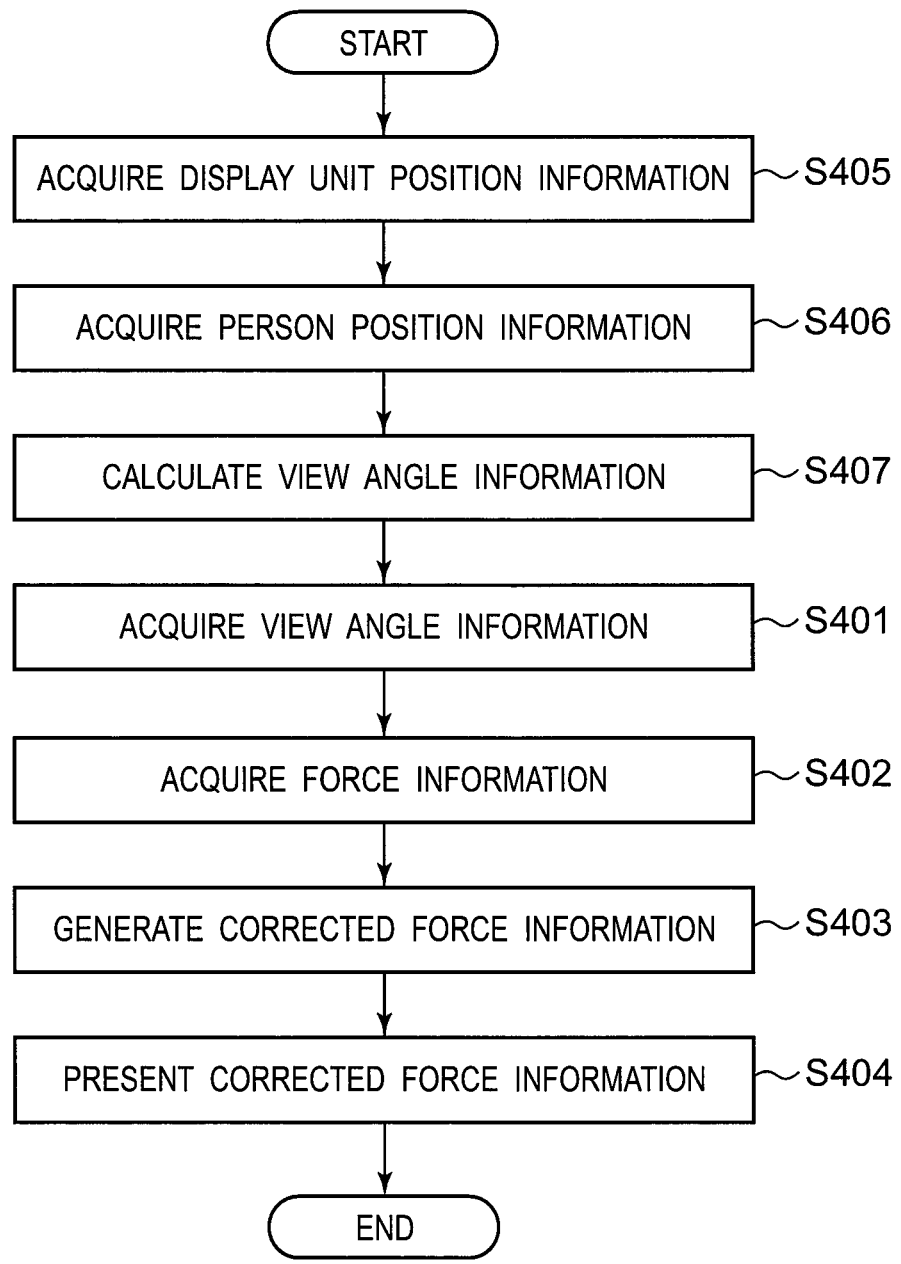
FIG. 44 is a flowchart of a force correction procedure of the master slave robot according to the sixth embodiment of the present disclosure.

An operation procedure of the master slave robot 100F according to the sixth embodiment is described with reference to the flowchart in FIG. 44.

Exemplary operation of the master slave robot 100F according to the sixth embodiment is partially similar to the operation illustrated in FIG. 16. Described with reference to FIG. 44 are force information acquisition in step S204, corrected force information generation in step S205, and force presentation in step S206 in the flowchart in FIG. 16.

Initially in step S405, the display unit position information acquiring unit 133 acquires position information, orientation information, and size information on the display 7. The flow then proceeds to step S406.

Then, in step S406, the person position information acquiring unit 134 acquires position information and sight line information on the operator 1. The flow then proceeds to step S407.

Then, in step S407, the view angle information calculation unit 135 calculates view angle information from the time information as well as the position information, the orientation information, and the size information on the display 7 thus acquired from the display unit position information acquiring unit 133, and the time information as well as the position information and the sight line information on the operator 1 thus acquired from the person position information acquiring unit 134. The flow then proceeds to step S401.

Then, in step S401, the view angle information acquiring unit 131 acquires the view angle information from the view angle information calculation unit 135. The flow then proceeds to step S402.

Then, in step S402, similarly to the step S204 in FIG. 16, the force information acquiring unit 115 acquires force information. The flow then proceeds to step S403.

Then, in step S403, similarly to the step S205 in FIG. 16, the force information correcting unit 132 generates corrected force information from the force information acquired from the force information acquiring unit 115 in accordance with the view angle information acquired from the view angle information acquiring unit 131. The flow then proceeds to step S404.

Then, in step S404, similarly to the step S206 in FIG. 16, the force information presentation unit 114 generates a command value for the master arm 2 in accordance with the corrected force information acquired from the force information correcting unit 132, and causes the master arm 2 to present force by way of the master input/output IF 117 and the master motor driver 118 so that the force is presented to the operator 1.

The series of the operation procedure ends at this stage.

Effects of Sixth Embodiment

The view angle information calculation unit 135 calculates view angle information not from the position recommended for the display 7 but from the actual positions of the display 7 and the operator 1. Force information can be thus corrected appropriately even when the position of the operator 1 or the display 7 is shifted, and the task can be performed with accurately applied force.

Seventh Embodiment

According to the sixth embodiment, the view angle information calculation unit 135 calculates view angle information from a size and position relationship of the display 7. According to the seventh embodiment, view angle information is calculated from a size of the target object projected on the display 7 to correct force information.

Figure 45:
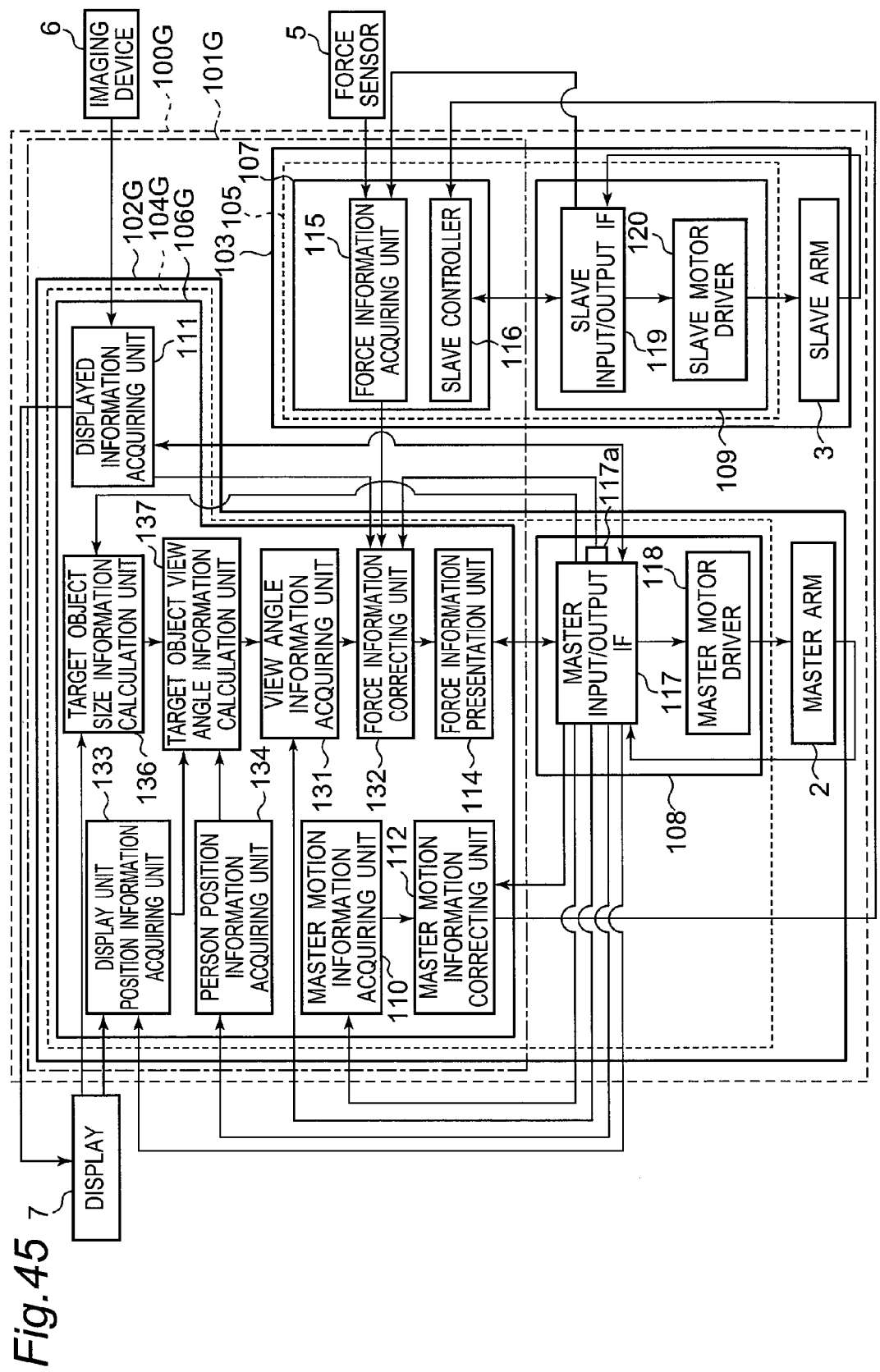
FIG. 45 is a block diagram of a master slave robot according to a seventh embodiment of the present disclosure.

FIG. 45 is a block diagram of a master slave robot 100G including a control apparatus 101G according to the seventh embodiment of the present disclosure. In the master slave robot 100G according to the seventh embodiment of the present disclosure, the master arm 2 and the peripheral device 108, as well as the master motion information acquiring unit 110, the master motion information correcting unit 112, the force information presentation unit 114, the view angle information acquiring unit 131, the force information correcting unit 132, the display unit position information acquiring unit 133, and the person position information acquiring unit 134 in a control apparatus 104G for the master arm 2 are configured similarly to those of the fifth embodiment. These common portions are denoted by the common reference signs and are not described repeatedly, and only different portions (a target object size information calculation unit 136 and a target object view angle information calculation unit 137) are to be detailed below. The control apparatus 101G for the master slave robot 100G includes the slave control apparatus main body 107 and a master control apparatus main body 106G, and controls motion of each of the slave arm 3 and the master arm 2. The master robot 102G includes the master arm 2 and the control apparatus 104G for the master arm 2.

(Target Object Size Information Calculation Unit 136)

The target object size information calculation unit 136 detects a target object from a motion picture projected on the display 7, and transmits size information on the target object thus detected, to the target object view angle information calculation unit 137. According to a detection method, the target object size information calculation unit 136 detects the target object projected on the display 7 through picture processing or the like, and calculates size information (width and length). In an example, the target object size information calculation unit 137 receives target object information (a feature of the target object such as a color, a shape, or an actual size) through the master input/output IF 117 so that the target object is detected more easily. Calculated size information is expressed by the unit of millimeter, as one example. FIG. 46 exemplifies a view showing data of time information and target object size information. The target object size information calculation unit 136 transmits the target object size information thus calculated, to the target object view angle information calculation unit 137.

(Target Object View Angle Information Calculation Unit 137)

The target object view angle information calculation unit 137 acquires time information, as well as position information, orientation information, and size information on the display 7 from the display unit position information acquiring unit 133, acquires time information, as well as position information and sight line information on the operator 1 from the person position information acquiring unit 134, and acquires time information and target object size information from the target object size information calculation unit 136. The target object view angle information calculation unit 137 calculates view angle information from the information pieces thus acquired and transmits the view angle information to the view angle information acquiring unit 131.

The view angle information calculation unit 135 according to the foregoing embodiment refers to size information on the display 7. In contrast, the target object view angle information calculation unit 137 refers to target object size information. Other than the above, the target object view angle information calculation unit 137 calculates view angle information in the similar manner as the calculation by the view angle information calculation unit 135. The target object view angle information calculation unit 137 transmits the view angle information thus calculated, to the view angle information acquiring unit 131.

<Flowchart>

Figure 47:
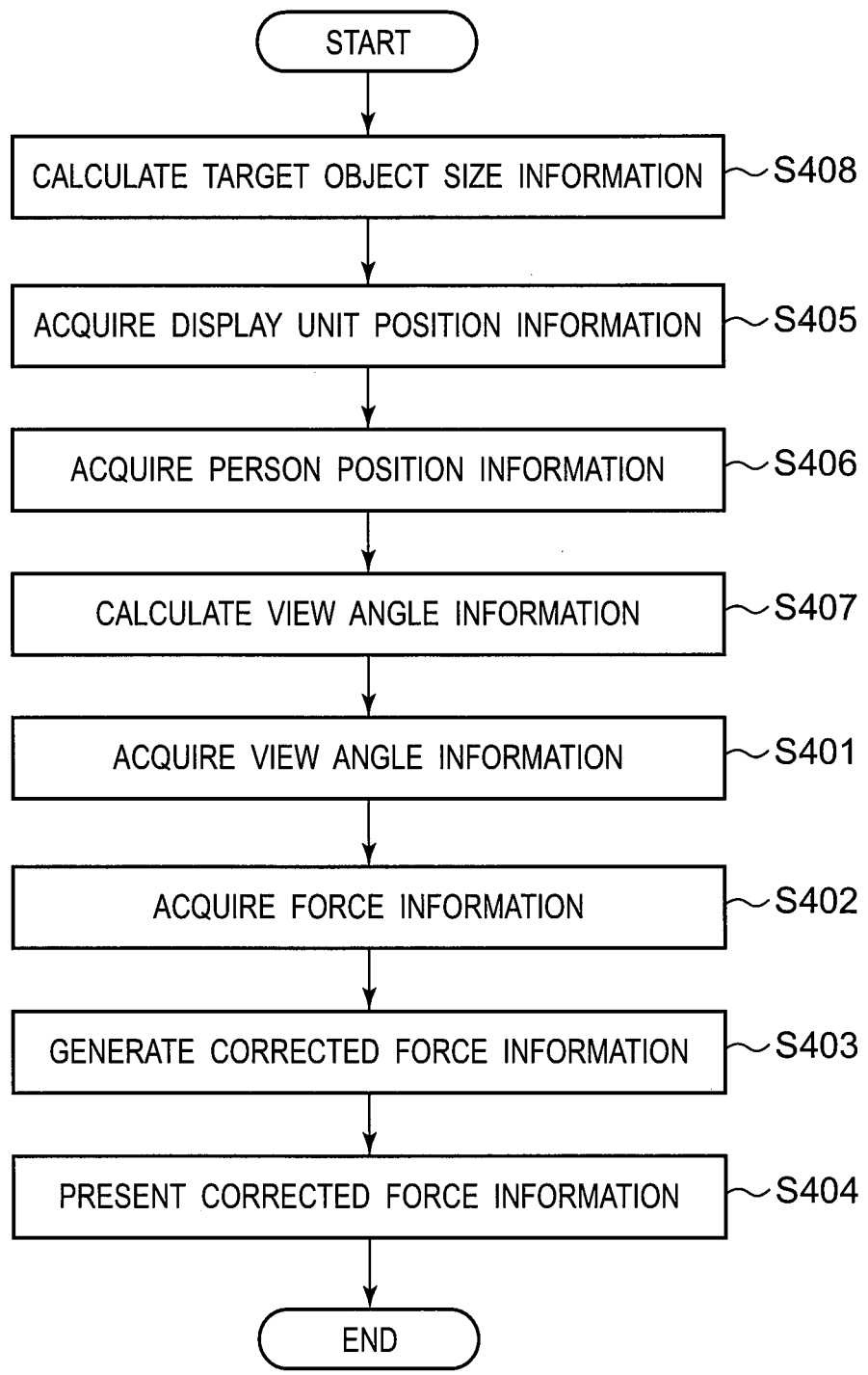
FIG. 47 is a flowchart of a force correction procedure of the master slave robot according to the seventh embodiment of the present disclosure.

An operation procedure of the master slave robot 100G according to the seventh embodiment is described with reference to the flowchart in FIG. 47.

Exemplary operation of the master slave robot 100G according to the seventh embodiment is partially similar to the operation illustrated in FIG. 16. Described with reference to FIG. 47 are force information acquisition in step S204, corrected force information generation in step S205, and force presentation in step S206 in the flowchart in FIG. 16.

Initially in step S408, the target object size information calculation unit 136 calculates size information on the target object projected on the display 7. The flow then proceeds to step S405.

Then, in step S405, the display unit position information acquiring unit 133 acquires position information, orientation information, and size information on the display 7. The flow then proceeds to step S406.

Then, in step S406, the person position information acquiring unit 134 acquires position information and sight line information on the operator 1. The flow then proceeds to step S407.

Then, in step S407, the target object view angle information calculation unit 137 calculates view angle information from the time information as well as the position information, the orientation information, and the size information on the display 7 thus acquired from the display unit position information acquiring unit 133, the time information as well as the position information and the sight line information on the operator 1 thus acquired from the person position information acquiring unit 134, and the time information and the target object size information thus acquired from the target object size information calculation unit 136. The flow then proceeds to step S401.

Then, in step S401, the view angle information acquiring unit 131 acquires the view angle information from the target object view angle information calculation unit 137. The flow then proceeds to step S402.

Then, in step S402, similarly to the step S204 in FIG. 16, the force information acquiring unit 115 acquires force information. The flow then proceeds to step S403.

Then, in step S403, similarly to the step S205 in FIG. 16, the force information correcting unit 132 generates corrected force information from the force information acquired from the force information acquiring unit 115 in accordance with the view angle information acquired from the view angle information acquiring unit 131. The flow then proceeds to step S404.

Then, in step S404, similarly to the step S206 in FIG. 16, the force information presentation unit 114 generates a command value for the master arm 2 in accordance with the corrected force information acquired from the force information correcting unit 132, and causes the master arm 2 to present force by way of the master input/output IF 117 and the master motor driver 118 so that the force is presented to the operator 1.

The series of the operation procedure ends at this stage.

Effects of Seventh Embodiment

The target object view angle information calculation unit 137 calculates view angle information not from the size of the display 7 but from the size of the target object projected on the display 7. Force information can be thus corrected appropriately for the target object of the actual task, and the task can be performed with accurately applied force.

The display 7 described above can be of the type attached to the operator 1, such as a head mount display. The present embodiment can be achieved similarly with such a display.

Though the present disclosure has been described above based on the above first to seventh embodiments, the present disclosure should not be limited to the above-described first to seventh embodiments. For example, the present disclosure also includes the following cases.

Part or entirety of each of the above-described control apparatuses is actually a computer system that includes, for example, a microprocessor, ROM, RAM, hard disk unit, display unit, keyboard, mouse, and the like. A computer program is stored on the RAM or the hard disk unit. Functions of each of the control apparatuses can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory. Here, software that implements a part or entirety of the control apparatus according to each of the above-mentioned embodiments is a following program. That is to say, this program has a computer execute the sections (parts/units) defined in claims. The program has a computer execute the units/steps defined in claims. That is, such a program is a control program for a master slave robot that includes a slave arm that performs an assembly task to a rigid target object and a master arm manipulated by a person who remotely operates the slave arm, the person performing the assembly task using the master slave robot while watching a state of the assembly task imaged by an imaging device and displayed on a display unit, the control program causing a computer to execute the steps of:

acquiring, by a force information acquiring unit, force information on force externally applied to the slave arm;

acquiring, by a displayed information acquiring unit, magnification percentage information on a picture at the display unit displaying the assembly task;

generating, by a force information correcting unit, corrected force information such that the force information acquired from the force information acquiring unit is corrected to be increased accordingly as the magnification percentage information acquired from the displayed information acquiring unit is larger; and presenting, by a force information presentation unit, to the master arm, the corrected force information generated by the force information correcting unit.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiment(s) or modification(s) can be produced.

INDUSTRIAL APPLICABILITY

The control apparatus and the control method for the master slave robot, the robot, the control program for the master slave robot, and the integrated electronic circuit for control of the master slave robot according to the present disclosure enable force presentation according to a picture watched by a person, and are useful as a control apparatus and a control method for a master slave robot, a robot, a control program for the master slave robot, and an integrated electronic circuit for control of the master slave robot for industrial use, domestic use, or medical use.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A control apparatus for controlling a master slave robot to perform an assembly task while a state of the assembly task imaged by an imaging device is displayed on a display unit, the master slave robot including a slave arm and a master arm, the control apparatus comprising:

a slave arm control apparatus that controls operation of the slave arm so as to perform the assembly task to a rigid target object; and a master arm control apparatus that controls operation of the master arm that remotely operates the slave arm when the master slave robot is used, wherein the slave arm control apparatus includes a force information acquiring unit that acquires force information on force externally applied to the slave arm, wherein the master arm control apparatus includes:

a displayed information acquiring unit that acquires magnification percentage information on a picture displayed by the display unit displaying the state of the assembly task;

a force information correcting unit that generates corrected force information such that the force information acquired from the force information acquiring unit is corrected to be increased accordingly as the magnification percentage information acquired from the displayed information acquiring unit is larger;

a force information presentation unit that presents, to the master arm, the corrected force information generated by the force information correcting unit;

a size information calculation unit that (i) calculates length information or area information on the rigid target object displayed in the picture displayed by the display unit from imaged picture information acquired from the displayed information acquiring unit and (ii) outputs the calculated length information or the calculated area information on the rigid target object as size information on the rigid target object displayed in the picture displayed by the display unit;

a magnification percentage information calculation unit that (i) calculates magnification percentage information from the size information received from the size information calculation unit and actual size information on the rigid target object and (ii) transmits the calculated magnification percentage information to the force information correcting unit; and a target object information storage unit that (i) stores the actual size information on the rigid target object and (ii) transmits the actual size information on the rigid target object stored therein to the magnification percentage information calculation unit, wherein the magnification percentage information calculation unit (i) divides the size information (Sd) acquired from the size information calculation unit by the actual size information (Sr) on the rigid target object that is acquired from the target object information storage unit and (ii) transmits a division result (Sd/Sr) to the force information correcting unit as the magnification percentage information, and wherein the force information correcting unit multiplies the magnification percentage information acquired from the size information calculation unit and a correction coefficient to generate the corrected force information.

2. The control apparatus for the master slave robot according to claim 1, wherein the size information calculation unit (i) calculates the length information on the rigid target object displayed in the picture displayed by the display unit and (ii) outputs the length information on the rigid target object as the size information on the rigid target object displayed in the picture displayed by the display unit.

3. The control apparatus for the master slave robot according to claim 1, wherein the size information calculation unit (i) calculates the area information on the rigid target object displayed in the picture displayed by the display unit and (ii) outputs the area information on the rigid target object as the size information on the rigid target object displayed in the picture displayed by the display unit.

4. A control apparatus for controlling a master slave robot to perform an assembly task while a state of the assembly task imaged by an imaging device is displayed on a display unit, the master slave robot including a slave arm and a master arm, the control apparatus comprising:

a slave arm control apparatus that controls operation of the slave arm so as to perform the assembly task to a rigid target object; and a master arm control apparatus that controls operation of the master arm that remotely operates the slave arm when the master slave robot is used, wherein the slave arm control apparatus includes a force information acquiring unit that acquires force information on force externally applied to the slave arm, wherein the master arm control apparatus includes:
a displayed information acquiring unit that acquires magnification percentage information on a picture displayed by the display unit displaying the state of the assembly task;
a force information correcting unit that generates corrected force information such that the force information acquired from the force information acquiring unit is corrected to be increased accordingly as the magnification percentage information acquired from the displayed information acquiring unit is larger; and
a force information presentation unit that presents, to the master arm, the corrected force information generated by the force information correcting unit, and wherein the force information correcting unit corrects, when updating the force information in a predetermined period for correction of the force information, a period for updating the force information by extending the predetermined period.

5. A control apparatus for controlling a master slave robot to perform an assembly task while a state of the assembly task imaged by an imaging device is displayed on a display unit, the master slave robot including a slave arm and a master arm, the control apparatus comprising:

a slave arm control apparatus that controls operation of the slave arm so as to perform the assembly task to a rigid target object; and a master arm control apparatus that controls operation of the master arm that remotely operates the slave arm when the master slave robot is used, wherein the slave arm control apparatus includes a force information acquiring unit that acquires force information on force externally applied to the slave arm, wherein the master arm control apparatus includes:
a displayed information acquiring unit that acquires magnification percentage information on a picture displayed by the display unit displaying the state of the assembly task;
a force information correcting unit that generates corrected force information such that the force information acquired from the force information acquiring unit is corrected to be increased accordingly as the magnification percentage information acquired from the displayed information acquiring unit is larger;
a force information presentation unit that presents, to the master arm, the corrected force information generated by the force information correcting unit;
a view angle information acquiring unit that acquires view angle information on a person watching the display unit displaying the state of the assembly task; and
a selector that selects one of the magnification percentage information on the picture acquired by the displayed information acquiring unit and the view angle information acquired by the view angle information acquiring unit, and wherein the force information correcting unit generates corrected force information in accordance with the information selected by the selector such that the force information acquired from the force information acquiring unit is corrected to be increased accordingly as the selected information is larger.

6. The control apparatus for the master slave robot according to claim 5, wherein the master arm control apparatus includes:
a display unit position information acquiring unit that acquires position information, orientation information, and size information on the display unit;
a person position information acquiring unit that acquires position information and sight line information on the person; and
a view angle information calculation unit that calculates the view angle information from tithe position information, the orientation information, and the size information on the display unit acquired from the display unit position information acquiring unit and (ii) the position information and the sight line information on the person acquired from the person position information acquiring unit, and wherein the view angle information acquiring unit acquires the view angle information calculated by the view angle information calculation unit.

7. The control apparatus for the master slave robot according to claim 5, wherein the master arm control apparatus includes:
a target object size information calculation unit that calculates size information on the rigid target object displayed in the picture displayed by the display unit;
a display unit position information acquiring unit that acquires position information, orientation information, and size information on the display unit;
a person position information acquiring unit that acquires position information and sight line information on the person; and a target object view angle information calculation unit that calculates the view angle information from (i) the position information, the orientation information, and the size information on the display unit acquired from the display unit position information acquiring unit, (ii) the position information and the sight line information on the person acquired from the person position information acquiring unit, and (iii) the size information on the rigid target object acquired from the target object size information calculation unit, and wherein the view angle information acquiring unit acquires the view angle information calculated by the target object view angle information calculation unit.

8. A robot comprising:
a slave arm;
a master arm; and
a control apparatus for controlling the slave arm and the master arm to perform an assembly task while a state of the assembly task imaged by an imaging device is displayed on a display unit,
wherein the control apparatus includes:
  a slave arm control apparatus that controls operation of the slave arm so as to perform the assembly task to a rigid target object; and
  a master arm control apparatus that controls operation of the master arm that remotely operates the slave arm when the robot is used,
wherein the slave arm control apparatus includes a force information acquiring unit that acquires force information on a force externally applied to the slave arm,
wherein the master arm control apparatus includes:
  a displayed information acquiring unit that acquires magnification percentage information on a picture displayed by the display unit displaying the state of the assembly task;
  a force information correcting unit that generates corrected force information such that the force information acquired from the force information acquiring unit is corrected to be increased accordingly as the magnification percentage information acquired from the displayed information acquiring unit is larger;
  a force information presentation unit that presents, to the master arm, the corrected force information generated by the force information correcting unit;
  a size information calculation unit that (i) calculates length information or area information on the rigid target object displayed in the picture displayed by the display unit from imaged picture information acquired from the displayed information acquiring unit and (ii) outputs the calculated length information or the calculated area information on the rigid target object as size information on the rigid target object displayed in the picture displayed by the display unit;
  a magnification percentage information calculation unit that (i) calculates magnification percentage information from the size information received from the size information calculation unit and actual size information on the rigid target object and (ii) transmits the calculated magnification percentage information to the force information correcting unit; and
  a target object information storage unit that (i) stores the actual size information on the rigid target object and (ii) transmits the actual size information on the rigid target object stored therein to the magnification percentage information calculation unit,
wherein the magnification percentage information calculation unit (i) divides the size information (Sd) acquired from the size information calculation unit by the actual size information (Sr) on the rigid target object that is acquired from the target object information storage unit and (ii) transmits a division result (Sd/Sr) to the force information correcting unit as the magnification percentage information, and wherein the force information correcting unit multiplies the magnification percentage information acquired from the size information calculation unit and a correction coefficient to generate the corrected force information.

9. A control method for controlling a master slave robot to perform an assembly task while a state of the assembly task imaged by an imaging device is displayed on a display unit, the master slave robot including a slave arm and a master arm, the control method comprising:
  controlling operation of the slave arm so as to perform the assembly task to a rigid target object; and
  controlling operation of the master arm that remotely operates the slave arm when the master slave robot is used,
wherein the controlling operation of the slave arm includes acquiring, by a force information acquiring unit, force information on force externally applied to the slave arm,
wherein the controlling operation of the master arm includes:
  acquiring, by a displayed information acquiring unit, magnification percentage information on a picture displayed by the display unit displaying the state of the assembly task;
  generating, by a force information correcting unit, corrected force information such that the force information acquired from the force information acquiring unit is corrected to be increased accordingly as the magnification percentage information acquired from the displayed information acquiring unit is larger;
  presenting, by a force information presentation unit, to the master arm, the corrected force information generated by the force information correcting unit;
  (i) calculating, by a size information calculating unit, length information or area information on the rigid target object displayed in the picture displayed by the display unit from imaged picture information acquired from the displayed information acquiring unit and (ii) outputting, by the size information calculating unit, the calculated length information or the calculated area information on the rigid target object as size information on the rigid target object displayed in the picture displayed by the display unit;
  (i) calculating, by a magnification percentage information calculation unit, magnification percentage information from the size information received from the size information calculation unit and actual size information on the rigid target object and (ii) transmitting, by the magnification percentage information calculation unit, the calculated magnification percentage information to the force information correcting unit; and
  (i) storing, by a target object information storage unit, the actual size information on the rigid target object and (ii) transmitting, by the target object information storage unit, the actual size information on the rigid target object stored therein to the magnification percentage information calculation unit,
wherein the calculating the magnification percentage includes (i) dividing the size information (Sd) acquired from the size information calculation unit by the actual size information (Sr) on the rigid target object that is acquired from the target object information storage unit and (ii) transmitting a division result (Sd/Sr) to the force information correcting unit as the magnification percentage information, and wherein the generating the corrected force information includes multiplying the magnification percentage information acquired from the size information calculation unit and a correction coefficient to generate the corrected force information.

10. A non-transitory computer-readable recording medium including a control program for controlling a master slave robot to perform an assembly task while a state of the assembly task imaged by an imaging device is displayed on a display unit, the master slave robot including a slave arm and a master arm, wherein, when executed, the control program causing a computer to perform:

controlling operation of the slave arm so as to perform the assembly task to a rigid target object; and controlling operation of the master arm that remotely operates the slave arm when the master slave robot is used, wherein the controlling operation of the slave arm includes acquiring, by a force information acquiring unit, force information on force externally applied to the slave arm, and wherein the controlling operation of the master arm includes:

acquiring, by a displayed information acquiring unit, magnification percentage information on a picture displayed on the display unit displaying the state of the assembly task;

generating, by a force information correcting unit, corrected force information such that the force information acquired from the force information acquiring unit is corrected to be increased accordingly as the magnification percentage information acquired from the displayed information acquiring unit is larger;

presenting, by a force information presentation unit, to the master arm, the corrected force information generated by the force information correcting unit;

(i) calculating, by a size information calculating unit, length information or area information on the rigid target object displayed in the picture displayed by the display unit from imaged picture information acquired from the displayed information acquiring unit and (ii) outputting, by the size information calculating unit, the calculated length information or the calculated area information on the rigid target object as size information on the rigid target object displayed in the picture displayed by the display unit;

(i) calculating, by a magnification percentage information calculation unit, magnification percentage information from the size information received from the size information calculation unit and actual size information on the rigid target object and (ii) transmitting, by the magnification percentage information calculation unit, the calculated magnification percentage information to the force information correcting unit; and (i) storing, by a target object information storage unit, the actual size information on the rigid target object and (ii) transmitting, by the target object information storage unit, the actual size information on the rigid target object stored therein to the magnification percentage information calculation unit, wherein the calculating the magnification percentage includes (i) dividing the size information (Sd) acquired from the size information calculation unit by the actual size information (Sr) on the rigid target object that is acquired from the target object information storage unit and (ii) transmitting a division result (Sd/Sr) to the force information correcting unit as the magnification percentage information, and wherein the generating the corrected force information includes multiplying the magnification percentage information acquired from the size information calculation unit and a correction coefficient to generate the corrected force information.

* * * * *